(12) United States Patent
Yamamoto et al.

(10) Patent No.: US 7,522,174 B2
(45) Date of Patent: Apr. 21, 2009

(54) IMAGE PROCESSING APPARATUS, IMAGE PROCESSING METHOD, PROGRAM FOR IMPLEMENTING IMAGE PROCESSING METHOD, AND RECORDING MEDIUM RECORDING PROGRAM

(75) Inventors: Kunihiro Yamamoto, Kanagawa (JP); Kiyoshi Kusama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 10/874,538

(22) Filed: Jun. 24, 2004

(65) Prior Publication Data
US 2004/0263533 A1     Dec. 30, 2004

(30) Foreign Application Priority Data

Jun. 30, 2003   (JP)   ............................. 2003-187178
Jun. 30, 2003   (JP)   ............................. 2003-187179

(51) Int. Cl.
*G09G 5/00*   (2006.01)

(52) U.S. Cl. ......................... 345/619; 345/428; 715/838

(58) Field of Classification Search ......... 345/619–630, 345/634–641; 382/111–116, 181, 286–292; 715/853, 771
See application file for complete search history.

(56) References Cited

U.S. PATENT DOCUMENTS

| | | | | |
|---|---|---|---|---|
| 5,371,562 A | | 12/1994 | Hahm et al. ................. 354/112 |
| 5,548,699 A | * | 8/1996 | Ishida et al. ................. 345/440 |
| 5,786,864 A | | 7/1998 | Yamamoto ................... 348/473 |
| 5,977,974 A | * | 11/1999 | Hatori et al. ................. 715/839 |
| 6,119,135 A | * | 9/2000 | Helfman ...................... 715/513 |
| 6,313,919 B1 | * | 11/2001 | Nakagiri et al. ............. 358/1.11 |
| 6,544,123 B1 | | 4/2003 | Tanaka et al. ................. 463/36 |
| 6,915,074 B2 | * | 7/2005 | McIntyre et al. ............ 396/429 |
| 7,051,291 B2 | | 5/2006 | Sciammerella et al. ...... 715/838 |
| 2002/0054158 A1 | * | 5/2002 | Asami ......................... 345/838 |
| 2002/0055943 A1 | | 5/2002 | Kusama ....................... 707/201 |
| 2002/0135621 A1 | * | 9/2002 | Angiulo et al. ............. 345/838 |
| 2002/0140746 A1 | * | 10/2002 | Gargi ........................... 345/853 |
| 2002/0145614 A1 | * | 10/2002 | Van Valer .................... 345/629 |

FOREIGN PATENT DOCUMENTS

| | | |
|---|---|---|
| JP | 6-203135 | 7/1994 |
| JP | H07-13276 | 1/1995 |

(Continued)

OTHER PUBLICATIONS

Author: Cliff Reiter, Title: CD Labels and More, Publisher: The Journal of the British APL Association, vol. 17 No. 2, Date: Oct. 2000, pp. 98-104.*

(Continued)

*Primary Examiner*—Kee M Tung
*Assistant Examiner*—Jwalant Amin
(74) *Attorney, Agent, or Firm*—Fitzpatrick, Cella, Harper & Scinto

(57) ABSTRACT

An image processing apparatus, method, program and recording medium can arrange images concentrically with respect to a circular label. image data and a type of an arrangement pattern of image data are selected and the shape and the arrangement of images are changed in accordance with the number of image data selected and a type of arrangement pattern selected so as to generate post-arrangement image data.

7 Claims, 37 Drawing Sheets

FOREIGN PATENT DOCUMENTS

| | | |
|---|---|---|
| JP | 9-297858 | 11/1997 |
| JP | H11-085450 | 3/1999 |
| JP | 2000-155835 | 6/2000 |
| JP | 2000-156777 | 6/2000 |
| JP | 2000-284879 | 10/2000 |
| JP | 2001-306375 | 11/2001 |
| JP | 2002-133723 | 5/2002 |
| JP | 2002-287867 | 10/2002 |
| JP | 2002-290880 | 10/2002 |
| JP | 2002-292939 | 10/2002 |

OTHER PUBLICATIONS

Title: The Journal of the British APL Association—"CD Labels and More" by Reiter, vol. 17 No. 2, Oct. 2000, pp. 98-104.*
http://www.cdrom-guide.com/forums/showthread.php?t=225289, tra1ner, pp. 1-3, May 2002.*
Nero Cover Designer Quickstart, 2002, pp. 10-11 and 25-28.*

* cited by examiner

IMAGES NOT OVERLAPPING
WITHIN CIRCLE

IMAGES NOT OVERLAPPING AND
BEING ACROSS CIRCUMFERENCE

IMAGES OVERLAPPING
WITHIN CIRCLE

IMAGES OVERLAPPING AND
BEING ACROSS CIRCUMFERENCE

15 IMAGES

50 IMAGES

IMAGE PROCESSING APPARATUS, IMAGE PROCESSING METHOD, PROGRAM FOR IMPLEMENTING IMAGE PROCESSING METHOD, AND RECORDING MEDIUM RECORDING PROGRAM

BACKGROUND OF THE INVENTION

1. Field of the Invention

The present invention relates to an image processing apparatus, an image processing method, a program for implementing the image processing method, and a recording medium for recording the program, with which multiple digital images are displayed and printed in a layout form.

2. Related Background Art

In recent years, with the pervasion of digital cameras, it has become possible to take digitally photographs with ease. Also, large-capacity removable media represented by Compact Disc-Recordables (CD-Rs) have come into widespread use, so that the digitally-taken photographs are stored onto the CD-Rs.

When a large number of digital photographs are stored in a removable medium, however, it becomes completely impossible to know what photographs have been recorded in the medium unless they are read out from the medium. In order to solve this problem, on a label of a CD-R, a user writes letters or prints letters or an image using a printer capable of performing print on the CD-R label, thereby identifying each CD-R.

When multiple images of rectangular digital photographs are arranged along a circle such as a label of a CD-R, a user manually lays out the images, although it is very difficult to arrange them in a good balance. In addition, each time the number of images to be arranged increases or decreases, the user is required to perform the layout again, which is extremely complicated work. In view of this problem, a technique of arranging images concentrically is disclosed (see Japanese Patent Application Laid-Open No. H11-085450, for instance).

Also, in order to make it easy to know the contents of a recording medium (such as a CD-R), on which a plurality of image data have been recorded, a representative image, a title, or the like is printed on a label surface of the recording medium. In the case of a disk recording medium such as a CD-R in particular, its label surface has a circular shape or a doughnut shape in many cases. Therefore, when rectangular images are arranged on the label, it is required to think out the layout of the images so that the images are presented in an easy-to-see manner. In order to solve this problem, a technique is disclosed with which icons (images) are arranged along a spiral, thereby arranging the images so as to be contained within a circle (see Japanese Patent Application Laid-Open No. H11-085450, for instance). Also, a technique is disclosed relating to a contents output apparatus with which information is presented on a screen in a circular area with buttons arranged concentrically and image information is linked to the respective buttons (see Japanese Patent Application Laid-Open No. 2002-287867, for instance).

With the conventional techniques described above, however, a user is only capable of arranging a predetermined number of images using a fixed layout, which means that the user cannot select an arbitrary number of images and arrange them by himself/herself. Also, it is impossible to arrange the images so as to overlap each other. Against this backdrop, a technique has been desired with which it is possible to automatically arrange images selected by a user in a concentric manner.

Also, when a very large number of images are arranged, a problem arises in that each image becomes very small.

Further, in the case of the conventional spiral image arrangement, each rectangular image is arranged under a condition where the shape thereof is not changed, so that a problem occurs in that it is impossible to fill a circular label surface with efficiency.

Still further, with the conventional technique with which concentric buttons are displayed, it is impossible to display photographs on the concentric buttons themselves and therefore there exists an increasing demand for a technique with which it is possible to arrange images concentrically.

SUMMARY OF THE INVENTION

It is an object of the present invention to solve all or at least one of the above problems.

According to one aspect of the present invention, an image processing apparatus of the present invention includes:

a storage means for storing a plurality of image data;

an image selection means for selecting a plurality of image data stored in the storage means; and an image arrangement means for changing in shape each of images of the plurality of image data selected by the image selection means into a form corresponding to an arrangement pattern and for generating post-arrangement image data where the shape-changed images generated through the shape change are arranged in accordance with the arrangement pattern.

These and other objects and features of the present invention will become apparent from the following embodiments and accompanying drawings.

DESCRIPTION OF THE PREFERRED EMBODIMENTS

Embodiments of the present invention will now be described with reference to the accompanying drawings.

First Embodiment

Figure 1:
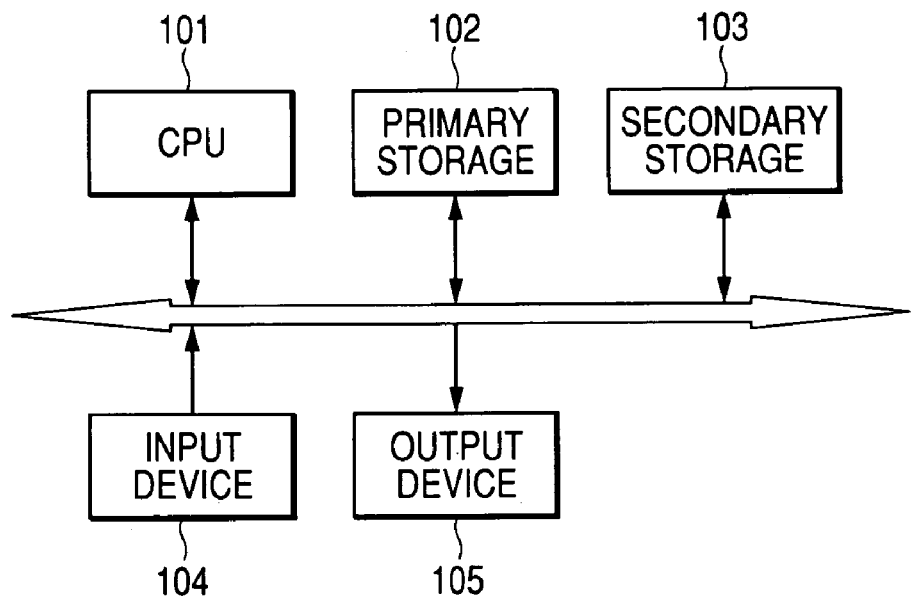
FIG. 1 is a block diagram showing a hardware construction of an image processing apparatus in a first embodiment of the present invention.

First, as a first embodiment of the present invention, an image processing apparatus will be described which arranges images in a single concentric circle manner. FIG. 1 is a block diagram showing a hardware construction of the image processing apparatus in the first embodiment of the present invention. A Central Processing Unit (CPU) 101 controls the overall operation of the system and performs execution of each program stored in a primary storage 102 and other processing. The primary storage 102 is mainly composed of a memory such as a Random Access Memory (RAM), and reads out each required program stored in a secondary storage 103 or the like to store the read program therein.

The secondary storage 103 is a nonvolatile memory, and a hard disk or the like corresponds to this secondary storage. The secondary storage 103 stores image data to be subjected to processing in addition to various programs to be executed in the image processing apparatus. Note that the image data in this embodiment is image data of a Joint Photographic Experts Group (JPEG) format, for instance.

Generally, the capacity of the primary storage 102 is smaller than that of the secondary storage 103, and programs, data, and the like that cannot be stored in the primary storage 102 due to large data amount thereof are stored in the secondary storage 103. In addition, data and the like that need to be stored for a long time period are stored in the secondary storage 103. In this embodiment, various programs are stored in the secondary storage 103 and each program to be executed is read into the primary storage 102 and is executed and processed by the CPU 101 at the time of execution of the program.

Also, an input device 104 is a mouse or a keyboard, for instance. This input device 104 is used to send an interrupt signal to a program or the like, for instance. An output device 105 is a display device such as a Cathode-Ray Tube (CRT) or a liquid crystal display, a printer that performs print, or the like. In the image processing apparatus in this embodiment, a function of a print device that performs print on a label of a CD-R is indispensable, so that the output device 105 needs to include at least a printer. Also, the output device 105 may be provided with a device other than the printer as an image output device. Here, the image processing apparatus is not limited to the construction described above and other various constructions are conceivable.

First, the outline of the image processing apparatus in this embodiment will be described. The image processing apparatus in this embodiment is capable of allowing a user to designate each image to be subjected to print, a medium to be subjected to print, and a layout by displaying Graphical User Interfaces (GUIs) on the display device. Further, an image processing apparatus according to this embodiment has an editing function of editing each image to be subjected to print in a simple manner.

Figure 2:
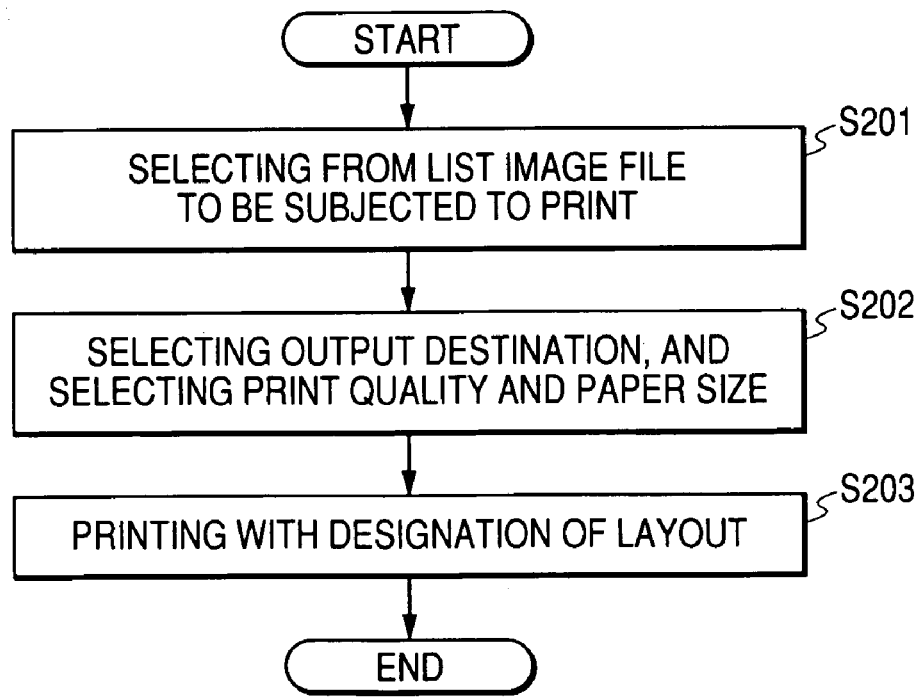
FIG. 2 is a flowchart showing a basic flow of a procedure of an operation by a user of the image processing apparatus according to the first embodiment.

The four functions described above possessed by the image processing apparatus will be described below with reference to the drawings. FIG. 2 is a flowchart showing a basic flow of a procedure of an operation by a user of the image processing apparatus shown in FIG. 1. First, in step S201, the user selects each image to be subjected to print and the number thereof. Next, in step S202, the user makes selections of an output destination (output device 105) and print paper. When print on a CD-R or the like is to be performed, for instance, the user selects a label of a CD-R in this step. Finally, in step S203, the user determines a layout for the print onto the label and designates to perform the print in accordance with the determined layout. With the simple editing function, editing is performed through an editing screen displayed when a button prepared on a print screen displayed in step S203 is depressed. After the editing, the screen returns to the print screen displayed in step S203. Next, the details of the processing in each step will be described with reference to the drawings.

Figure 3:
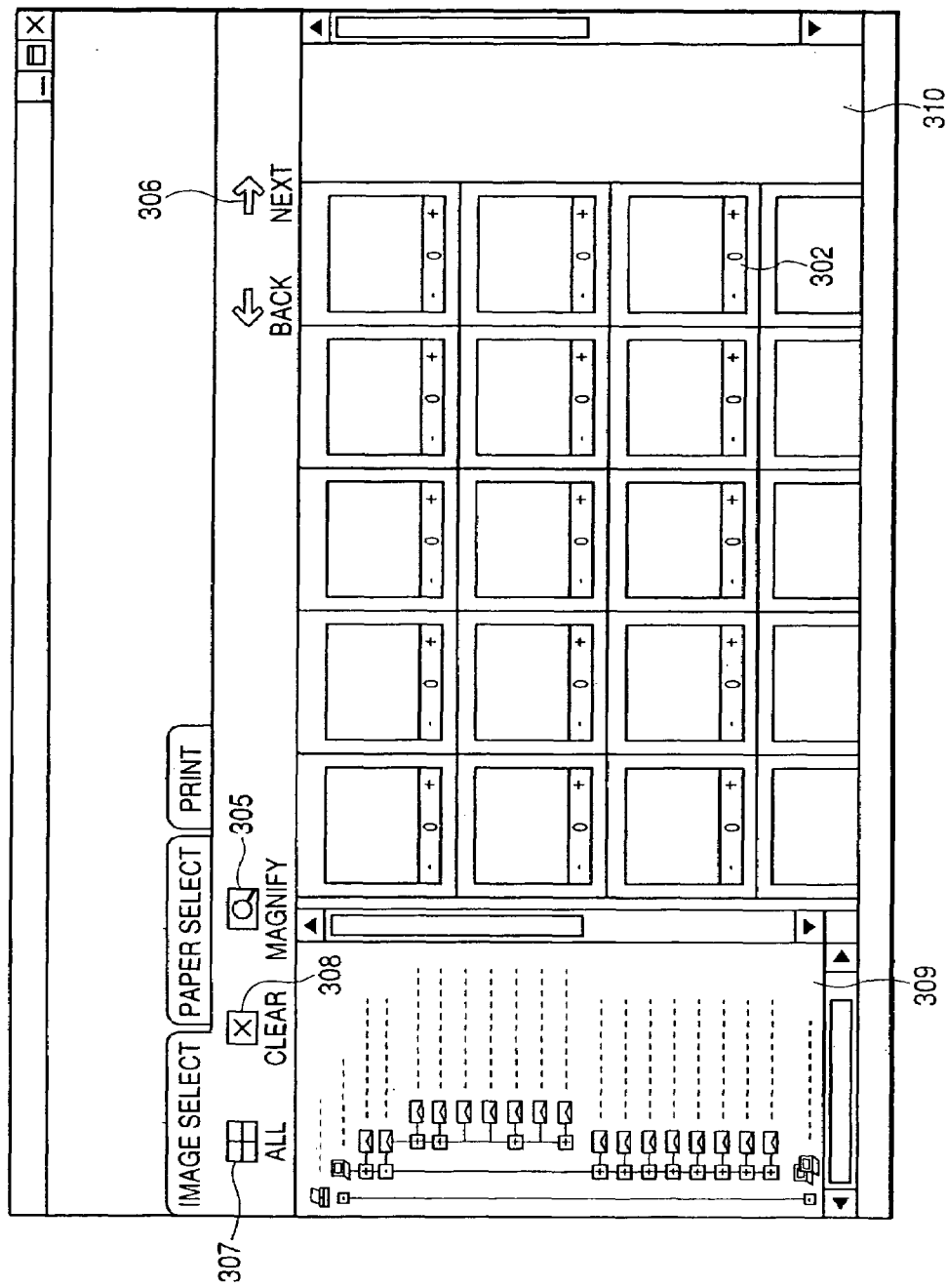
FIG. 3 shows an example of a print target image designation screen displayed by the image processing apparatus in the first embodiment.

FIG. 3 shows an example of a print target image designation screen displayed by the image processing apparatus in this embodiment. This print target image designation screen shown in FIG. 3 is a screen displayed in step S201 in FIG. 2.

In a folder tree window 309, a tree indicating a directory construction structured in the secondary storage 102 of the image processing apparatus is displayed. By tracing the tree in this folder tree window 309, the user may select a directory in which his/her desired image data is stored. When multiple image files are stored in the directory selected by the user, the image processing apparatus displays thumbnail images (reduced images) thereof in a thumbnail display window 310.

When the user depresses an enlarged display button 305 under a condition where an image in the thumbnail display window 310 is selected by the user, an enlarged display window is displayed. Through this enlarged display window, the user is capable of confirming the selected image in detail.

In this embodiment, as shown in FIG. 3, an image number selection button 302 is given below each thumbnail image. With each image number selection button 302, the user selects the number of images to be generated from its corresponding image. This image number selection button 302 is a seesaw switch and, when the user depresses the right side of the image number selection button 302, a print designation number displayed at the center of the image number selection button 302 is incremented by one. On the other hand, when the user depresses the left side of the image number selection button 302, the print designation number is decremented by one. Also, when the print designation number displayed at the center of the image number selection button 302 becomes zero, even if the left side of the image number selection button 302 is depressed, this operation is ignored, thereby preventing a situation where the print designation number becomes a negative value. Further, when the print designation number becomes "99," the right side of the number selection button 302 is set invalid.

When an all selection button 307 is depressed, every image stored in the directory selected through the folder tree window 309 is in a condition to be designated to print one image from each image. Also, when an all clear button 308 is depressed, the print designation of every image is cleared. Further, when a selection image determination button 306 is depressed, the image processing apparatus displays a print target medium designation screen shown in FIG. 4.

Next, the print target medium designation screen described above will be described.

Figure 4:
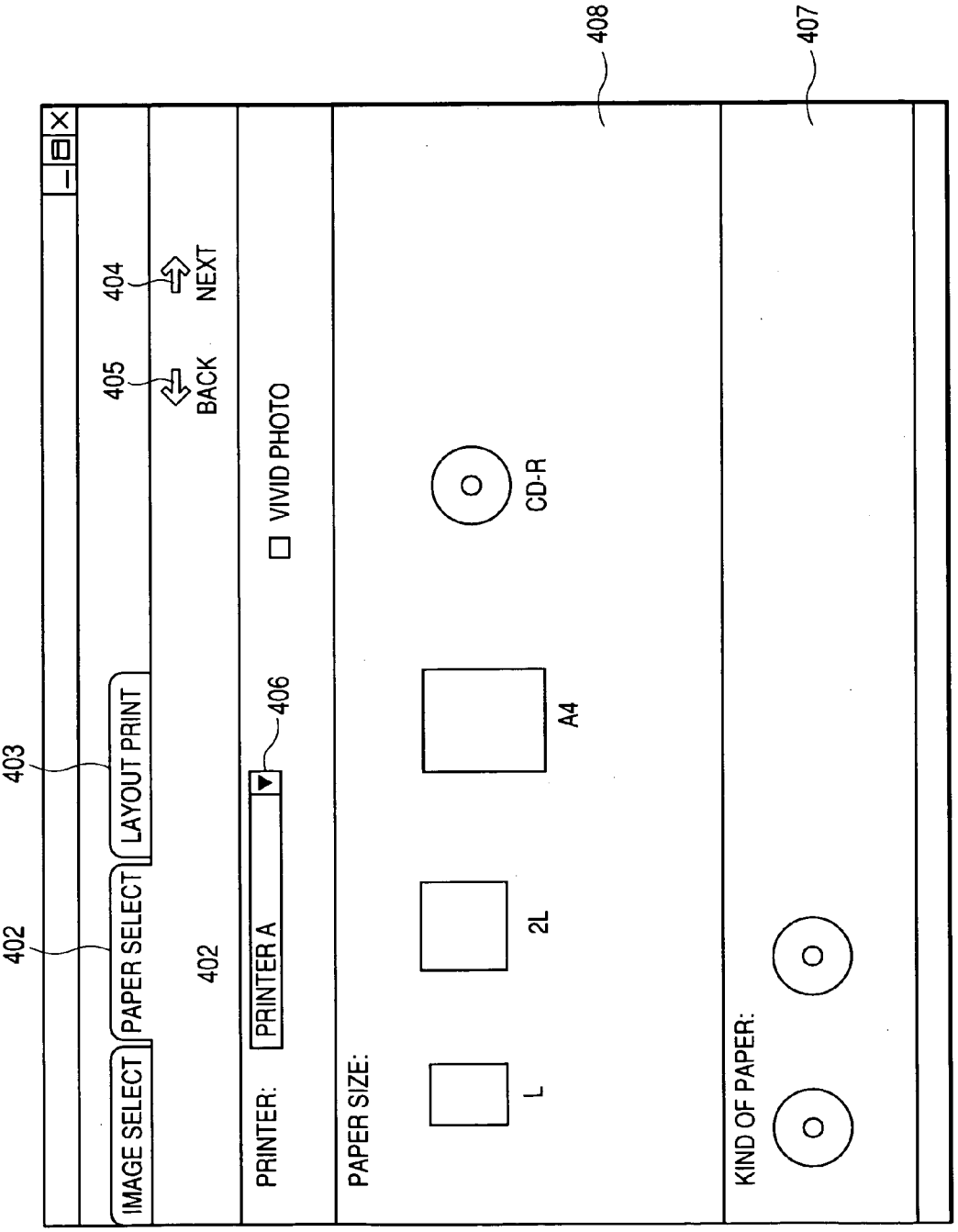
FIG. 4 shows an example of a print target medium designation screen displayed by the image processing apparatus.

FIG. 4 shows an example of the print target medium designation screen displayed by the image processing apparatus. This print target medium designation screen shown in FIG. 4 is a screen displayed in step S202 in FIG. 2. A printer selection menu 406 is a menu for allowing the user to select a printer that is an output destination. As shown in FIG. 4, the printer selection menu 406 in this embodiment is a pull-down menu and displays printers connected to the image processing apparatus in a list. Also, a check box dubbed "VIVID PHOTO" on the right side of the printer selection menu 406 is a check box for designating whether special processing prepared by a printer driver will be applied. Only when a checkmark is placed in this checkbox, the "VIVID PHOTO" function of the printer selected with the printer selection menu 406 is set active. In this embodiment, the VIVID photo function is referred to as an example of the special processing provided by the printer driver, although it is of course possible that the special processing is another processing.

Also, in accordance with the kind of the output destination printer selected using the printer selection menu 406, the image processing apparatus limits choices to be displayed in a print size selection window 408 and a paper kind selection window 407 so that only appropriate choices are displayed therein. This limitation of the choices to be displayed in these windows allows the user to make print designation without paying attention to which printer has been selected, what paper is supported by the printer selected, and the like. In addition, in accordance with a paper size selected through the print size selection window 408, the image processing apparatus limits choices of paper to be displayed in the paper kind selection window 407. Accordingly, each time the output destination printer is changed, the states of the print size selection window 408 and the paper kind selection window 407 are updated. Also, each time a paper size is changed, the state of the paper kind selection window 407 is updated.

Figure 5:
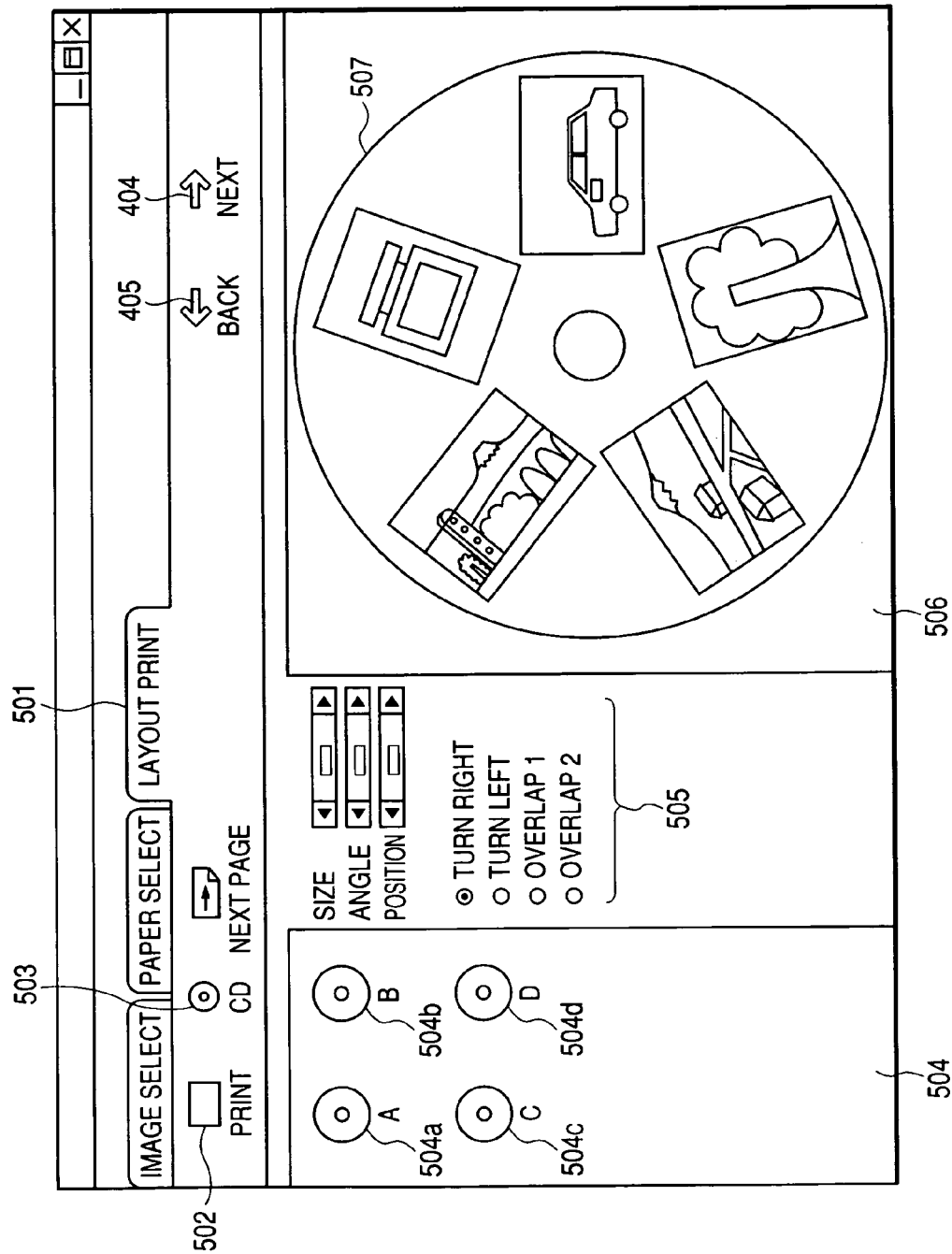
FIG. 5 shows an example of a layout selection screen displayed by the image processing apparatus.

When a print target medium determination button 404, a paper selection tab 402, or a print tab 403 is depressed, the image processing apparatus switches the print target medium designation screen to a layout designation screen shown in FIG. 5 to be described later. Also, when an image re-selection button 405 or an image selection tab is depressed, the image processing apparatus switches the print target medium designation screen to the print target image designation screen shown in FIG. 3.

Also, when the image processing apparatus is used for the first time, the first choice on each list is selected in advance and, at the time of the second and succeeding activation, the image processing apparatus is placed under a state where the choice selected from the list by the user lastly is selected in advance. In this embodiment, when a paper size "CD-R tray" is selected in the print size selection window 408, the image processing apparatus switches the print target medium designation screen to the layout designation screen shown in FIG. 5 through which the user designates the layout of images on a label surface of a CD-R.

Next, the layout designation screen will be described. FIG. 5 shows an example of the layout selection screen displayed by the image processing apparatus. This layout selection screen shown in FIG. 5 is a screen displayed in step S203 in FIG. 2. In a layout selection window 504, it is possible to select any one of layouts A·504*a* to D·504*d* for output. For instance, the layout A·504*a* is a layout where a predetermined number of images (one image, four images, 16 images, or 50 images, for instance) are arranged within a circle such as a CD-R, while the layout B·504*b* is a layout where images are arranged concentrically without shape-change. In this embodiment, it is assumed that the layout B·504*b* has been selected in which images are arranged concentrically without shape-change (that is, their rectangular shapes are not changed).

When the layout where images are arranged concentrically without shape-change is selected in the layout selection window 504, a parameter adjustment window 505 and a print preview window 506 are displayed, with a preview 507 corresponding to the layout being displayed in the print preview window 506.

Figure 6:
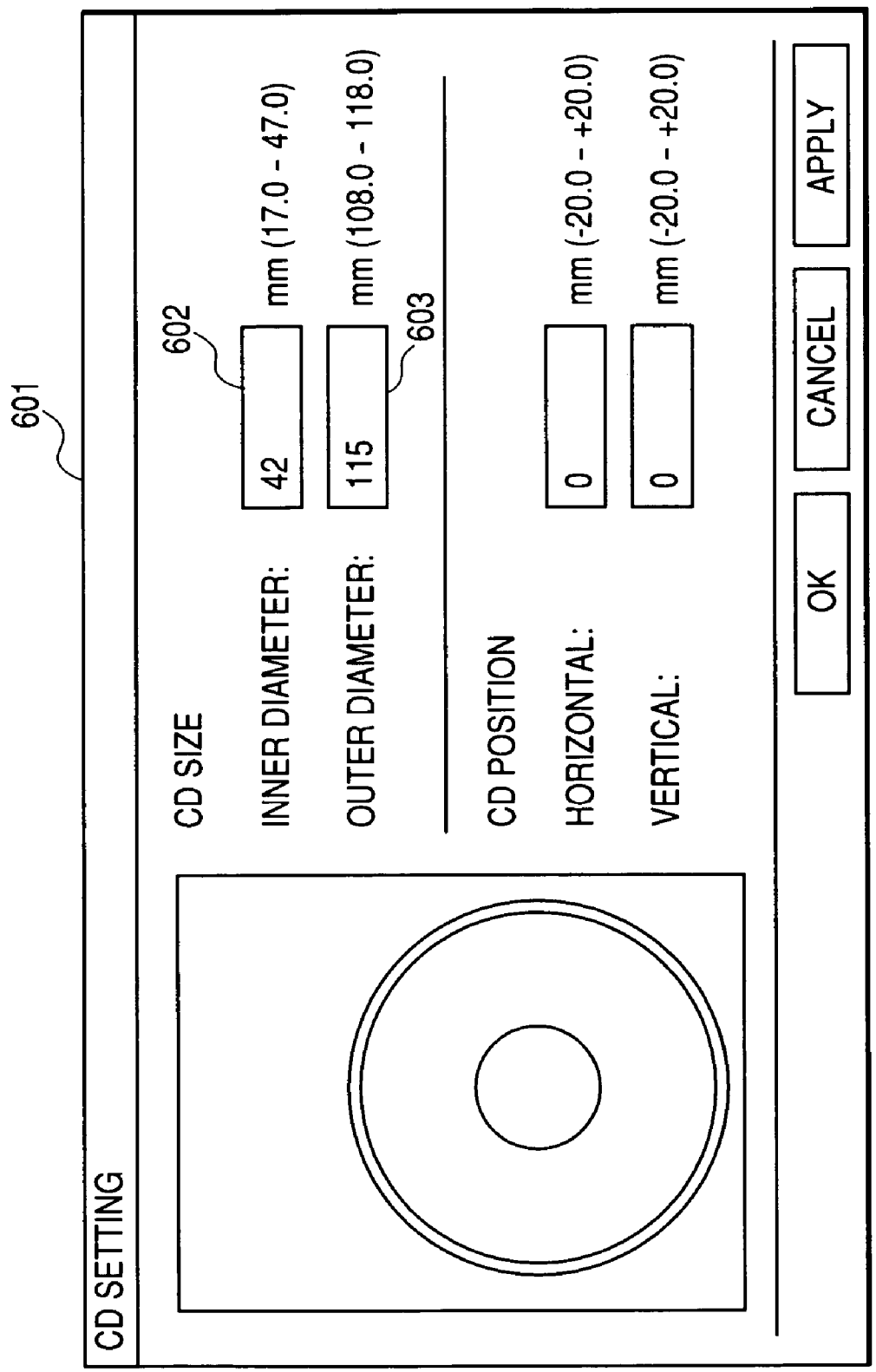
FIG. 6 shows an example of a CD-R setting dialog screen displayed by the image processing apparatus.

Also, it is possible to adjust parameters concerning the layout on the CD-R in the parameter adjustment window 505. An example of the adjustable parameters is the arrangement order of images ("turn right," "turn left," "from inner radius side," or "from outer radius side," for instance). Also, when the user depresses a CD-R setting button 503, the image processing apparatus displays a CD-R setting dialog 601 shown in FIG. 6. FIG. 6 shows an example of the CD-R setting dialog displayed by the image processing apparatus. This CD-R setting dialog 601 includes an inner diameter setting filed 602 in which the inner diameter of the CD-R is input, an outer diameter setting field 603 in which the outer diameter of the CD-R is input, input fields in which adjustment of a print position on the CD-R is performed, and the like.

With the CD-R setting dialog 601 constructed in the manner described above, it is possible to perform adjustment of the inner diameter and the outer diameter of a CD-R and to make other settings. Also, after the overall layout is confirmed using the preview 507, when a print button 502 is depressed, print is started.

Figure 7:
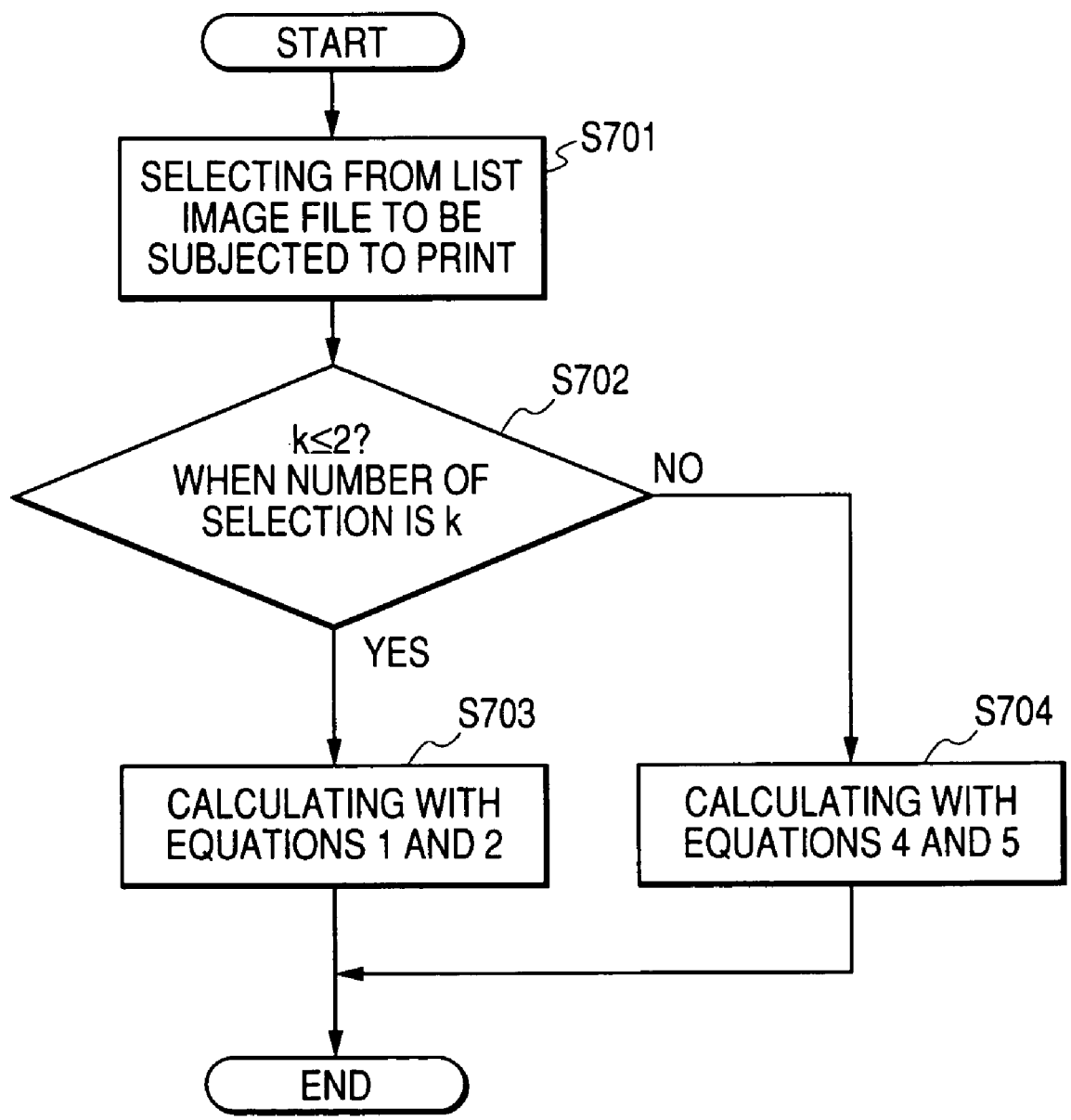
FIG. 7 is a flowchart showing an operation of automatic layout in accordance with a setting in the image processing apparatus.

Next, a method will be described with which images are automatically laid out in accordance with setting values set by the user through the screens shown in FIGS. 3 to 6 described above so that the images are arranged at equal intervals, at which images adjacent to each other do not overlap each other on a label of a CD-R, and are contained within a label of a CD-R (within a circle). FIG. 7 is a flowchart showing an operation of automatic layout processing in accordance to the set values in the image processing apparatus. Note that step S701 shown in FIG. 7 is processing corresponding to step S201 shown in FIG. 2 and automatic layout processing in steps S702 to S704 corresponds to a part of the processing in step S203 shown in FIG. 2.

As shown in FIG. 7, first, in step S701, the image processing apparatus selectively reads, from the secondary storage 103, each image file to be subjected to print selected by the user through the screen shown in FIG. 3. Next, in step S702, when the total number of the image files read in step S701 is assigned "k," the image processing apparatus judges whether "k" is equal to or smaller than "2." If "k" is equal to or smaller than "2" (Yes in step S702), the processing proceeds to step S703 in which the image processing apparatus performs calculation with Equations 1 and 2 given below. On the other hand, if "k" is greater than "2" (No in step S702), the processing proceeds to step S704 in which the image processing apparatus performs calculation with Equations 4 and 5 given below. Here, when the number of image files is equal to or smaller than "2," there will never occur a situation where adjacent images overlap each other at the time of arrangement of the images, so that processing for arranging the images is switched using this condition.

First, calculation processing with Equations 1 and 2 executed in step S703 if it is judged that "k" is equal to or smaller than "2" will be described.

Figure 8:
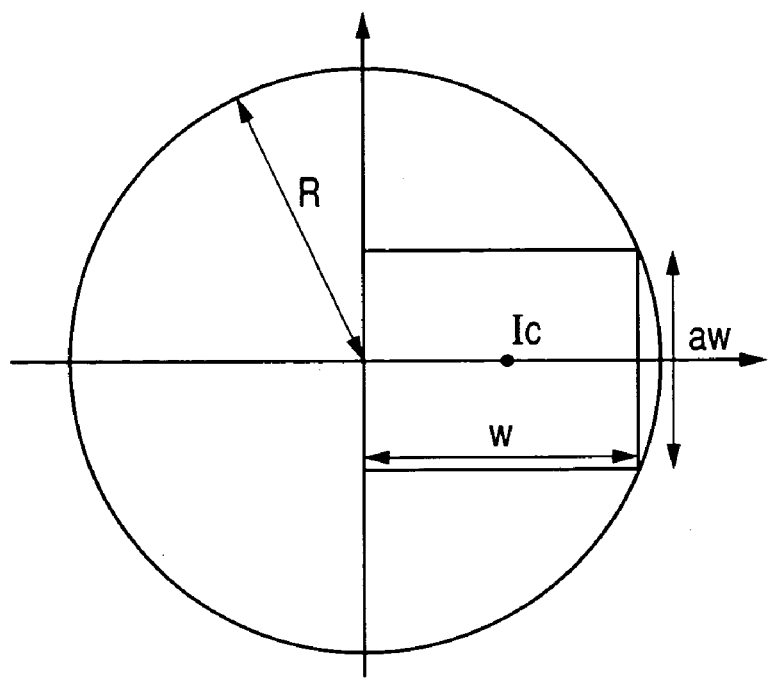
FIG. 8 shows the radius "R" of a CD-R, the width "w" of images to be arranged, and the aspect of the images to be arranged in the case where the images are arranged within a circle while preventing overlapping of the images.

Here, as shown in FIG. 8, when the radius of a CD-R is assigned "R," the width of the images to be arranged is assigned "w," the aspect (height/width) of the images to be arranged is assigned "a," and the center of the CD-R is set as an origin, the following equation is derived:

$$R^2 = W^2 + (aw/2)^2$$

Therefore, the width "w" of the images to be arranged is expressed by Equation 1 given below:

$$w = 2R/\sqrt{(4+a^2)} \qquad \text{Equation 1}$$

Also, the coordinate "(x, y)" of the center "Ic" of the t-th image to be arranged is expressed by Equation 2 given below:

$$x = w\cos(2t\Pi/k)/2 \quad y = w\sin(2t\Pi/k)/2 \qquad \text{Equation 2}$$

where, t=0, 1, . . . , k−1.

Therefore, the image is rotated by 2tΠ/k and is arranged so that its center "Ic" is positioned at the coordinate "(x, y)."

By arranging the images in accordance with Equations 1 and 2 described above, it becomes possible to arrange the images within the circle of the CD-R without causing overlapping of the images.

Next, calculation processing with Equations 3 and 4 executed in step S704 if it is judged that "k" is greater than "2" in step S702 will be described.

Figure 9:
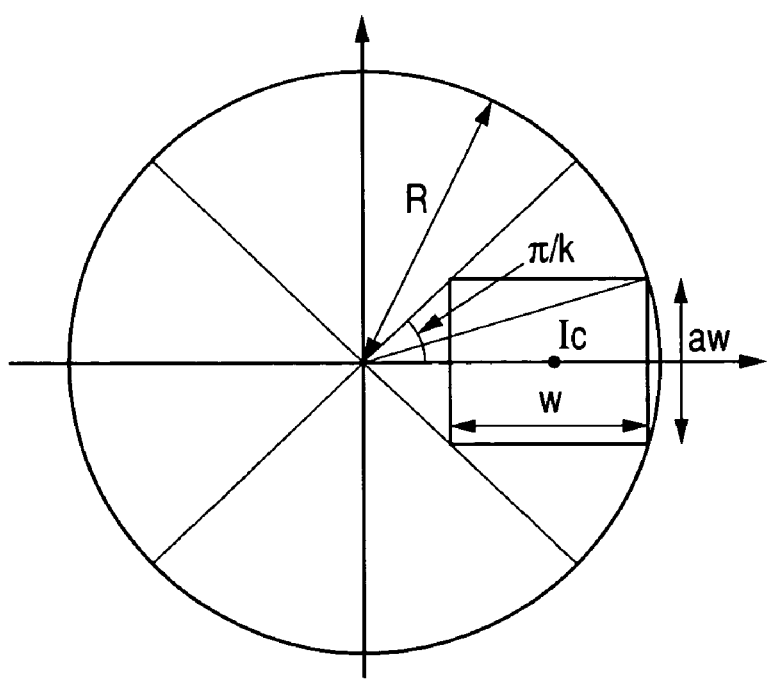
FIG. 9 shows the radius "R" of a CD-R, the width "w" of images to be arranged, and the aspect and angles of the images to be arranged in the case where the images are arranged within a circle while preventing overlapping of the images.

Here, as shown in FIG. 9, when the radius of the CD-R is assigned "R," the width of the images to be arranged is assigned "w," the aspect (height/width) of the images to be arranged is assigned "a," and the center of the CD-R is set as an origin, Equation 3 given below is derived:

$$R^2=(aw/2)^2+(w+(aw/2\tan(\Pi/k)))^2 \qquad \text{Equation 3}$$

Therefore, the width "w" of the images to be arranged is expressed by Equation 4 given below:

$$w=R/\sqrt{\{\alpha^2/4+(1+\alpha/2\tan(\pi/k))^2\}} \qquad \text{Equation 4}$$

Also, the coordinate "(x, y)" of the center "Ic" of the t-th image to be arranged is expressed by Equation 5 given below:

$$x=(w/2+aw/2\tan(\Pi/k))*\cos(2t\Pi/k)$$

$$y=(w/2+aw/2\tan(\Pi/k))*\sin(2t\Pi/k) \qquad \text{Equation 5}$$

where t=0, 1, ..., k−1.

Therefore, the image is rotated by 2tΠ/k and is arranged at this position.

By determining the center coordinates Ic and the width "w" of the images so that Equations 3 and 4 described above are satisfied, it becomes possible to arrange the images within the circle of the CD-R label while preventing overlapping of the images. As described above, the image processing apparatus in this embodiment is capable of, when images are arranged concentrically with respect to a circular label, generating image data (post-arrangement image data) where the images have been automatically arranged so as to be contained within the circle while preventing overlapping of the respective images through automatic adjustment of the sizes, arrangement intervals, distances from the center, and angles of the images in accordance with how many images have been selected.

Second Embodiment

In the first embodiment described above, an example of an image processing apparatus has been described which arranges images at equal intervals within a circle while preventing overlapping of the images on a CD-R. In this second embodiment, an image processing apparatus will be described which adopts a method with which images are arranged so that at least one side of each image is across the circumference of a CD-R (without overlapping, with no outer radius frame, and in a single circle manner). Here, the circumference of the CD-R means a rim of the CD-R and, by laying out the images so as to be across the circumference of the CD-R, it becomes possible to arrange the images without generating a redundant margin in an outer radius portion of the CD-R.

It should be noted here that the hardware construction of the image processing apparatus in this second embodiment is the same as that of the image processing apparatus in the first embodiment shown in FIG. 1, so that the description thereof will be omitted. Also, process steps for label print of the image processing apparatus in this second embodiment and GUIs displayed in the respective process steps are the same as the process steps for the label print of the image processing apparatus in the first embodiment shown in FIG. 2 and the GUIs shown in FIGS. 3 to 6, so that the description thereof will be omitted.

Figure 10:
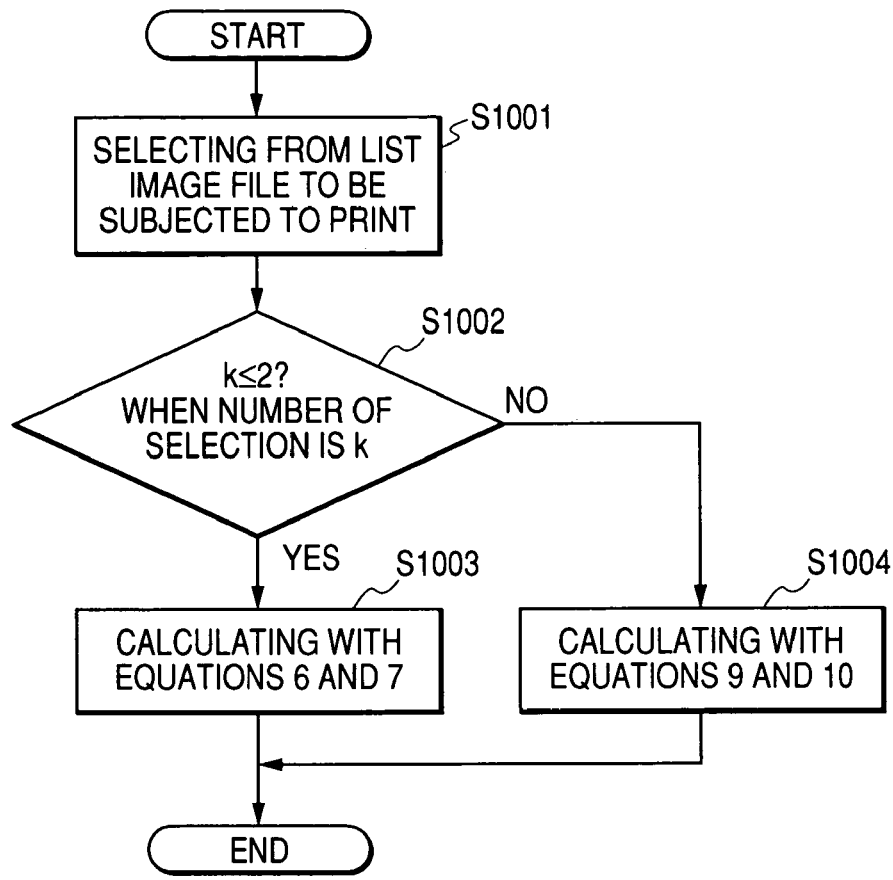
FIG. 10 is a flowchart showing an operation of automatic layout in accordance with a setting in an image processing apparatus of a second embodiment.

A layout method of this embodiment will be described below with which images are arranged on a label of a CD-R at equal intervals, at which overlapping of the images does not occur, and are laid out so that only one side of each image is across the circumference of the CD-R. FIG. 10 is a flowchart showing an operation of automatic layout in accordance with set values in the image processing apparatus of this second embodiment. Note that processing in step S1001 shown in FIG. 10 corresponds to the processing in step S201 shown in FIG. 2 and automatic layout processing in steps S1002 to S1004 shown in FIG. 10 corresponds to a part of the processing in step S203 shown in FIG. 2.

As shown in FIG. 10, first, in step S1001, the image processing apparatus selectively reads, from the secondary storage 103, each image file to be subjected to print selected by the user through the screen shown in FIG. 3. Next, in step S1002, when the total number of the selected images is assigned "k," the image processing apparatus judges whether "k" is equal to or smaller than "2." If "k" is equal to or smaller than "2" (Yes in step S1002), the processing proceeds to step S1003 in which the image processing apparatus performs calculation with Equations 6 and 7 given below. On the other hand, if k is greater than "2" (No in step S1002), the processing proceeds to step S1004 in which the image processing apparatus performs calculation with Equations 9 and 10 given below. Here, if the number of images is equal to or smaller than "2," there will never occur a situation where adjacent images overlap each other at the time of arrangement of the images, so that processing for arranging the images is switched using this condition.

First, calculation processing with Equations 6 and 7 executed in step S1003 if it is judged that "k" is equal to or smaller than 2 will be described.

Figure 16:
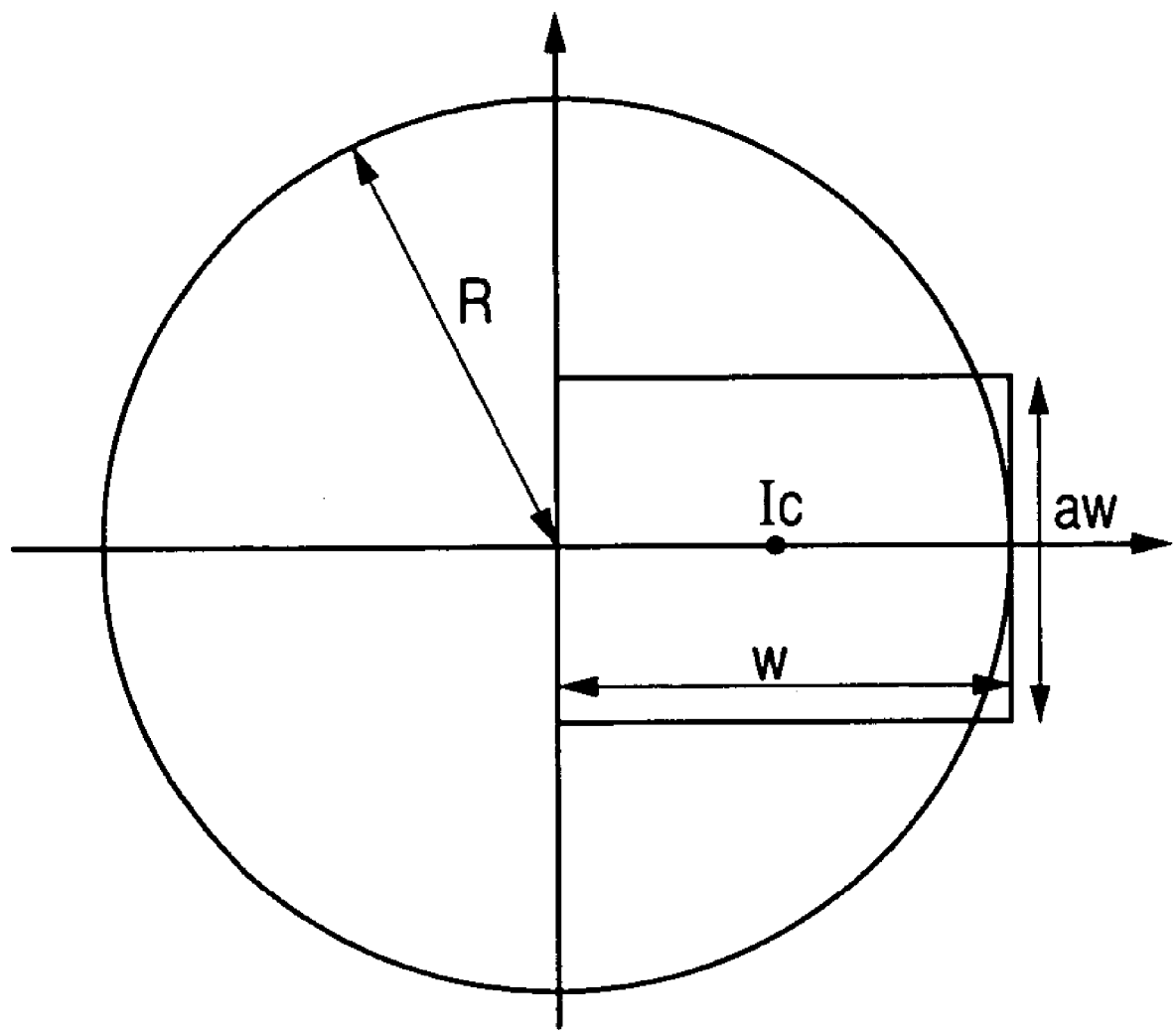
FIG. 16 shows the radius "R" of a CD-R, the width "w" of images to be arranged, and the aspect of the images to be arranged in the case where the images are arranged so as to extend off a circle.
Figure 17A:
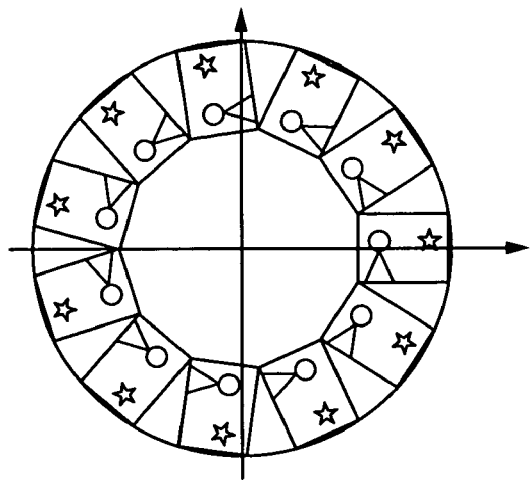
FIGS. 17A, 17B, 17C, and 17D respectively show examples of image arrangements according to the first to fourth embodiments.
Figure 17B:
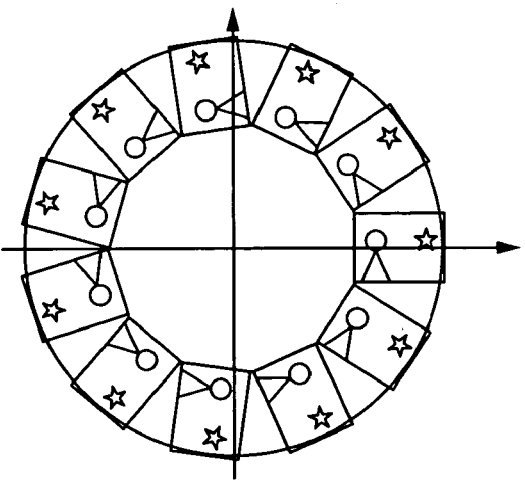
Figure 17C:
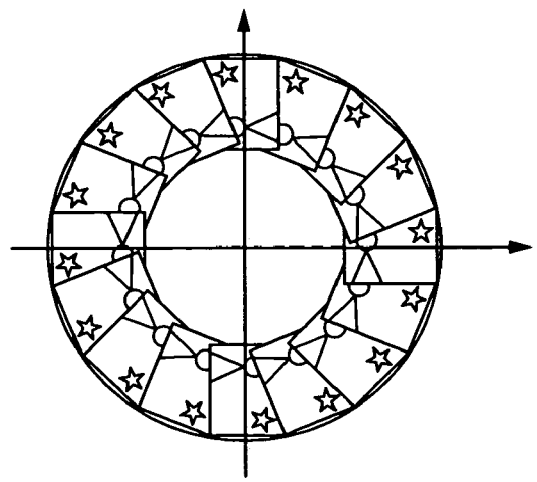
Figure 17D:
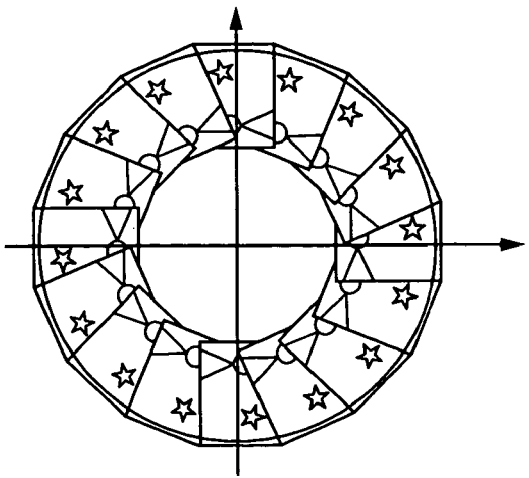

Here, as shown in FIG. 16, when the radius of a CD-R is assigned "R," the width of the images to be arranged is assigned "w," the aspect (height/width) of the images to be arranged is assigned "a," and the center of the CD-R is set as an origin, Equation 6 given below is derived:

$$w=R \qquad \text{Equation 6}$$

Also, the coordinate "(x, y)" of the center "Ic" of the t-th image to be arranged is expressed by Equation 7 given below:

$$x=w\cos(2t\Pi/k)/2$$

$$y=w\sin(2t\Pi/k)/2) \qquad \text{Equation 7}$$

where t=0, 1, ..., k−1.

Therefore, the image is rotated by 2tΠ/k and is arranged so that its center "Ic" is positioned at the coordinate "(x, y)."

Next, calculation processing with Equations 9 and 10 executed in step S1004 if it is judged that "k" is greater than "2" in step S1002 will be described.

Figure 11:
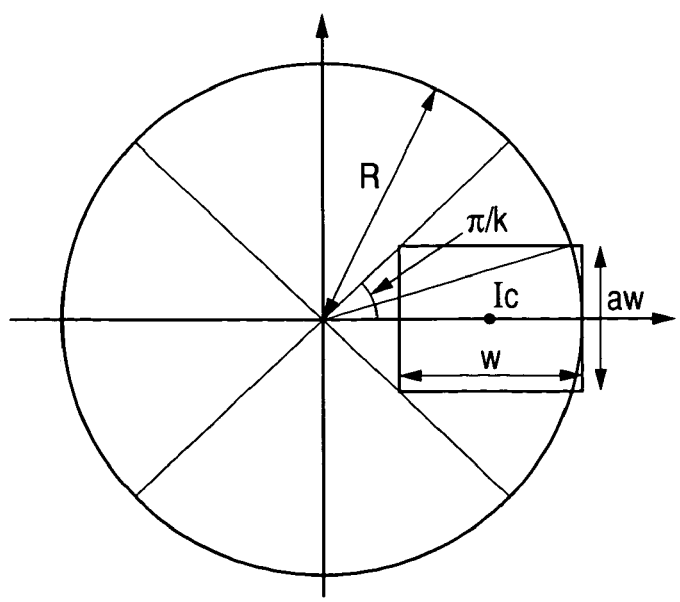
FIG. 11 shows the radius "R" of a CD-R, the width "w" of images to be arranged, and the aspect and angles of the images to be arranged in the case where the images are arranged so as to extend off a circle while preventing overlapping of the images.

Here, as shown in FIG. 11, when the radius of the CD-R is assigned "R," the width of the images to be arranged is assigned "w," the aspect (height/width) of the images to be arranged is assigned "a," and the center of the CD-R is set as an origin, Equation 8 given below is derived:

$$R=w+aw/(2*\tan(\Pi/k)) \qquad \text{Equation 8}$$

That is, $$w=R/\{1+a/(2\tan(\Pi/k))\} \qquad \text{Equation 9}$$

Accordingly, the coordinate "(x, y)" of the center "Ic" of the t-th image is expressed by Equation 10 given below:

$$x=(R-w/2)*\cos(2t\Pi/k)$$

$$y=(R-w/2)*\sin(2t\Pi/k) \qquad \text{Equation 10}$$

where t=0, 1, ..., k−1

Therefore, the image is rotated by "2×t×Π/k" and is arranged at this position.

With the method described above, the image processing apparatus in this embodiment is capable of arranging images concentrically so that one side of each image is across the circumference of a circle. As described above, the image processing apparatus in this embodiment is capable of, when arranging images concentrically with respect to a circular label, generating image data (post-arrangement image data) where the images have been automatically arranged so that a part of each image is across the circumference of the circle and the respective images do not overlap each other through automatic adjustment of the sizes, arrangement intervals, distances from a center, and angles of the images in accordance with how many images have been selected.

Third Embodiment

The first and second embodiments have been described based on the premise that images do no overlap each other. In this third embodiment, a layout is adopted in which images are allowed to overlap each other so long as the overlapping does not occur at one sides of the images (with overlapping, in a single circle manner). That is, images are arranged so that peripheral portions at sides other than specific one side of the images are allowed to overlap each other, thereby making it possible to see peripheral portions at the specific one side of the images.

It should be noted here that the hardware construction of the image processing apparatus in this third embodiment is the same as that of the image processing apparatus in the first embodiment shown in FIG. 1, so that the description thereof will be omitted. Also, process steps for label print of the image processing apparatus in this third embodiment and GUIs displayed in the respective process steps are the same as the process steps for the label print of the image processing apparatus in the first embodiment shown in FIG. 2 and the GUIs shown in FIGS. 3 to 6, so that the description thereof will be omitted.

Figure 12:
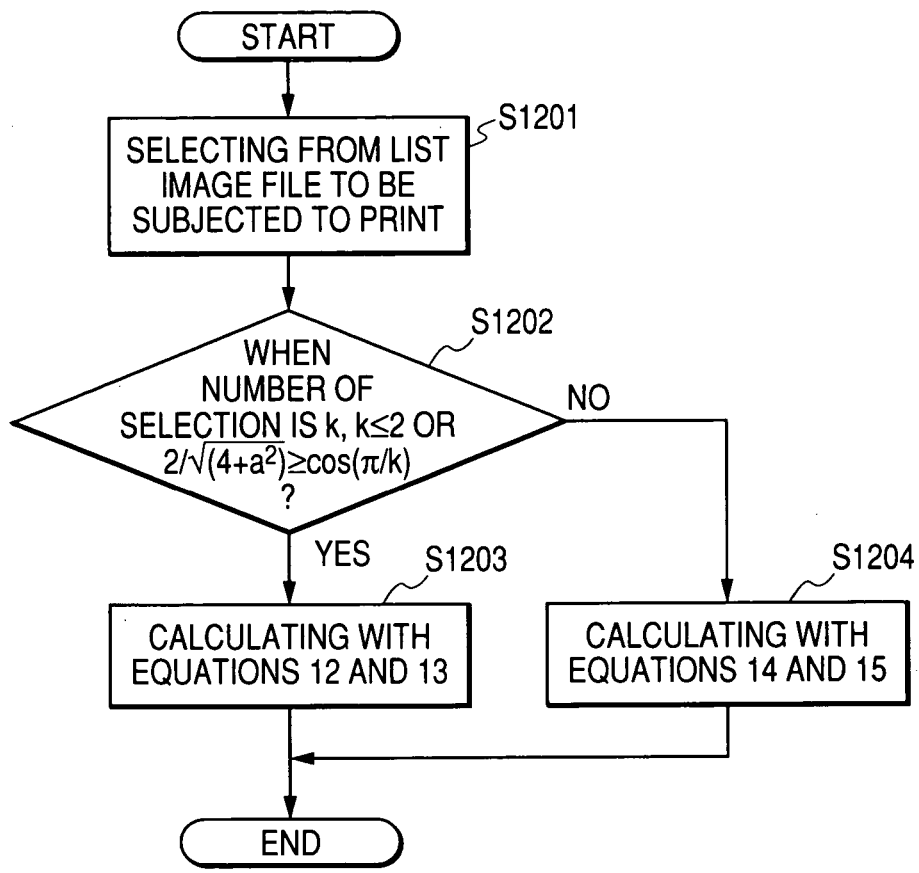
FIG. 12 is a flowchart showing an operation of automatic layout in an image processing apparatus of a third embodiment.

A layout method of this embodiment will be described below with which images are concentrically arranged on a label of a CD-R so as to overlap each other. FIG. 12 is a flowchart showing an operation of automatic layout in the image processing apparatus of this third embodiment. Note that processing in step S1201 shown in FIG. 12 corresponds to the processing in step S201 shown in FIG. 2 and automatic layout processing in steps S1202 to S1204 shown in FIG. 12 corresponds to a part of the processing in step S203 shown in FIG. 2.

As shown in FIG. 12, first, in step S1201, the image processing apparatus selectively reads, from the secondary storage 103, each image file to be subjected to print selected by the user through the screen shown in FIG. 3. Next, in step S1202, when the total number of the selected images is assigned "k," the image processing apparatus judges whether "k" is equal to or smaller than "2" or a condition expressed by Equation 11 given below is satisfied:

$$2/\sqrt{(4+\alpha^2)} \geq \cos(\pi/k) \qquad \text{Equation 11}$$

If "k" is equal to or smaller than "2" or the condition expressed by Equation 11 given above is satisfied (Yes in step S1202), the processing proceeds to step S1203 in which the image processing apparatus performs calculation with Equations 12 and 13 to be described later.

On the other hand, if "k" is greater than "2" and the condition expressed by Equation 11 described above is not satisfied (No in step S1202), the processing proceeds to step S1204 in which the image processing apparatus performs calculation with Equations 14 and 15 to be described later.

First, calculation processing with Equations 12 and 13 executed in step S1203 if a result of the judgment in step S1202 is positive will be described.

Here, as shown in FIG. 8, when the radius of a CD-R is assigned "R," the width of the images to be arranged is assigned "w," the aspect (height/width) of the images to be arranged is assigned "a," and the center of the CD-R is set as an origin, the following equation is derived:

$$R^2 = w^2 + (aw/2)^2$$

Accordingly, the width "w" of the images to be arranged is expressed by Equation 12 given below:

$$w = 2R/\sqrt{(4+\alpha^2)} \qquad \text{Equation 12}$$

Also, the coordinate "(x, y)" of the center "Ic" of the t-th image to be arranged is expressed by Equation 13 given below:

$$x = w \cos(2t\Pi/k)/2$$

$$y = w \sin(2t\Pi/k)/2 \qquad \text{Equation 13}$$

where t=0, 1, . . . , k−1.

Therefore, the image is rotated by 2tΠ/k and is arranged so that its center "Ic" is positioned at the coordinate "(x, y)."

Next, calculation processing using Equations 14 and 15 executed in step S1204 if the judgment result in step S1202 is negative will be described.

Figure 13:
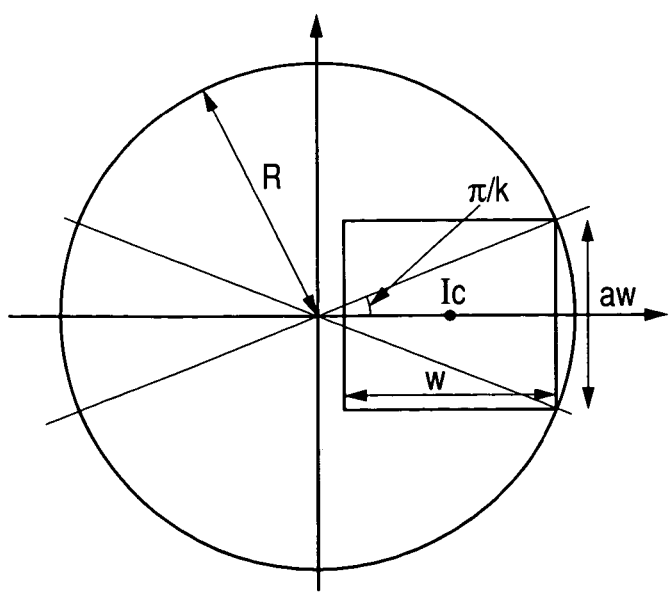
FIG. 13 shows the radius "R" of a CD-R, the width "w" of images to be arranged, and the aspect and angles of the images to be arranged in the case where the images are arranged within a circle so as to overlap each other.

Here, as shown in FIG. 13, when the radius of the CD-R is assigned "R," the width of the images to be arranged is assigned "w," the aspect (height/width) of the images to be arranged is assigned "a," and the center of the CD-R is set as an origin, the following equation is derived:

$$R \sin(\Pi/k) = aw/2$$

Therefore:

$$w = 2*R*\sin(\Pi/k)/a \qquad \text{Equation 14}$$

Therefore, the coordinate "(x, y)" of the center "Ic" of the t-th image is expressed by Equation 15 given below:

$$x = (R\cos(\Pi/k) - R\sin(\Pi/k)/a)\cos(2t\Pi/k)$$

$$y = (R\cos(\Pi/k) - R\sin(\Pi/k)/a)\sin(2t\Pi/k) \qquad \text{Equation 15}$$

where t=0, 1, . . . , k−1.

Therefore, the image is rotated by 2tΠ/k and is arranged at this position.

With the method described above, the image processing apparatus in this embodiment is capable of laying out images within a circular label of a CD-R so as to overlap each other.

Fourth Embodiment

In the third embodiment described above, a layout has been described in which images are allowed to overlap each other in a circle of a CD-R so long as the overlapping does not occur at one side of each image. In this fourth embodiment, one side of each image is arranged outside a circle and other sides thereof are allowed to overlap each other (with overlapping, with no outer radius frame, in a single circle manner).

It should be noted here that the hardware construction of the image processing apparatus in this fourth embodiment is the same as that of the image processing apparatus in the first embodiment shown in FIG. 1, so that the description thereof will be omitted. Also, process steps for label print of the image processing apparatus in this fourth embodiment and GUIs displayed in the respective process steps are the same as the process steps for the label print of the image processing apparatus in the first embodiment shown in FIG. 2 and the GUIs shown in FIGS. 3 to 6, so that the description thereof will be omitted.

Figure 14:
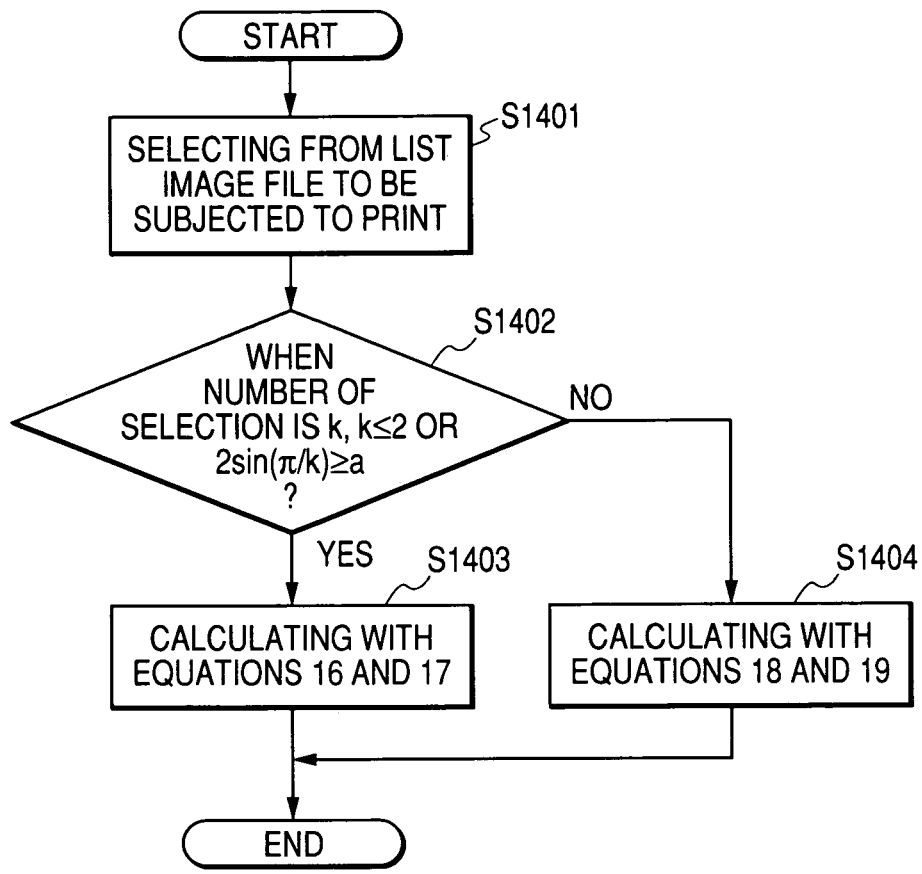
FIG. 14 is a flowchart showing an operation of automatic layout in an image processing apparatus of a fourth embodiment.

A layout method of this embodiment will be described below with which images are concentrically arranged so as to overlap each other. FIG. 14 is a flowchart showing an operation of automatic layout in the image processing apparatus of this fourth embodiment. Note that processing in step S1401 shown in FIG. 14 corresponds to the processing in step S201 shown in FIG. 2 and automatic layout processing in steps S1402 to S1404 shown in FIG. 14 corresponds to a part of the processing in step S203 shown in FIG. 2.

As shown in FIG. 14, first, in step S1401, the image processing apparatus selectively reads, from the secondary storage 103, each image file to be subjected to print selected by a user through the screen shown in FIG. 3. Next, in step S1402, when the total number of the selected images is assigned "k," the image processing apparatus judges whether "k" is equal to or smaller than "2" or a condition expressed by Equation 15.5 given below is satisfied:

$$2\sin(\Pi/k) \geq a \qquad \text{Equation 15.5}$$

If "k" is equal to or smaller than "2" or the condition expressed by Equation 15.5 given above is satisfied (Yes in step S1402), the processing proceeds to step S1403 in which the image processing apparatus performs calculation with Equations 16 and 17 to be described later.

On the other hand, if "k" is greater than "2" and the condition expressed by Equation 15.5 given above is not satisfied (No in step S1402), the processing proceeds to step S1404 in which the image processing apparatus performs calculation with Equations 18 and 19 to be described later.

First, calculation processing with Equations 16 and 17 executed in step S1403 if the judgment result in step S1402 is positive will be described.

Here, as shown in FIG. 16, when the radius of a CD-R is assigned "R," the width of the images to be arranged is assigned "w," the aspect (height/width) of the images to be arranged is assigned "a," and the center of the CD-R is set as an origin, the width "w" of the images to be arranged is expressed by Equation 16 given below:

$$w=R \qquad \text{Equation 16}$$

Also, the coordinate "(x, y)" of the center "Ic" of the t-th image to be arranged is expressed by Equation 17 given below:

$$x=w\cos(2t\Pi/k)/2$$

$$y=w\sin(2t\Pi/k)/2 \qquad \text{Equation 17}$$

where t=0, 1, . . . , k−1.

Therefore, the image is rotated by 2tΠ/k and is arranged so that its center "Ic" is positioned at the coordinate "(x, y)."

Next, calculation processing with Equations 18 and 19 executed in step S1404 if the judgment result in step S1402 is negative will be described.

Figure 15:
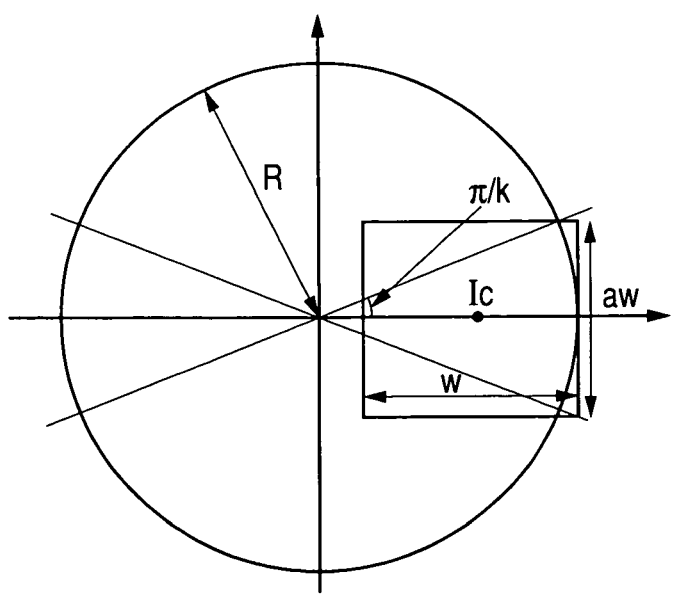
FIG. 15 shows the radius "R" of a CD-R, the width "w" of images to be arranged, and the aspect and angles of the images to be arranged in the case where the images are arranged so as to overlap each other and extend off a circle.

Here, as shown in FIG. 15, when the radius of the CD-R is assigned "R," the width of the images to be arranged is assigned "w," the aspect (height/width) of the images to be arranged is assigned "a," and the center of the CD-R is set as an origin, the following equation is derived:

$$R\sin(\Pi/k)=aw/2$$

Therefore:

$$w=R\sin(\Pi/k)/a \qquad \text{Equation 18}$$

Accordingly, the coordinate "(x, y)" of the center "Ic" of the t-th image is expressed by Equation 19 given below:

$$x=(R-w/2)*\cos(2t\Pi/k)$$

$$y=(R-w/2)*\sin(2t\Pi/k) \qquad \text{Equation 19}$$

where t=0, 1, . . . , k−1.

Therefore, the image is rotated by 2tΠ/k and is arranged at this position.

With the method described above, the image processing apparatus in this embodiment is capable of concentrically laying out images so that the images overlap each other and one side of each image is across the circumference of a circle.

Examples of the image arrangements described in the first to fourth embodiments are shown in FIGS. 17A to 17D, respectively. Also, a construction may be obtained with which it is possible for a user to select any one of the arrangements described in the first to fourth embodiments in accordance with his/her preference.

Fifth Embodiment

In the first to fourth embodiments described above, a layout has been described in which images are arranged so as to form a single circle. In this fifth embodiment, a layout will be described in which images are arranged on a CD-R at equal intervals so that the images form multiple circles, overlap each other, and are across the circumference of a label of the CD-R (with overlapping, outside a circle, in a multiple circle manner).

It should be noted here that the hardware construction of the image processing apparatus in this fifth embodiment is the same as that of the image processing apparatus in the first embodiment shown in FIG. 1, so that the description thereof will be omitted. Also, process steps for label print of the image processing apparatus in this fifth embodiment and GUIs displayed in the respective process steps are the same as the process steps for the label print of the image processing apparatus in the first embodiment shown in FIG. 2 and the GUIs shown in FIGS. 3 to 6, so that the description thereof will be omitted.

Figure 18:
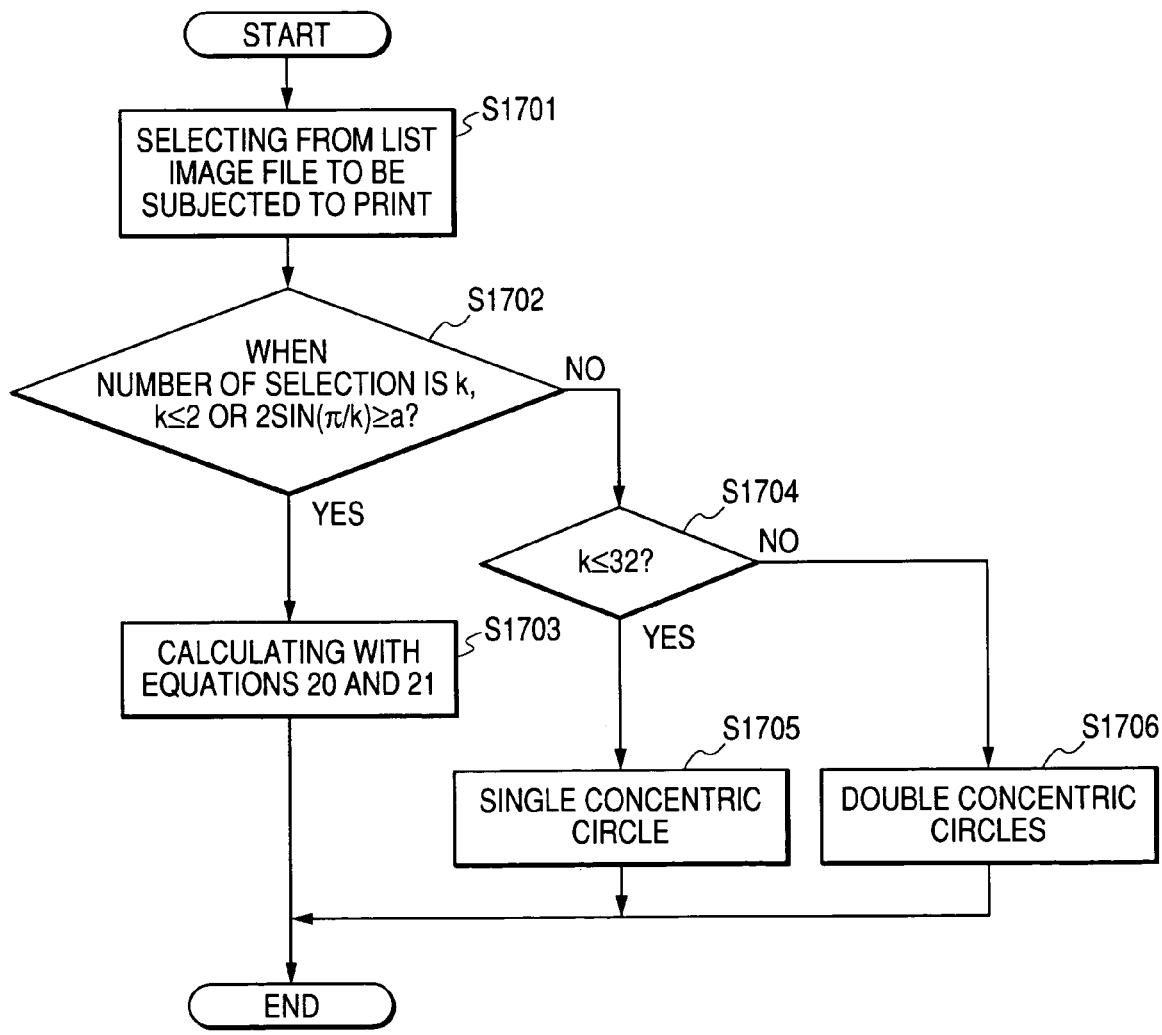
FIG. 18 is a flowchart showing an operation of automatic layout in an image processing apparatus of a fifth embodiment.

A layout method of this embodiment will be described below with which images are arranged on a CD-R at certain intervals so that the images form multiple circles, overlap each other, and are across the circumference of a label of the CD-R. FIG. 18 is a flowchart showing an operation of automatic layout in the image processing apparatus of this fifth embodiment. Note that processing in step S1701 shown in FIG. 18 corresponds to the processing in step S201 shown in FIG. 2 and automatic layout processing in steps S1702 to S1706 shown in FIG. 18 corresponds to a part of the processing in step S203 shown in FIG. 2.

First, in step S1701, the image processing apparatus selectively reads each image to be subjected to print selected by a user through the print target image designation screen shown in FIG. 3. Next, in step S1702, when the total number of the selected images is assigned "k," the image processing apparatus judges whether "k" is equal to smaller than "2" or a condition expressed by Equation 1A given below is satisfied:

$$2\sin(\Pi/k) \geq a \qquad \text{Equation 1A}$$

If "k" is equal to smaller than "2" or the condition expressed by Equation 1A given above is satisfied (Yes in step S1702), the processing proceeds to step S1703 in which the image processing apparatus performs calculation with Equations 20 and 21 to be described later.

On the other hand, if "k" is greater than "2" and the condition expressed by the above equation is not satisfied (No in step S1702), the processing proceeds to step S1704.

First, processing of the image processing apparatus in step S1703 will be described.

Figure 19:
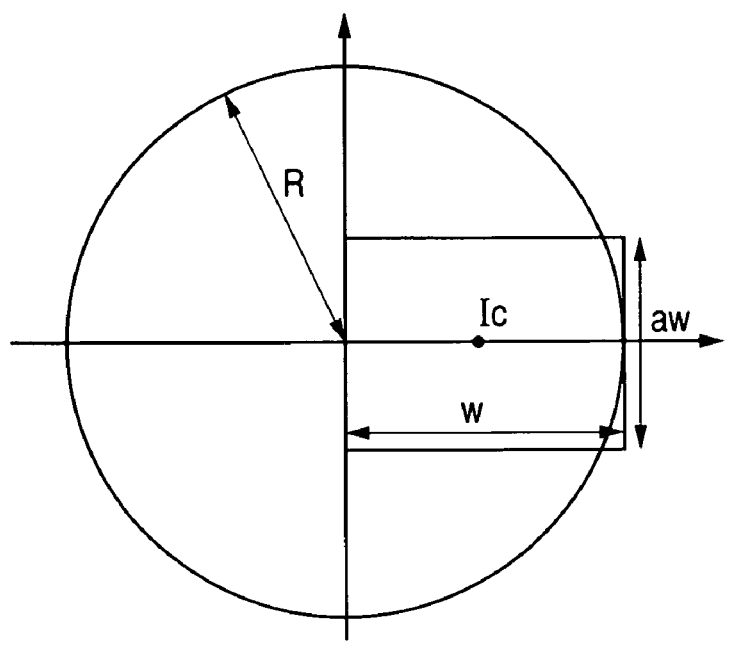
FIG. 19 shows the radius "R" of a CD-R, the width "w" of images to be arranged, and the aspect of the images to be arranged in the case where the images are arranged so as to extend off a circle.

Here, as shown in FIG. 19, when the radius of a CD-R is assigned "R," the width of the images to be arranged is assigned "w," the aspect (height/width) of the images to be arranged is assigned "a," and the center of the CD-R is set as an origin, the width "w" of the images to be arranged is expressed by Equation 20 given below:

$$w=R \qquad \text{Equation 20}$$

Also, the coordinate "(x, y)" of the center "Ic" of the t-th image to be arranged is expressed by Equation 21 given below:

$$x=w\cos(2t\Pi/k)/2$$
$$y=w\sin(2t\Pi/k)/2) \qquad \text{Equation 21}$$

where t=0, 1, . . . , k−1.

Therefore, the image is rotated by 2tΠ/k and is arranged so that its center "Ic" is positioned at the coordinate "(x, y)."

Also, if the processing proceeds to step S1704 and the number of images "k" is equal to or smaller than "32" (Yes in step S1704), processing in step S1705 is executed next. On the other hand, if the number "k" is greater than "32" (No in step S1704), processing in step S1706 is executed next.

First, calculation in step S1705 will be described.

Figure 20:
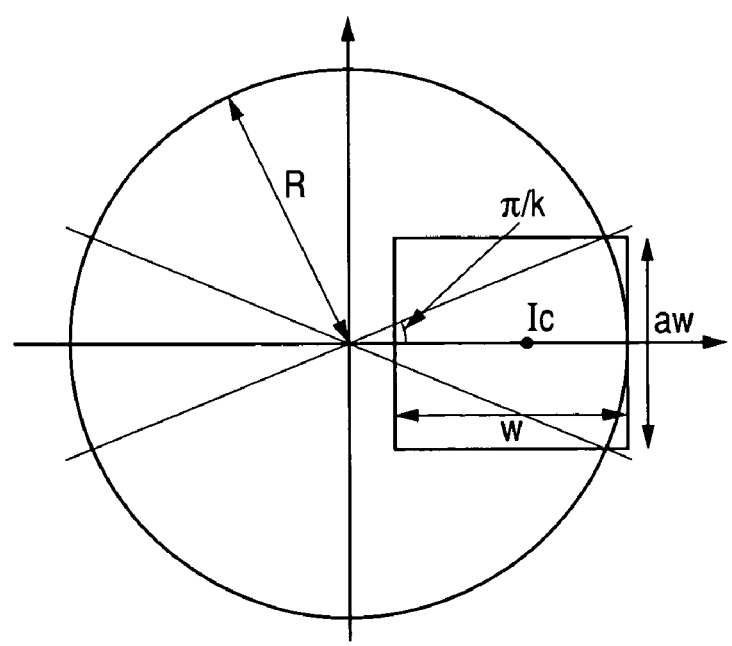
FIG. 20 shows the radius "R" of a CD-R, the width "w" of images to be arranged, and the aspect and angles of the images to be arranged in the case where the images are arranged so as to overlap each other and extend off a circle.

Here, as shown in FIG. 20, when the radius of the CD-R is assigned "R," the width of the images to be arranged is assigned "w," the aspect (height/width) of the images to be arranged is assigned "a," and the center of the CD-R is set as an origin, the following equation is derived:

$$R\sin(\Pi/k)=aw/2$$

Therefore, the width "w" of the images to be arranged is expressed by Equation 22 given below:

$$w=R\sin(\Pi/k)/a \qquad \text{Equation 22}$$

Accordingly, the coordinate "(x, y)" of the center "Ic" of the t-th image is expressed by Equation 23 given below:

$$x=(R-w/2)*\cos(2t\Pi/k)$$
$$y=(R-w/2)*\sin(2t\Pi/k) \qquad \text{Equation 23}$$

where t=0, 1, . . . , 24.

Next, calculation in step S1706 will be described. In this case, the images are arranged so as to form double concentric circles.

Figure 21:
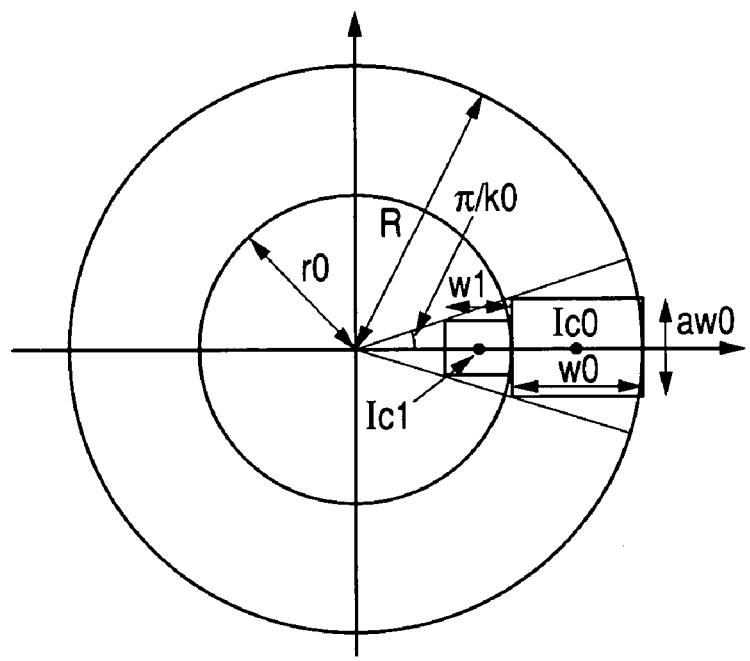
FIG. 21 shows the radius "R" of a CD-R, the width "w" of images to be arranged, and the aspect and angles of the images to be arranged in the case where the images are arranged so as to form multiple concentric circles.

Here, as shown in FIG. 21, the radius of the CD-R is assigned "R," the width of the images to be arranged so as to form an outer circle is assigned "w0," the aspect (height/width) of the images to be arranged is assigned "a," and the center of the CD-R is set as an origin. In addition, it is preferable that the numbers of images forming the respective concentric circles are approximately equal to each other, so that when the number of images to be arranged so as to form the outer circle is assigned "k0" and the number of images to be arranged so as to form an inner circle is assigned "k1," "k0" and "k1" become as follows:

$$k0=(k+1)/2$$
$$k1=k-k0$$

Accordingly, the size "w0" and the coordinates "(x0, y0)" of the center positions "Ic0" of the images to be arranged so as to form the outer circle are expressed by Equations 24 and 25 given below:

$$w0=2R\sin(\Pi/k0)/a \qquad \text{Equation 24}$$
$$x0=(R-R*\sin(\Pi/k0)/a)\sin(2t\Pi/k0)$$
$$y0=(R-R*\sin(\Pi/k0)/a)\cos(2t\Pi/k0) \qquad \text{Equation 25}$$

where t=0, 1, 2, . . . , k0−1.

Therefore, each image is rotated by 2tΠ/k0 and is arranged at this position.

Here, if "r0=R−2*R*sin(Π/k0)/a," the size "w1" and coordinates "(x1, y1)" of the center positions "Ic1" of the images to be arranged so as to form the inner circle are expressed by Equations 26 and 27 given below:

$$w1=2*R0*\sin(\Pi/k0)/a \qquad \text{Equation 26}$$
$$x1=(r0-r0*\sin(\Pi/k0)/a)\sin(2t\Pi/k1)$$
$$y1=(r0-r0*\sin(\Pi/k0)/a)\cos(2t\Pi/k1) \qquad \text{Equation 27}$$

where t=0, 1, 2, . . . , k1−1.

Therefore, each image is rotated by 2tΠ/k1 and is arranged at this position.

Figure 22:
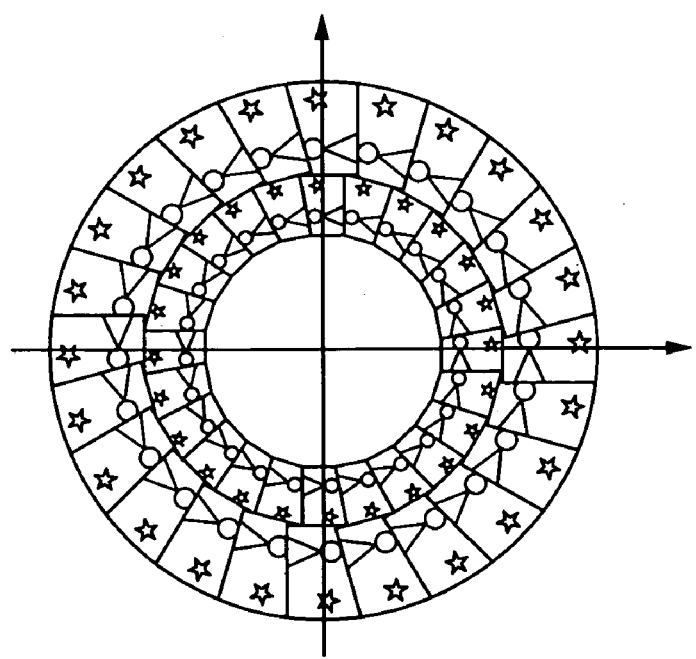
FIG. 22 shows an example of an image arrangement according to the fifth embodiment.

With the method described above, it becomes possible to arrange images so as to form double concentric circles such as the concentric circles shown in FIG. 22.

Also, when the images are arranged so as to form triple concentric circles, if it is assumed that "k0=(k+2)/2," "k1=(k+2)/2," "k2=k−k0−k1," the width "w0" and the coordinates "(x0, y0)" of the center positions "Ic0" of the images to be arranged so as to form the outermost concentric circle are expressed by Equations 28 and 29 given below:

$$w0=2R\sin(\Pi/k0)/a \qquad \text{Equation 28}$$
$$x0=(R-R*\sin(\Pi/k0)/a)\sin(2t\Pi/k0)$$
$$y0=(R-R*\sin(\Pi/k0)/a)\cos(2t\Pi/k0) \qquad \text{Equation 29}$$

where t=0, 1, 2, . . . , k0−1.

Therefore, each image is rotated by 2tΠ/k0 and is arranged at this position.

Next, the size and positions of the images to be arranged so as to form the second outermost concentric circle will be described.

Assuming that "r0=R−2*R*sin(Π/k0)/a," the width "w1" and the coordinates "(x1, y1)" of the center positions "Ic1" of the images to be arranged so as to form the second outermost concentric circle are calculated from Equations 30 and 31 given below:

$$w1=2*r0*\sin(\Pi/k0)/a \qquad \text{Equation 30}$$
$$x1=(r0-r0*\sin(\Pi/k0)/a)\sin(2t\Pi/k1)$$
$$y1=(r0-r0*\sin(\Pi/k0)/a)\cos(2t\Pi/k1) \qquad \text{Equation 31}$$

where t=0, 1, 2, . . . , k1−1.

Therefore, each image is rotated by 2tΠ/k1 and is arranged at this position.

Next, the size and positions of the images to be arranged so as to form the third outermost concentric circle will be described.

Assuming that "r1=r0−2*r0*sin(Π/k0)/a," the width "w2" and the coordinates "(x2, y2)" of the center positions "Ic2" of the images to be arranged so as to form the third outermost concentric circle are calculated from Equations 32 and 33 given below:

$$w2=2*r1*\sin(\Pi/k0)/a \qquad \text{Equation 32}$$

$$x2=(r1-r1*\sin(\Pi/k0)/a)\sin(2t\Pi/k2)$$

$$y2=(r1-r1*\sin(\Pi/k0)/a)\cos(2t\Pi/k2) \qquad \text{Equation 33}$$

where t=0, 1, 2, ..., k2−1.

Therefore, each image is rotated by 2tΠ/k2 and is arranged at this position.

By performing the processing shown in FIG. 18 in the manner described above, the image processing apparatus in this embodiment is capable of determining the number of concentric circles to be formed in accordance with the number of images selected and creating image data (post-arrangement image data) where the images have been automatically arranged with respect to the circle of a CD-R through automatic adjustment of the sizes, arrangement intervals, distances from a center, and angles of the images.

Sixth Embodiment

In the fifth embodiment, a layout has been described in which images are arranged so as to form multiple concentric circles, overlap each other, and be across the circumference of a label of a CD-R on one side of each image forming the outermost circle. In this sixth embodiment, a layout will be described in which the whole of each image is necessarily contained within the circumference of a label of a CD-R and the respective images do not overlap each other (without overlapping, within a circle, in a multiple circle manner).

It should be noted here that the hardware construction of the image processing apparatus in this sixth embodiment is the same as that of the image processing apparatus in the first embodiment shown in FIG. 1, so that the description thereof will be omitted. Also, process steps for label print of the image processing apparatus in this sixth embodiment and GUIs displayed in the respective process steps are the same as the process steps for the label print of the image processing apparatus in the first embodiment shown in FIG. 2 and the GUIs shown in FIGS. 3 to 6, so that the description thereof will be omitted.

Figure 23:
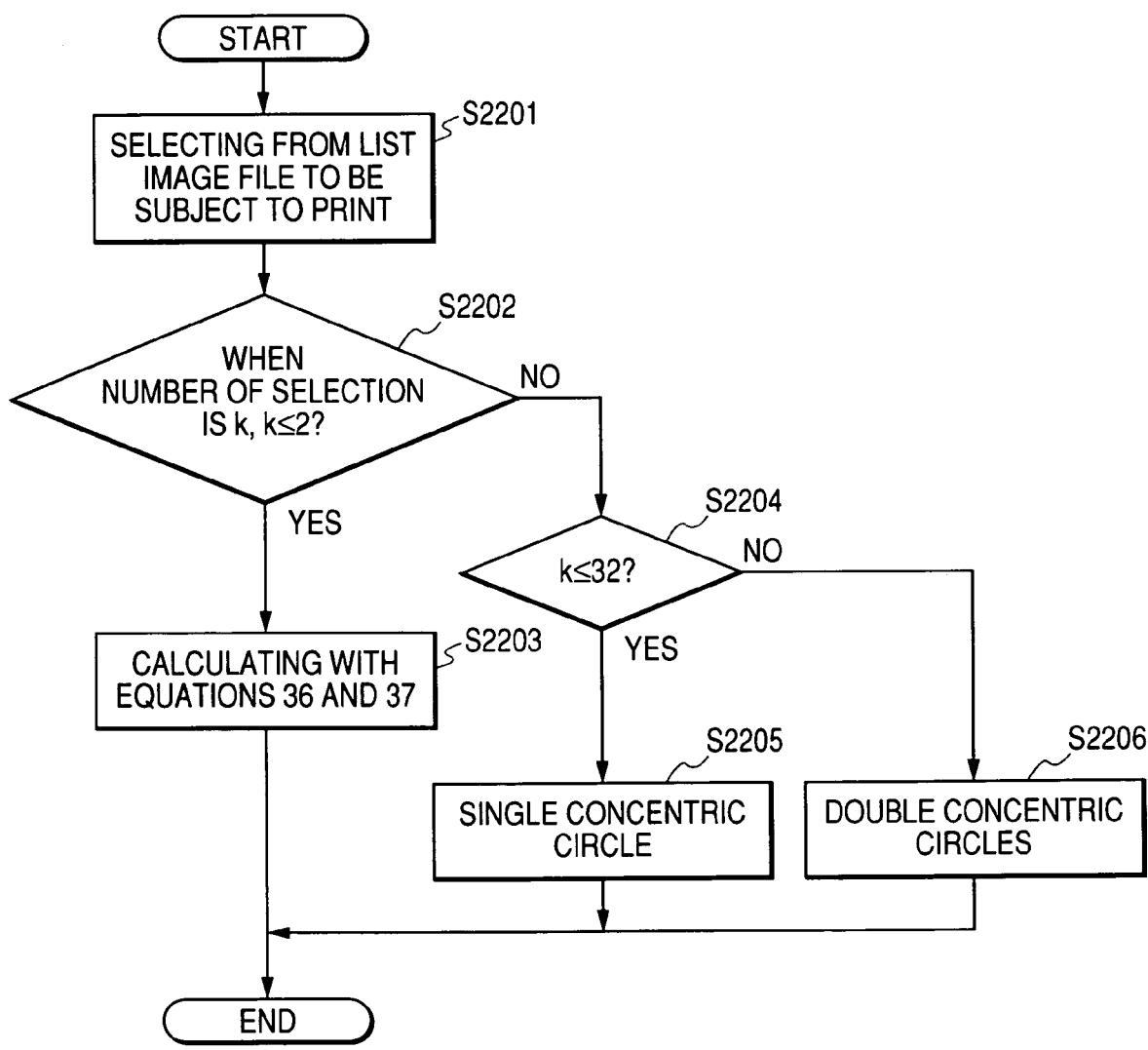
FIG. 23 is a flowchart showing an operation of automatic layout in an image processing apparatus of a sixth embodiment.

A layout method of this embodiment will be described below with which images are arranged on a CD-R at certain intervals so that the images form multiple circles, do not overlap each other, and are not across the circumference of a label of the CD-R. FIG. 23 is a flowchart showing an operation of automatic layout in the image processing apparatus of this sixth embodiment. Note that automatic layout processing shown in FIG. 23 is a part of the processing in step S203 shown in FIG. 2.

First, in step S2201, the image processing apparatus selectively reads each image to be subjected to print selected by a user through the screen in FIG. 3. Next, in step S2202, when the total number of the selected images is assigned "k," the image processing apparatus judges whether "k" is equal to or smaller than "2." If "k" is equal to or smaller than "2" (Yes in step S2202), the processing proceeds to step S2203 in which the image processing apparatus performs calculation with Equations 36 and 37 to be described later. On the other hand, if "k" is greater than "2" (No in step S2202), the processing proceeds to step S2204.

Now, processing of the image processing apparatus in step S2203 will be described.

Here, as shown in FIG. 8, when the radius of a CD-R is assigned "R," the width of the images to be arranged is assigned "w," the aspect (height/width) of the images to be arranged is assigned "a," and the center of the CD-R is set as an origin, the following equation is derived:

$$R^2=w^2+(aw/2)^2$$

Therefore, the width "w" of each image to be arranged is expressed by Equation 36 given below:

$$w=2R/\sqrt{(4+\alpha^2)} \qquad \text{Equation 36}$$

Also, the coordinate "(x, y)" of the center "Ic" of the image to be arranged is expressed by Equation 37 given below:

$$x=w\cos(2t\Pi/k)/2$$

$$y=w\sin(2t\Pi/k)/2 \qquad \text{Equation 37}$$

where t=0, 1, ..., k−1.

Therefore, the image is rotated by 2tΠ/k and is arranged at this position.

On the other hand, in step S2204, the image processing apparatus judges whether the number "k" of the selected images is equal to or smaller than "32." If "k" is equal to or smaller than "32" (Yes in step S2204), the processing proceeds to step S2205. On the other hand, if "k" is greater than "32" (No in step S2204), the processing proceeds to step S2206.

First, calculation in step S2205 will be described. In step S2205, the width "w" of each image to be arranged is expressed by Equation 38 given below:

$$w=R/\sqrt{(\alpha^2/4+(1+\alpha/2\tan(\pi/k))^2)} \qquad \text{Equation 38}$$

Also, the coordinate "(x, y)" of the center "Ic" of the image to be arranged is expressed by Equation 39 given below:

$$x=(w/2+aw/2\tan(\Pi/k))*\cos(2t\Pi/k)$$

$$y=(w/2+aw/2\tan(\Pi/k))*\sin(2t\Pi/k) \qquad \text{Equation 39}$$

where t=0, 1, ..., k−1.

Therefore, the image is rotated by 2tΠ/k and is arranged at this position.

Next, calculation in step S2206 will be described. When the number "k" of the selected images is greater than "32", assuming that "k0=(k+1)/2" and "k1=k−k0," the width "w0" and position "Ic0" of each image to be arranged so as to form the outermost concentric circle is expressed by Equation 40 given below:

$$w0=r/\sqrt{\{\alpha^2/4+(1+\alpha/2\tan(\pi/k))^2\}} \qquad \text{Equation 40}$$

Also, the coordinate "(x0, y0)" of the center "Ic" of the image to be arranged is expressed by Equation 41 given below:

$$x0=(w0/2+aw0/2\tan(\Pi/k0))\cos(2t\Pi/k0)$$

$$y0=(w0/2+aw0/2\tan(\Pi/k0))\sin(2t\Pi/k0) \qquad \text{Equation 41}$$

where t=0, 1, 2, 3, 4, ..., k0−1.

Therefore, the image is rotated by 2tΠ/k0 and is arranged at this position.

Next, the size and position of each image to be arranged so as to form the second outermost circle will be described.

Assuming that "r0=R−R/$\sqrt{\{\alpha^2/4+(1+\alpha/2\tan(\pi/k))^2\}}$," the width "w1" and position "Ic1 (x1, y1)" of the image to be arranged so as to form the second outermost concentric circle are expressed by Equations 42 and 43 given below:

$$w1 = r0/\sqrt{\{\alpha^2/4 + (1+\alpha/2\tan(\pi/k))^2\}}$$ Equation 42

$$x1 = (w1/2 + aw1/2\tan(\Pi/k0))\cos(2t\Pi/k1)$$

$$y1 = (w1/2 + aw1/2\tan(\Pi/k0))\sin(2t\Pi/k1)$$ Equation 43 where t=0, 1, 2, 3, 4, . . . , k1−1.

Therefore, the image is rotated by 2tΠ/k1 and is arranged at this position.

Figure 24:
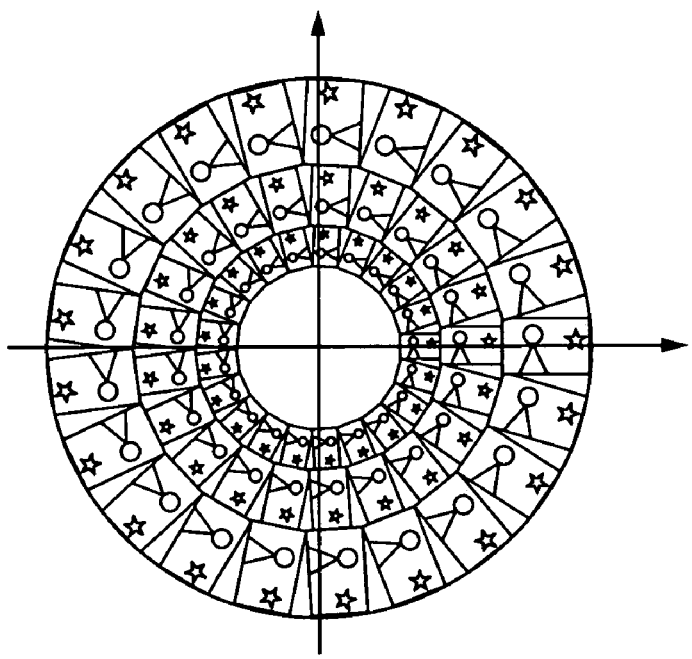
FIG. 24 shows an example of an image arrangement according to the sixth embodiment.

With the method described above, the image processing apparatus in this embodiment is capable of arranging images so that the images form triple concentric circles as shown in FIG. 24, are contained within the circumference of a label of a CD-R, and do not overlap each other. Also, like in the fifth embodiment, the image processing apparatus in this embodiment is applicable regardless of the number of concentric circles to be formed. That is, the image processing apparatus in this embodiment is capable of determining the number of concentric circles to be formed in accordance with the number of images selected and generating image data (post-arrangement image data) where the images have been automatically arranged so as to be contained within the circumference of a CD-R through automatic adjustment of the sizes, arrangement intervals, distances from a center, and angles of the images.

It should be noted here that in this embodiment, the number of concentric circles to be formed is determined in accordance with the number of images to be arranged, although the present invention is not limited to this and the number of the concentric circles to be formed may be determined in accordance with the width of each image that is currently arranged, for instance.

Seventh Embodiment

In the first to sixth embodiments described above, a layout has been described in which images are arranged concentrically. In this seventh embodiment, a layout will be described in which images are arranged spirally at equal angles (with overlapping, within a circle, in a spiral manner).

It should be noted here that the hardware construction of the image processing apparatus in this seventh embodiment is the same as that of the image processing apparatus in the first embodiment shown in FIG. 1, so that the description thereof will be omitted. Also, process steps for label print of the image processing apparatus in this seventh embodiment and GUIs displayed in the respective process steps are the same as the process steps for the label print of the image processing apparatus in the first embodiment shown in FIG. 2 and the GUIs shown in FIGS. 3 to 6, so that the description thereof will be omitted.

Figure 25:
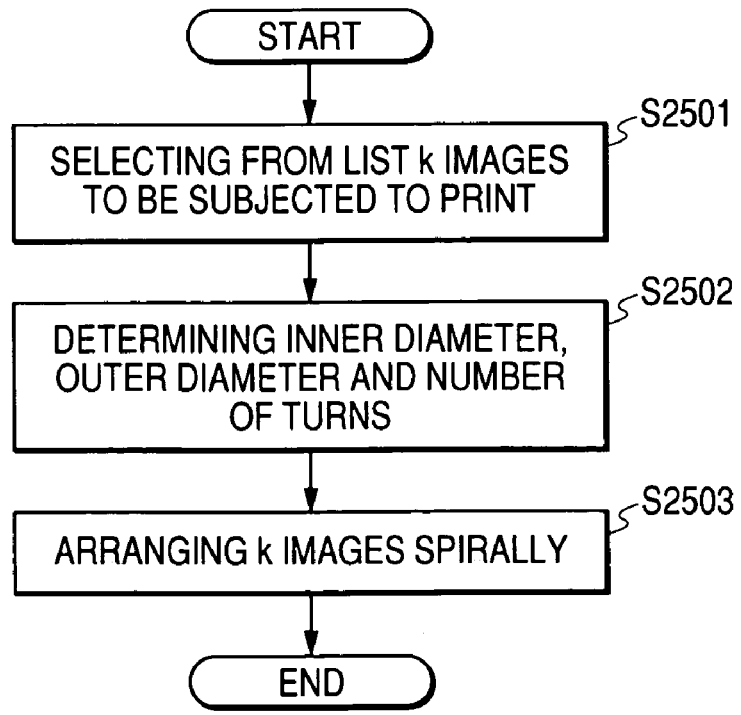
FIG. 25 is a flowchart showing an operation of automatic layout processing in an image processing apparatus of a seventh embodiment.

A layout method of this embodiment will be described below with which images are arranged within a label of a CD-R so as to form a spiral. FIG. 25 is a flowchart showing an operation of automatic layout processing in the image processing apparatus of this seventh embodiment. Note that processing in step S2501 shown in FIG. 25 corresponds to the processing in step S201 shown in FIG. 2 and automatic layout processing in steps S2502 and S2503 shown in FIG. 25 corresponds to a part of the processing in step S203 shown in FIG. 2.

First, in step S2501, the image processing apparatus selectively reads k images to be subjected to print selected by a user through the print target image designation screen shown in FIG. 3. Next, in step S2502, the image processing apparatus determines the inner diameter and the outer diameter of a CD-R and the number of turns of a spiral to be formed. Note that when predetermined values are applied as those values, this step S2502 becomes unnecessary.

Next, in step S2503, the image processing apparatus performs processing for arranging the images spirally. Next, the details of a method of calculating arrangement positions, at which the images are to be arranged spirally, will be described below. Generally, a spiral equation can be expressed as follows using a polar coordinate system "(r, θ)."

$$r = a\theta$$

Here, in the equation described above, "a" is a positive constant, "r" is a distance from an origin, and "θ" expresses a deflection angle.

Figure 26:
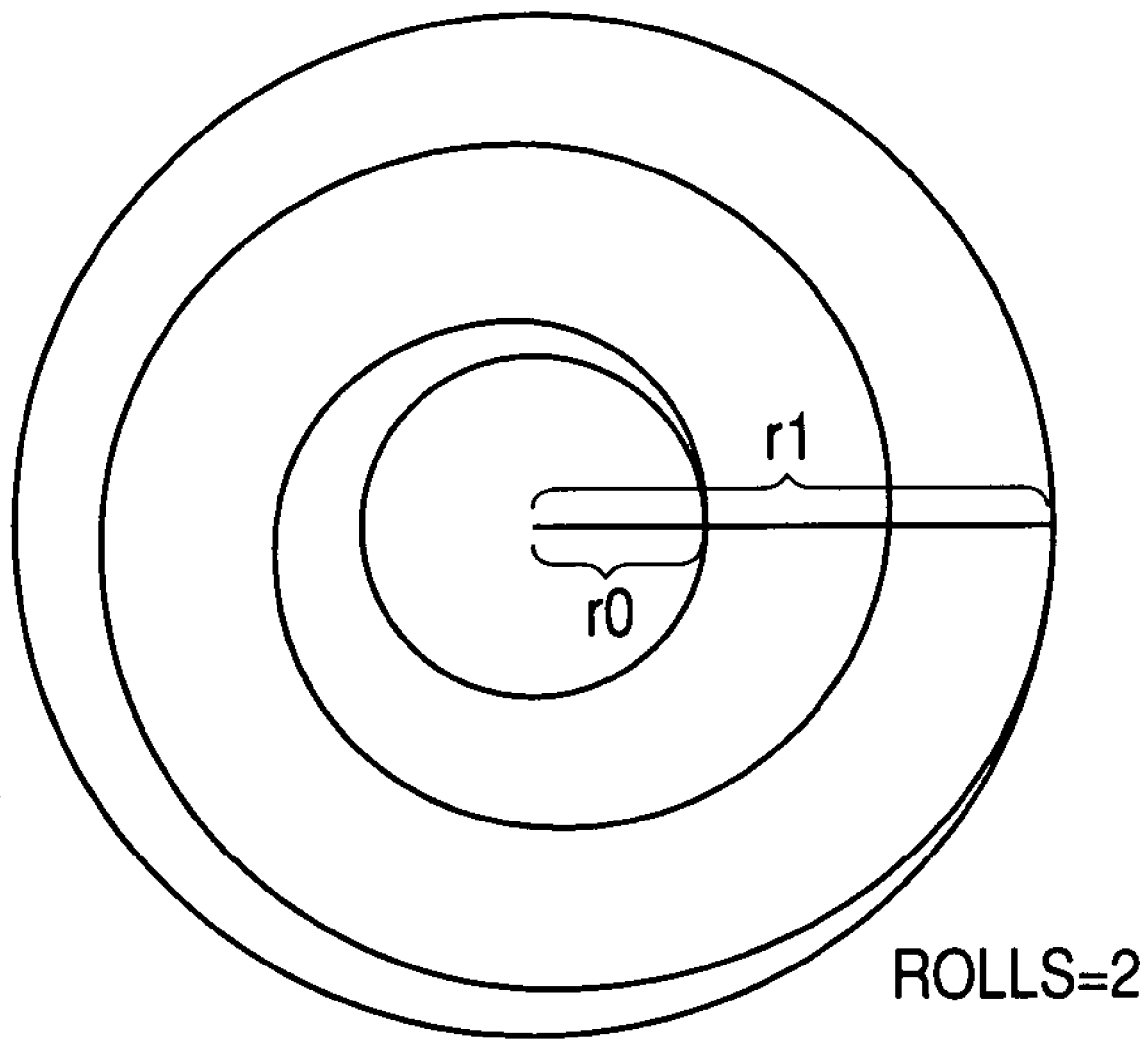
FIG. 26 shows a spiral example where an inner diameter is set at "r0," the outer diameter is set at "r1," and the number of turns of a spiral "Rolls" is set at "2;"

This embodiment is aimed at arranging images within a CD-R, so that the inner diameter and the outer diameter of the CD-R and the number of turns of a spiral are applied to calculation. FIG. 26 shows a spiral example where the inner diameter is set at "r0," the outer diameter is set at "r1," and the number of turns of the spiral is set at "Rolls" =2. Here, assuming that the inner diameter "r0," the outer diameter "r1," and the number of turns of the spiral "Rolls" are constants, the spiral equation can be expressed as follows using the polar coordinate system "(r, θ)."

$$r = r1 - a*\theta$$

Here, when "θ=2Π*Rolls," the following equation is derived:

$$r0 = r1 - a*2*\Pi*Rolls$$

That is, the constant "a" can be expressed as follows:

$$a = (r1 - r0)/(2*\Pi*Rolls)$$

Accordingly, when k images are arranged spirally, the coordinate of each image is obtained from the following equation:

$$r(t) = r1 - ((r1 - r0)/(2*\Pi*Rolls))\theta(t)$$

$$\theta(t) = (2*\Pi*Rolls*t)/k$$

where t=1, 2, . . . , k.

By rotating the image by θ(t) and arranging it at the position described above, it becomes possible to arrange the images spirally. When the images are not changed in size and are arranged as they are, however, there arises a problem in that the overlapping degrees of the images increase and it becomes difficult to see the images as a distance to the center of the circle is reduced. Also, there is another problem in that as the number of images to be arranged increases, the overlapping degrees of the images further increase and it becomes further difficult to see the images. In view of these problems, the size of each image to be arranged is increased in proportion to a distance from the center. In addition, the size of the image may be reduced in accordance with an increase in the number of the images to be arranged.

Figure 27:
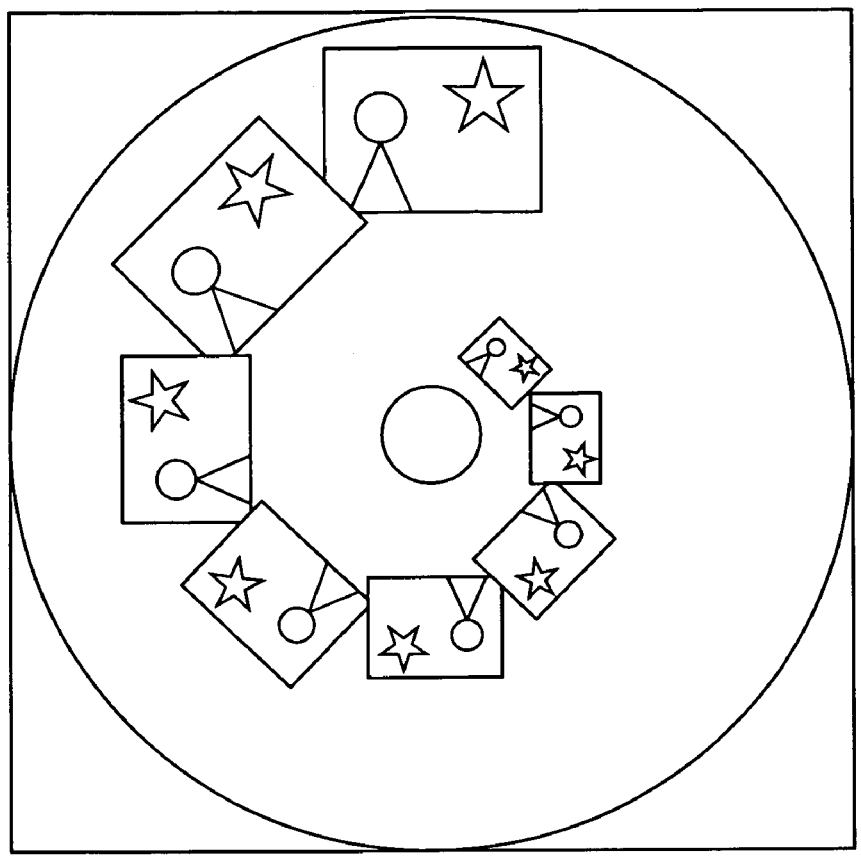
FIG. 27 shows an example of a spiral image arrangement according to the seventh embodiment.

As a result of the processing described above, the images are arranged spirally in a manner shown in FIG. 27.

It should be noted here that in this embodiment, the inner diameter, the outer diameter, and the number of turns are dealt with as constants, although the present invention is not limited to this and a construction may be used in which a user is capable of changing these values at will. In this case, when the inner diameter, the outer diameter, and/or the number of turns are/is changed, the arrangement of every image is calculated again without delay and a new arrangement is made. Also, the application of the inner diameter is not limited to the spiral arrangement, and the inner diameter may also be similarly applied to a case where images are arranged concentrically like in the first to sixth embodiments described above. In this case, it becomes possible to prevent a situation where the images are arranged within the inner diameter. Also, a method of arranging images up to the vicinity of the inner diameter is not limited to the spiral arrangement described above and, even in the case of the concentric arrangement, it is possible to display more images by clipping each already arranged image in a circular/oval shape inscribing the image.

Eighth Embodiment

In this eighth embodiment, a method will be described with which images are laid out so as to be arranged randomly within a CD. Note that the hardware construction of an image processing apparatus in this eighth embodiment is the same as the hardware construction of the image processing apparatus in the first embodiment shown in FIG. 1, so that the description thereof will be omitted. Also, process steps for label print of the image processing apparatus in this eighth embodiment and GUIs displayed at the process steps may be the same as the process steps for the label print of the image processing apparatus in the first embodiment shown in FIG. 2 and the GUIs shown in FIGS. 3 to 6.

Figure 28:
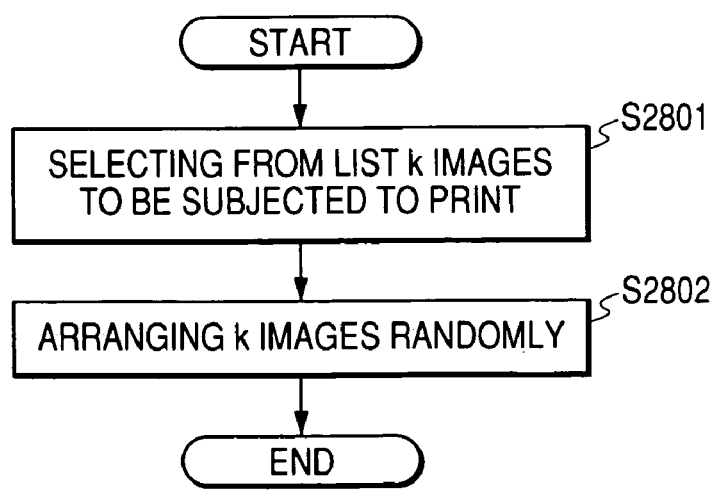
FIG. 28 is a flowchart showing an operation of automatic layout processing in an image processing apparatus of an eighth embodiment.

FIG. 28 is a flowchart showing an operation of automatic layout in the image processing apparatus of this eighth embodiment. Note that processing in step S2801 shown in FIG. 28 corresponds to the processing in step S201 shown in FIG. 2 and automatic layout processing in step S2802 shown in FIG. 28 corresponds to a part of the processing in step S203 shown in FIG. 2.

First, in step S2801, the image processing apparatus selectively reads k images to be subjected to print. Next, in step S2802, the image processing apparatus randomly arranges the k images. Next, a method of randomly arranging the images will be described in detail. As the random arrangement method, a method is conceivable with which the images are arranged randomly inside a square circumscribing a CD. In this case, however, the images are arranged also at the outside of the CD and the center portion of the CD, so that this is an extremely inefficient method. Therefore, in this embodiment, in accordance with an equation to be described later, the images are arranged randomly using a polar coordinate system. Further, in the case of a circle, the area of the circle increases as a distance to its circumference is reduced. Therefore, with consideration given to this fact, the number of images to be arranged is increased as the distance to the circumference is reduced.

That is, if the inner diameter is assigned "r0" and the outer diameter is assigned "r1," the position of the t-th image is expressed by the following equations:

$$r(t)=\sqrt{(r0^2+(r1^2-r0^2)*\text{Rand}())}$$

$$\theta(t)=R(t)+2*\Pi*\text{Rand}()/(k/2)+\text{Rand\_PI}()$$

Here, in the above equations, "Rand( )" is a function that generates a random number value that is equal to or greater than "0" and is smaller than "1." Also, "Rand_PI( )" is a function that generates a random number value in a range of "0" to "2Π." Further, "R(t)" is a function that outputs numbers "0, 2Π/k, 2Π*2/k, 2Π*3/k, . . . , 2Π*(k−1)/k" in a random order.

As a result of this processing, the images are arranged randomly using the polar coordinate system. Also, by means of the functions of "r(t)" and "θ(t)," images are arranged evenly and randomly within a doughnut shape sandwiched between the inner diameter and the outer diameter. Further, each image to be arranged is rotated by a random angle designated by the "Rand_PI( )" function and is arranged.

In addition, as the number of images selected is increased, the size of each image is reduced. The size of the image is determined in accordance with the following equation:

$$w=(\text{PI}/(\text{aspect}*k))^{1/\alpha}$$

Here, when the height and width of the image are respectively assigned "h" and "w," "aspect" is expressed as "h/w." Next, a value of "α" will be described. When "α=2," for instance, if overlapping of images does not occur, it is possible to fill the inside of a circumference with images. When the images are arranged randomly, however, the image overlapping occurs, so that it becomes possible to appropriately display more images by setting "α" to a value greater than "2."

Figure 29A:
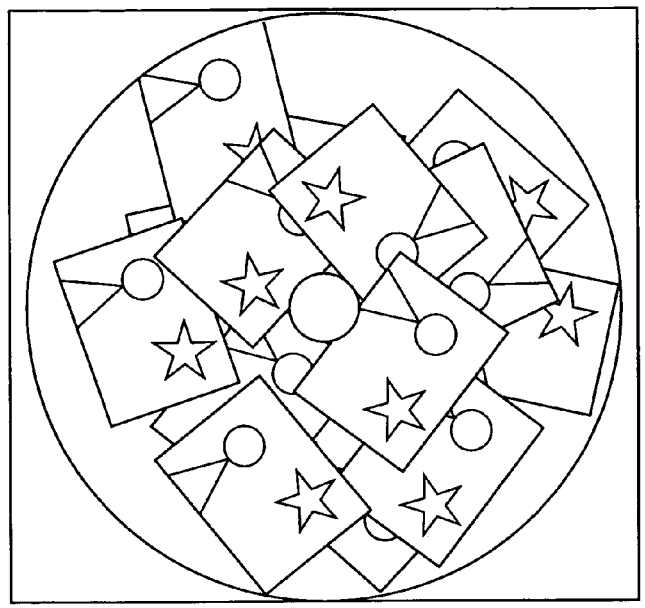
FIG. 29A shows an image arrangement example where 15 images have been arranged randomly.
Figure 29B:
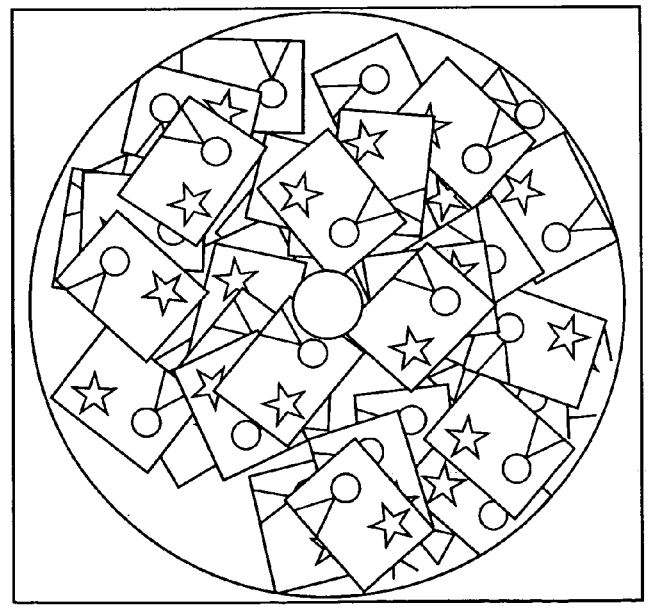
FIG. 29B shows an image arrangement example where 50 images have been arranged randomly.

With the equations described above, even if many images have been selected, it is possible to arrange the images by reducing the sizes thereof. For instance, FIG. 29A shows an example of an image arrangement where 15 images have been arranged randomly. Also, FIG. 29B shows an example of an image arrangement where 50 images have been arranged randomly. As can be understood through comparison of these drawings, the image processing apparatus sets the size of each image appropriately in accordance with the total number of images to be arranged.

With the method described above, it becomes possible to arrange images randomly in a space between the inner diameter and the outer diameter of a CD-R. Also, even after a random layout is generated, it is possible to generate another random layout by selecting the "Rand" function again through "re-arrangement" or the like. Further, when each image is clipped in a circular/oval shape inscribing the image, it becomes possible to display more images.

Ninth Embodiment

In this ninth embodiment, a method will be described with which a load of processing is alleviated using images that each have a resolution (=image size) appropriate to an image layout and a print resolution. Note that the hardware construction of an image processing apparatus in this ninth embodiment is the same as the hardware construction of the image processing apparatus in the first embodiment shown in FIG. 1, so that the description thereof will be omitted. Also note that process steps for label print of the image processing apparatus in this ninth embodiment are the same as the process steps for the label print of the image processing apparatus in the first embodiment shown in FIG. 2, so that the description thereof will be omitted.

In the first to eighth embodiments described above, image data is simply images of a JPEG format. In this embodiment, there are used images in a Design rule for Camera File system (DCF) format that is a standard format for digital cameras widely used in recent years. That is, in the second storage 103 of the image processing apparatus of this embodiment, image data in the DCF format has been recorded.

Here, the image data in the DCF format means image data containing thumbnail images in addition to main images that are JPEG images. Typically, the JPEG images (main images) each have a resolution (image size) of 1,600×1,200 pixels or higher and the thumbnail images each have a resolution (image size) of 160×120 pixels. The image processing apparatus of this embodiment calculates a resolution (image size) that is necessary for rendering during label image creation processing and, when the thumbnail images have enough resolutions (image sizes), decoding of the main images is not performed and the thumbnail images are used in place of the main images, thereby achieving an increase in processing speed and a reduction in required memory amount.

It should be noted here that the image processing apparatus of this embodiment mainly creates a label image composed of post-shape change images (such as the images shown in FIGS. 22 and 24) whose sizes are not constant. When the size of each image to be arranged inside a circumference is small as shown in FIGS. 22 and 24, it is effective that the thumbnail images are used in place of the main images.

Next, automatic image layout processing in the image processing apparatus of the ninth embodiment will be described.

Figure 30:
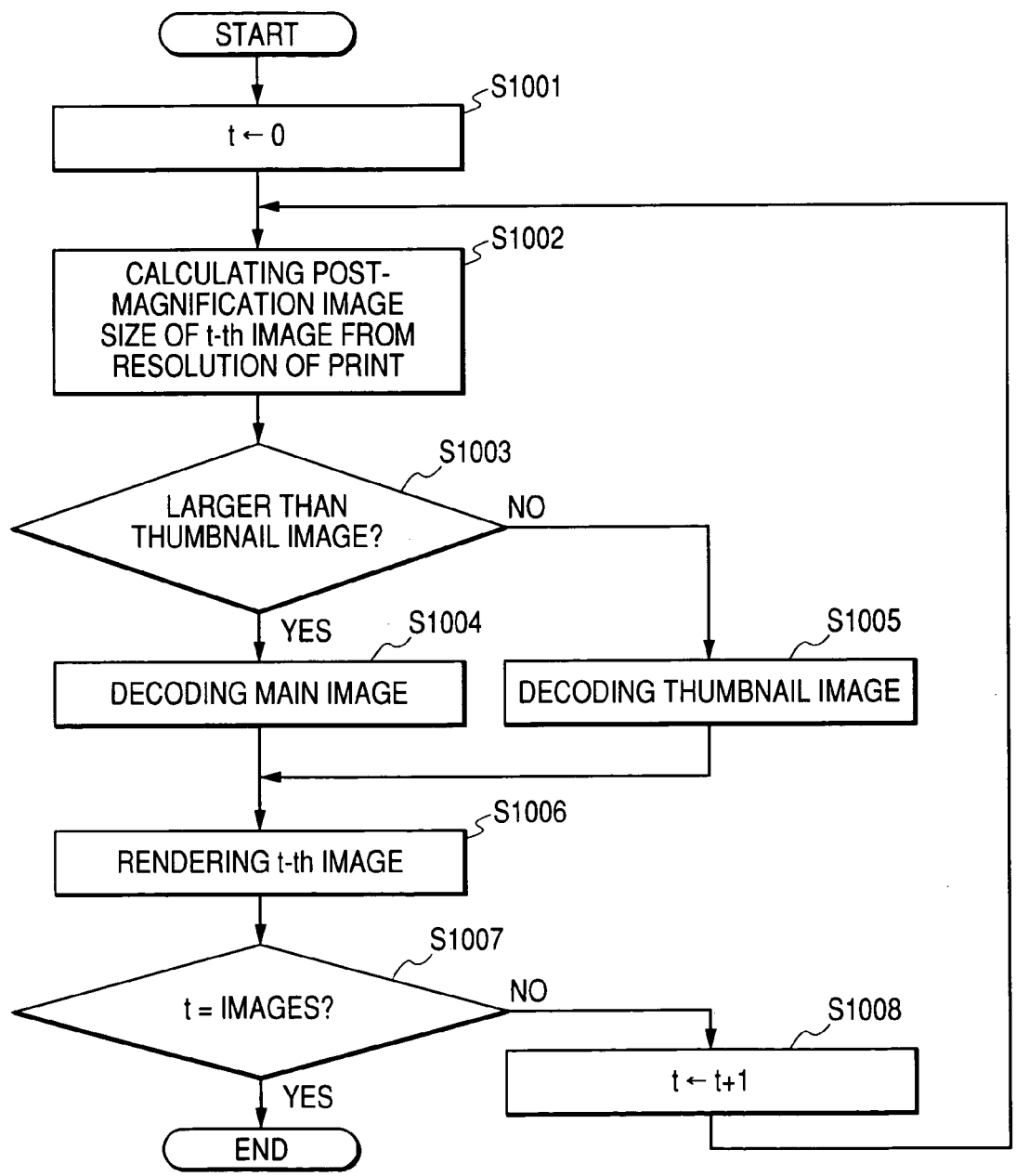
FIG. 30 is a flowchart showing automatic image layout processing in an image processing apparatus in a ninth embodiment.

FIG. 30 is a flowchart showing the automatic image layout processing in the image processing apparatus in the ninth embodiment. First, in step S1001, a variable "t" is initialized using a value "0." Next, in step S1002, the image processing apparatus calculates a post-shape change size (post-shape change image size) of the t-th image based on a print resolution. This value varies depending on which layout is adopted, although a concrete calculation method of the post-shape change image size (such as "w0" or "w1") has been described in the aforementioned fifth embodiment, so that the description thereof will be omitted in this embodiment.

Next, in step S1003, the image processing apparatus determines whether a main image or a thumbnail image should be used for rendering in accordance with the post-shape change image size. In more detail, the image processing apparatus judges whether a condition of "post-shape change image upper side>160 pixels" is satisfied. If the condition of "post-shape change image upper side>160 pixels" is satisfied (Yes in step S1003), the processing proceeds to step S1004. On the other hand, if the condition of "post-shape change image upper side>160 pixels" is not satisfied (No in step S1003), the processing proceeds to step S1005. Note that in this embodiment, the comparison is performed using the upper side of the post-shape change image, although the present invention is not limited to this and it is sufficient that this comparison is performed using a long side of the post-shape change image.

Next, as a concrete example, a case will be described in which a label of a CD having a diameter of 12 cm, which is a typical recording medium, is created and the output device 105 performs print at a resolution of 600 dpi. First, the number "R" of pixels contained within the radius of the CD label is obtained as follows:

$R=12/2/2.54*600 \approx 1,417$ pixels

The width of a thumbnail image is 160 pixels, so that the thumbnail image is used at the time of rendering when an image should be drawn in a size smaller than around ⅑ of the CD radius. In this manner, it becomes possible to increase the efficiency of the rendering processing (label image creation processing).

Next, in case that the processing proceeds to step S1004, the image processing apparatus performs decoding of the main image of the t-th image. On the other hand, in case that the processing proceeds to step S1005, the image processing apparatus performs decoding of the thumbnail image of the t-th image. Then, in step S1006, the image processing apparatus performs image rendering processing using the decoded main image or thumbnail image. The concrete algorithm of this rendering processing (shape-change processing) has been described in the above fifth embodiment.

Next, in step S1007, the image processing apparatus judges whether a variable "t" is equal to the number "Images" of images to be drawn. Then, if a result of this judgment is positive (Yes in step S1007), the label image creation processing is ended. On the other hand, if the judgment result is negative (No in step S1007), the processing proceeds to step S1008 in which the image processing apparatus increments the variable "t" only by "1." Then, the processing returns to step S1002.

It should be noted here that in this ninth embodiment, a case has been described in which the sizes of respective images to be drawn are different from each other as shown in FIG. 22. However, the present invention is not limited to this and it is possible to provide the same effect even in the cases shown in FIGS. 17A to 17D where every image is drawn in the same size. In a layout where images are drawn in the same size, it is not required to make the judgment as to whether a main image or a thumbnail image is to be used for each image and it is sufficient that this judgment is made only once at the start of the processing.

Also, in this ninth embodiment, a case where image data has two different resolutions (image sizes) has been described by taking, as an example, a case of image data of the DCF format, although the present invention is not limited to this. For instance, it is possible to suitably deal with image data of another known image format, such as a Flashpix format or a JPEG 2000 format, in which it is possible to hierarchically decode the image data at multiple resolutions. Also, when image data is used in a format, in which the image data can be decoded at multiple resolutions (three or more), it becomes possible to more finely determine the resolution of each image to be applied to drawing. With this construction, images having minimum required resolutions can be decoded, which makes it possible to further increase the processing speed.

Also, in the ninth embodiment described above, decoding is performed through switching between a thumbnail image and a main image as necessary, although the present invention is not limited to this and every thumbnail image may be decoded and cached by one operation in advance and each required main image may be decoded as occasion demands. There are many cases where the thumbnail image is used for another purpose. For instance, there is a case where the thumbnail image is used to present an image selection screen through which a user selects each image to be subjected to print from among multiple images. Therefore, there is a case where by caching the thumbnail image, the processing efficiency is improved as a whole. Also, the processing speed of the thumbnail image is improved through the caching, while a memory usage amount is increased. Therefore, there exists a trade-off in terms of the label image creation processing. It is sufficient to select a thumbnail image processing method appropriate to a form to be adopted with consideration given to the above facts.

Also, in the ninth embodiment, the switching between a thumbnail image and a main image is performed based only on the size of an image to be drawn, although the present invention is not limited to this and there is a case where the thumbnail image is low not only in resolution but also in image quality. That is, in terms of the image quality, the thumbnail image is sometimes not suited for print. In more detail, there is a case where the thumbnail image is compressed at a compression ratio higher than that of a main image or a simple Nearest-Neighbour method is used to create the thumbnail image through resolution conversion of a main image. Accordingly, when preview screen displaying or draft print is performed, the label image creation may be performed through the switching between a thumbnail image and a main image in the manner described above and, at the time of actual print, the label image creation may be performed using only the main image.

It should be noted here that in the embodiments described above, the created label image is printed on a printable CD-R medium using a customer-oriented printer, although the present invention is not limited to this and the created label image may be printed on a press-manufactured CD-ROM or the like. That is, the present invention is not limited to the CD-R and is equally applicable to a DVD-R and the like so long as they are generally circular disk media.

As described above, with the image processing apparatus, the image processing method, the program for implementing the image processing method, and the recording medium recording the program according to the present invention, a plurality of image data is selected, a shape of each of the selected image data is changed into a shape corresponding to an arrangement pattern, and post-arrangement image data is created in which shape-changed images that are post-shape change images have been arranged in accordance with the arrangement pattern. Therefore, when the images are arranged concentrically with respect to a circular label, for instance, it is possible to arrange the images so as to be contained within a circle through automatic adjustment of the sizes, arrangement intervals, and the like of the images in accordance with the number of the images selected.

Tenth Embodiment

Figure 31:
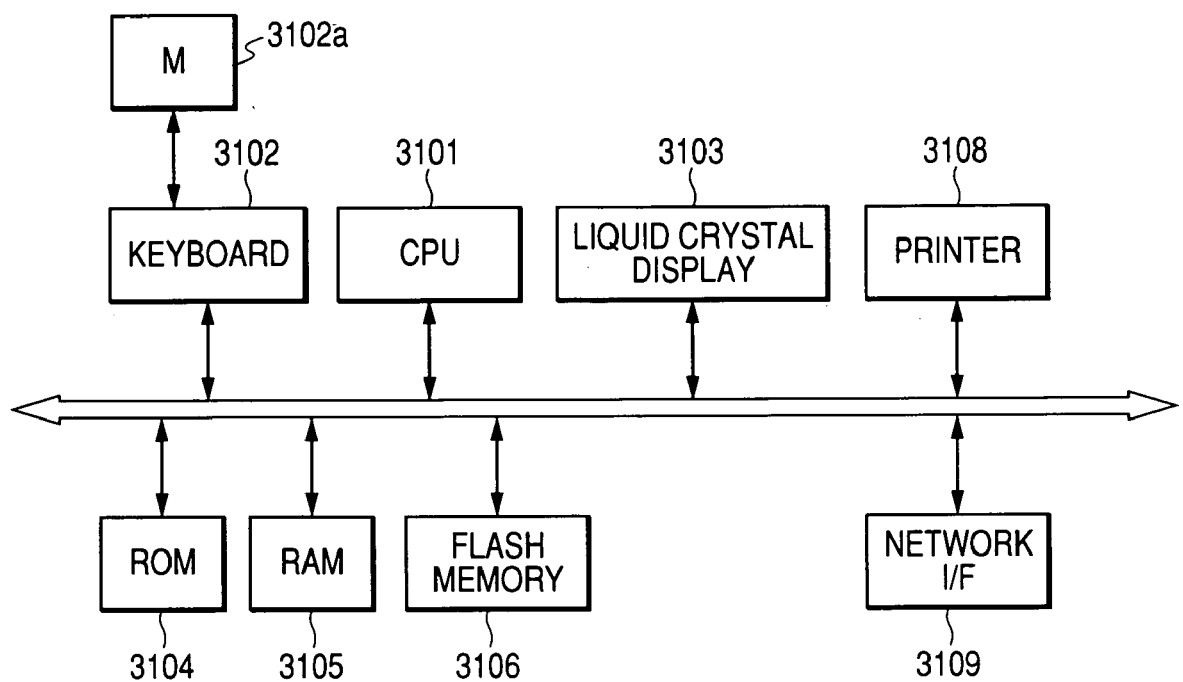
FIG. 31 is a block diagram showing a hardware construction of an image processing apparatus in a tenth embodiment of the present invention.

Next, as a tenth embodiment of the present invention, an image processing apparatus that arranges images spirally will be described. FIG. 31 is a block diagram showing a hardware construction of the image processing apparatus in this tenth embodiment of the present invention. In FIG. 31, reference numeral 3101 denotes a CPU that takes the overall control of the image processing apparatus. Also, reference numeral 3102 indicates a keyboard and reference numeral 3102a represents a mouse, with the keyboard and the mouse constituting an input apparatus for inputting data and commands into the image processing apparatus.

Reference numeral 3103 denotes a display apparatus that is composed of a CRT, a liquid crystal display, or the like. Also, reference numeral 3104 indicates a ROM (Read Only Memory) and reference numeral 3105 represents a RAM, with these memories constituting a storage device of the image processing apparatus. The ROM 3104 and the RAM 3105 store programs to be executed by the CPU 3101, data to be used in the image processing apparatus, and the like. Reference numeral 3106 denotes a flash memory that is used by a file system of the image processing apparatus and constitutes a nonvolatile storage device.

Reference numeral 3108 denotes a printer that prints a print material in accordance with a command from the CPU 3101. Also, reference numeral 3109 indicates a network interface that has a function of establishing connection to the Internet or a Local Area Network (LAN) and achieving communication with another computer terminal.

With the hardware construction described above, the image processing apparatus prints a design, in which images have been arranged spirally on a label to be applied to a circular recording medium such as a CD-R, using the printer 3108. At this time, in the image processing apparatus, in order to arrange the images spirally with efficiency, processing for deforming each of the images is carried out through execution of a program by the CPU 3101.

Next, an operation of label print in the image processing apparatus shown in FIG. 31 will be described.

Figure 32:
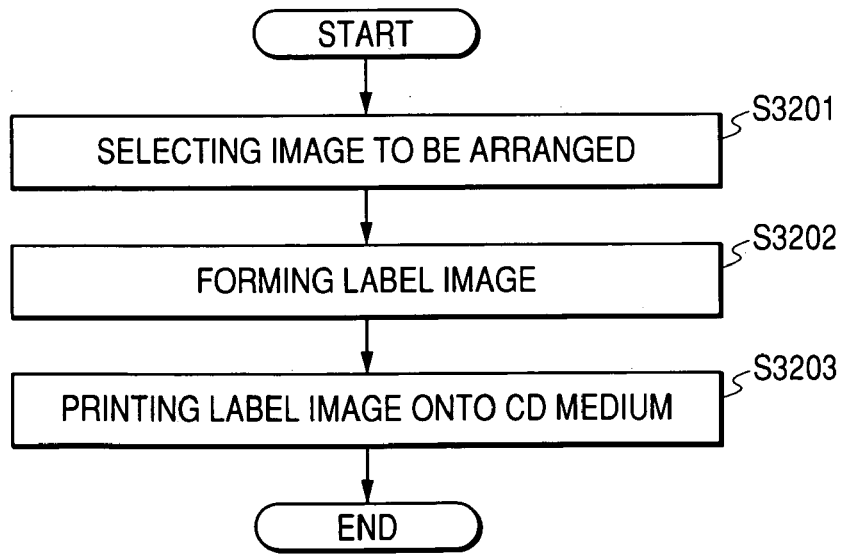
FIG. 32 is a flowchart illustrating every process step of label print in the image processing apparatus shown in FIG. 31.

FIG. 32 is a flowchart illustrating every process step of the label print in the image processing apparatus shown in FIG. 31. As shown in FIGS. 32, first, in step S3201, the image processing apparatus allows a user to select one or more images for printing on a label surface. In more detail, the image processing apparatus displays icons of images and a list of image file names on the display device 3103, thereby allowing the user to perform the image selection.

Figure 33A:
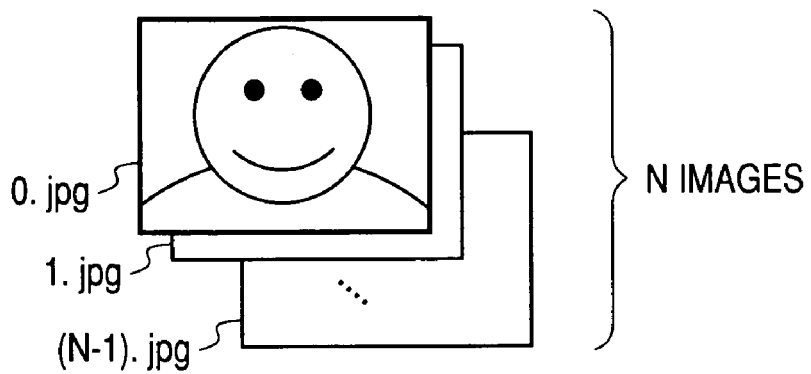
FIG. 33A shows an example of images selected.

It should be noted here that a plurality of image data to be displayed in a list are stored in advance in the flash memory 3106. In more detail, the plurality of image data are accumulated in the flash memory 3106 in a form of a JPEG file format. The user may select arbitrary N (N is a natural number) images from the image list. FIG. 33A is an image diagram of the selected N images. Also, in the following description, it is assumed that as shown in FIG. 33A, the N images selected by the user are respectively given file names "0.jpg," "1.jpg," . . . , "(N−1).jpg" in order.

Next, in step S3202, the image processing apparatus forms a label image where a shape of each of the selected N images has been changed and arranged in a doughnut manner (spirally) with efficiency in an easy-to-see manner. Note that the operation in step S3202 will be described in detail later. Next, in step S3203, the image processing apparatus prints the formed label image using the printer 3108. To do so, the printer 3108 is equipped with a function of performing direct print onto a CD-R medium like recent consumer-oriented printers. When this function is used, a printable CD-R medium is used which is commercially available and on which direct print can be performed, for instance. Also, various seal-like labels to be applied to a disk surface are commercially available and it is also possible to print the label image on such a label and to put the label on a CD-R disk surface.

As a result of the processing described above, the image processing apparatus forms a label image, in which shapes of a plurality of images have been changed and arranged spirally with efficiency, and prints the formed label image onto a CD-R medium or a label of a CD-R.

Next, the details of the processing in step S3202 shown in FIG., 32 will be described.

Figure 33B:
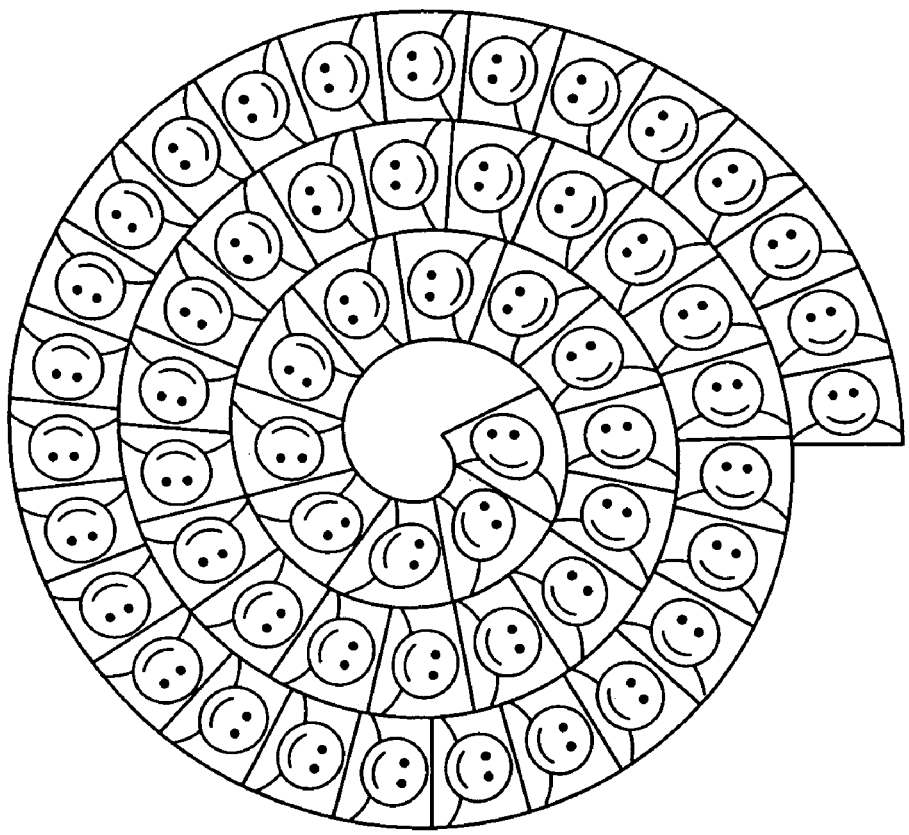
FIG. 33B shows an image example of a label image where the selected images have been deformed and arranged spirally.

FIG. 33B shows an image example of the label image (second image data) where shapes of images have been changed and arranged spirally. The images arranged in FIG. 33B are the N images (hereinafter referred to as the "material images" ) selected in step S3201, and an example of the material images (first image data) is shown in FIG. 33A.

In FIG. 33B, demarcation lines between the respective blocks (post-shape change material images) arranged are each composed of a curved line determined by a linear spiral "r=aθ" and two straight lines passing through the center of the spiral. The image processing apparatus forms each block by continuously changing shapes of the respective material images in accordance with the form of the blocks defined by these demarcation lines. In the following description, each block will be referred to as the "bit of a spiral" or the "spiral bit."

Next, the aforementioned linear spiral "r=aθ" will be described.

Figure 34:
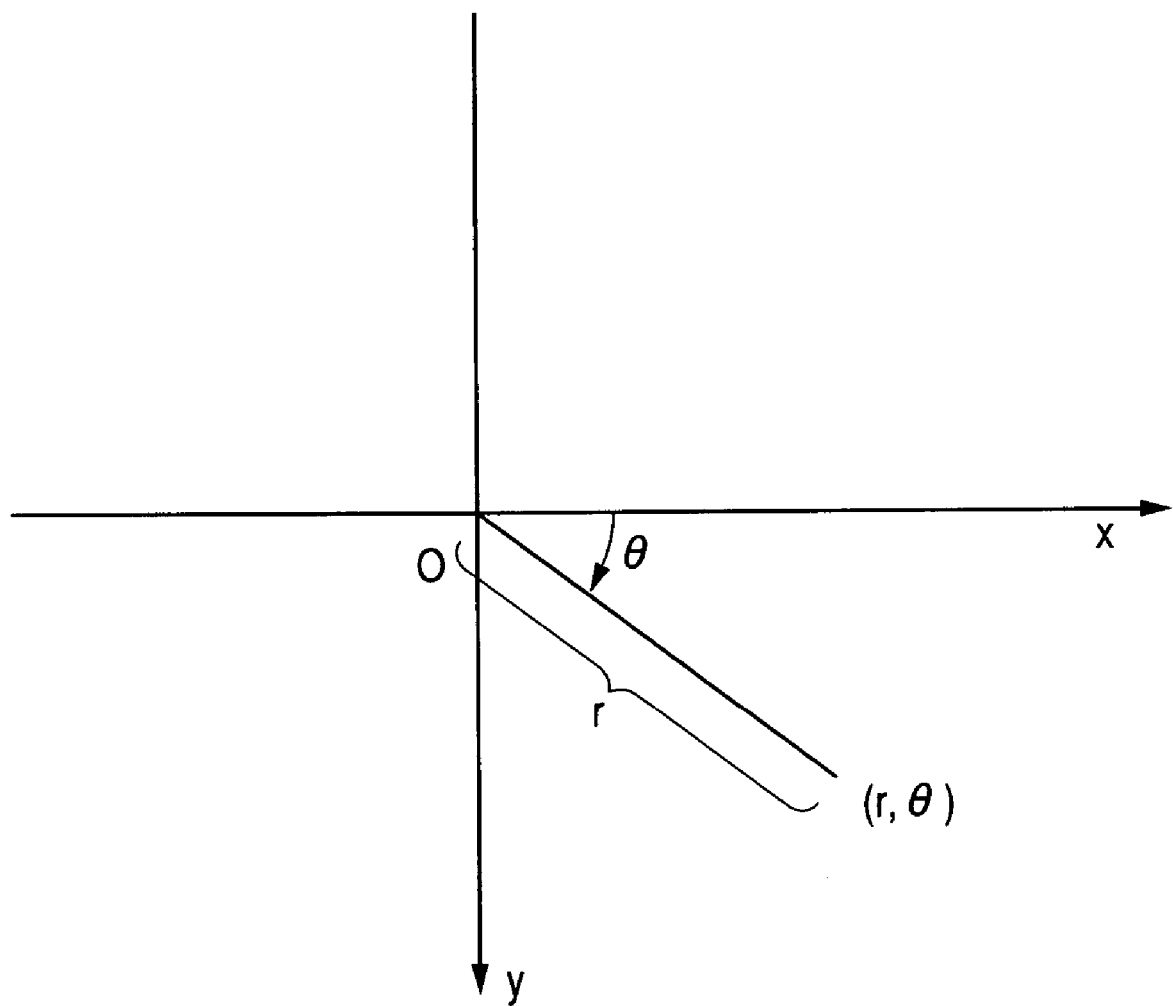
FIG. 34 shows a polar coordinate used in the tenth embodiment.

Here, "a" is a positive constant. Also, "r" and "θ" are each a coordinate on the label image based on a polar coordinate expression as shown in FIG. 34, with "r" indicating a distance from an origin and "θ" indicating a deflection angle. Further, the constant "a" is a constant for controlling the number of turns of the spiral and, as the value of this constant "a" is reduced, the number of turns of the spiral is increased. Therefore, the constant "a" is determined in advance at a value at which an appropriate design is obtained. Note that only one same image is repetitively arranged in the label image shown in FIG. 33B, although the selected N material images may be different from each other. In this case, as respective spiral bits of the label image, mutually different material images are arranged spirally in the order of "0.jpg," "1.jpeg," . . . , and "(N−1).jpg" from an inner radius side. At this time, if the number of the material images "N" is small, the material images "0.jpg" to "(N−1).jpg" may be repetitively arranged until the value of the linear spiral "r" becomes a predetermined magnitude.

Figure 35A:
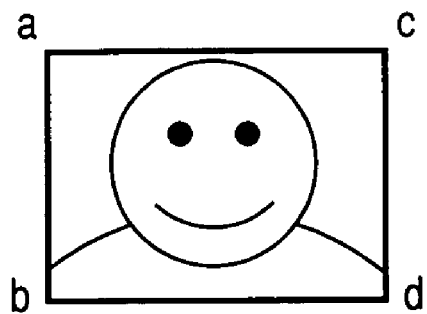
FIG. 35A shows an example of a pre-shape change material image.
Figure 35B:
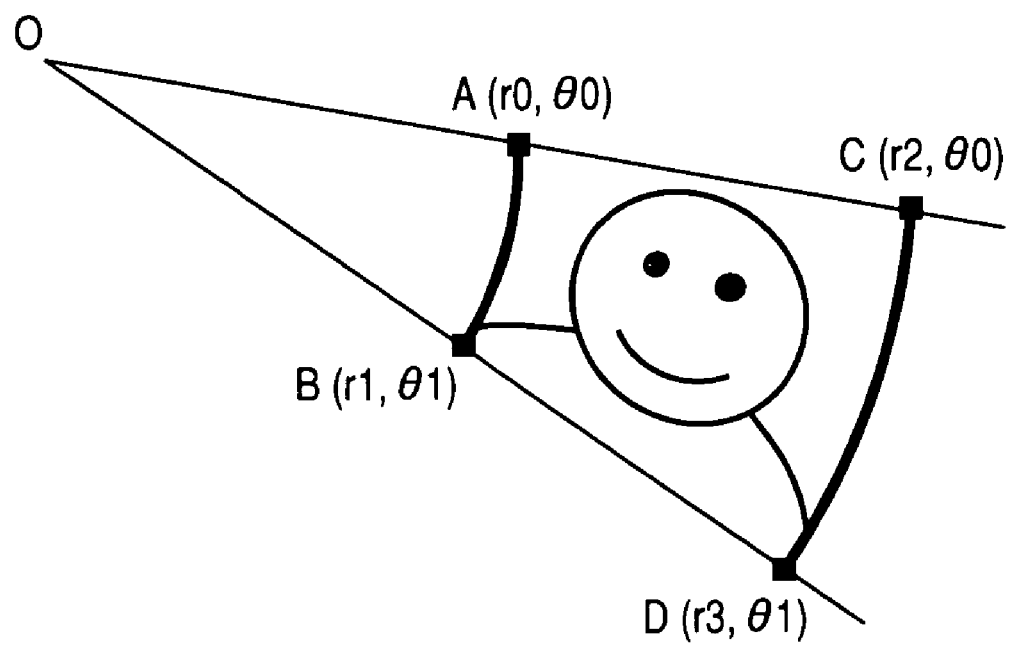
FIG. 35B shows an example of a post-shape change material image (spiral bit)

Next, a coordinate to be calculated in order to draw one spiral bit described above will be described as an example of the material image shape-change. FIG. 35A shows an example of a pre-shape change material image, while FIG. 35B shows an example of a post-shape change material image (spiral bit). As a result of the image shape-change processing of the image processing apparatus, points "a," "b," "c," and "d" at four corners of the pre-shape change material image shown in FIG. 35A are mapped to coordinate points "A(r0, θ0)," "B(r1, θ1)," "C(r2, θ0)," and "D(r3, θ1)" of the spiral bit on a post-shape change label shown in FIG. 35B.

The coordinate points "A" and "B" are both points on the spiral, so that the following relations exist:

$$r0 = a\theta0$$

$$r1 = a\theta1$$

Also, from the mathematical characteristics of the spiral, the coordinates of the points "C" and "D" are uniquely determined from the coordinates of the points "A" and "D" and the following relations exist:

$$r2 = r0 + 2\Pi a = a(\theta0 + 2\Pi)$$

$$r3 = r1 + 2\Pi a = a(\theta1 + 2\Pi)$$

Further, an aspect ratio "AC:AB" of the spiral bit is selected so that an aspect ratio "ac:ab" of the material image is maintained.

Here, "AC=2Πa" and "AB=a/2*(θ1−θ0)²," so that the following equation is derived:

$$\theta1 = \theta0 + 2\sqrt{(\pi * ab/ac)}$$

As can be seen from the relations described above, once the deflection angle coordinate "θ0" of the coordinate point "A" on the upper left corner is determined, the spiral bit is uniquely determined. Accordingly, after the coordinates of the innermost spiral bit are calculated, it is possible to similarly calculate the coordinates of its adjacent next spiral bit by substituting the coordinate points "B" and "D" of the innermost spiral bit for the coordinate points "A" and "C" of the next spiral bit. As a result of the processing described above, it becomes possible to recursively calculate the coordinates of every spiral bit.

Next, processing will be described in which the image processing apparatus shown in FIG. 31 draws a spiral bit in forming the label image in step S3202 in FIG. 32.

Figure 36:
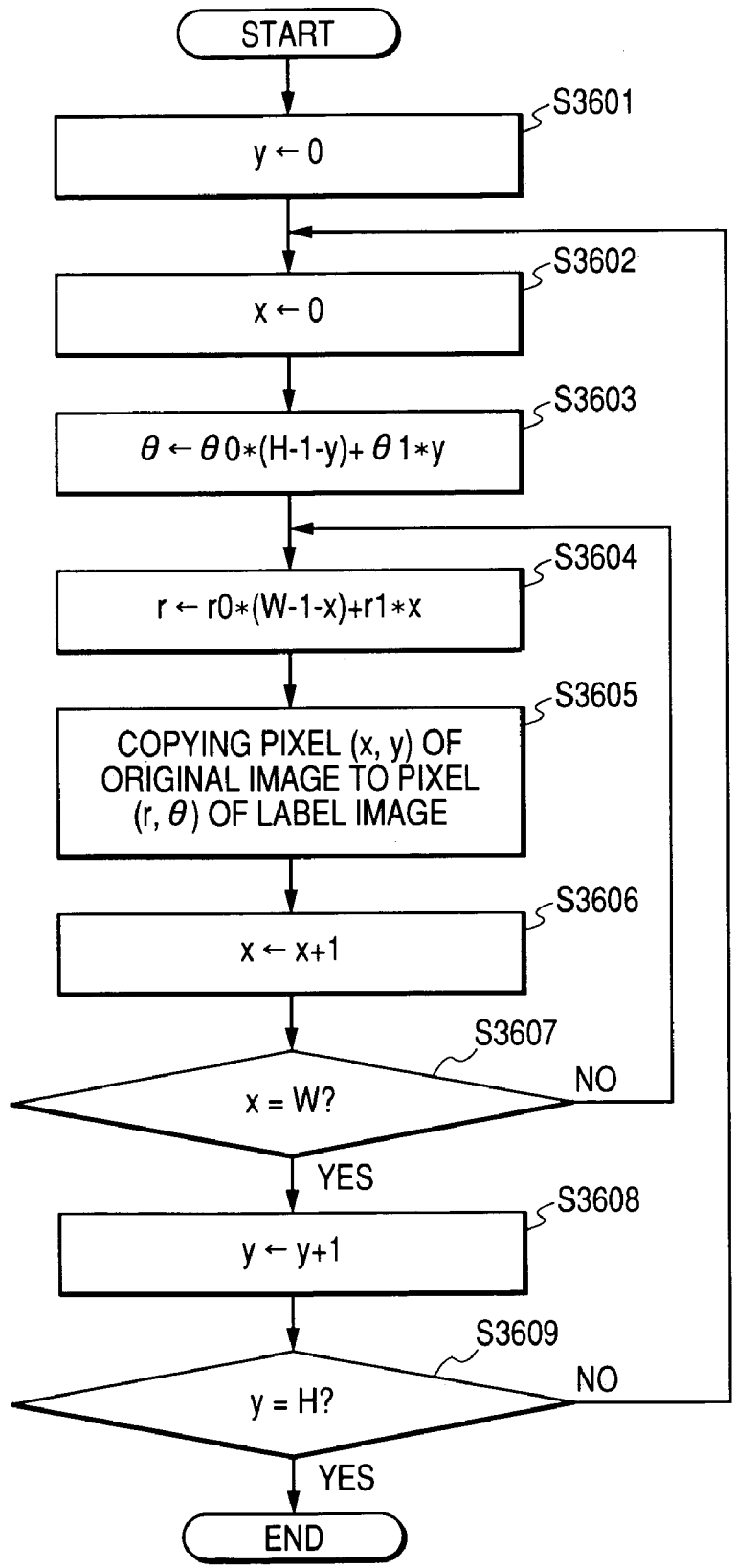
FIG. 36 is a flowchart showing processing where the image processing apparatus draws a spiral bit.

FIG. 36 is a flowchart showing the processing in which the image processing apparatus draws a spiral bit. Here, it is assumed that the material image has a size of W pixels wide by H pixels high and is expressed by a coordinate (x, y) where the upper left corner of the image is set as an origin. Also, it is possible to express the linear spiral in this case using the polar coordinate shown in FIG. 34 based on the equation "r=aθ" and the relation between the material image and the spiral bit is the mapping relation shown in FIGS. 35A and 35B.

First, in step S3601, the image processing apparatus initializes the variable "y" using a value "0." Next, in step S3602, the image processing apparatus initializes the variable "x" using a value "0." Then, in step S3603, the image processing apparatus calculates the variable "θ" in accordance with the following equation:

$$\theta \leftarrow \theta0*(H-1-y) + \theta1*y$$

It should be noted here that "θ0" is given as an initial value and it is possible to calculate "θ1" from the initial value "θ0" as described above.

Next, in step S3604, the image processing apparatus calculates the variable "r" in accordance with the following equation:

$$r \leftarrow r0*(W-1-x) + r1*x$$

Next, in step S3605, the image processing apparatus copies pixel data on a coordinate "(x, y)" of the material image to a position specified by the polar coordinate "(r, θ)" of the label image calculated in steps S3603 and S3604.

Next, in step S3606, the image processing apparatus increments the variable "x" only by one. Then, in step S3607, the image processing apparatus compares the variable "x" with the width "W" and, if they are equal to each other, the processing proceeds to step S3608. On the other hand, if they are different from each other, the processing returns to step S3604. Next, in step S3608, the image processing apparatus increments the variable "y" only by one. Next, in step S3609, the image processing apparatus compares the variable "y" with the height "H" and, if they are equal to each other, the processing is ended. On the other hand, if they are different from each other, the processing returns to step S3602.

As a result of the processing described above, the image processing apparatus in this embodiment is capable of changing each rectangular material image into a spiral bit having a form such as the form shown in FIG. 35B. Also, as described above, it is possible to recursively determine positions of respective spiral bits based on calculated coordinates of their adjacent spiral bits, which makes it possible to draw the whole label image by repeating the processing described above N times.

Eleventh Embodiment

In the tenth embodiment described above, the coordinate system of the label image has been described using a polar coordinate expression. In more general, however, in addition to the material images, the label image is also subjected to processing based on Cartesian coordinates. Therefore, an image processing apparatus in this eleventh embodiment creates a label image using Cartesian coordinates. Note that the hardware construction and process steps for label print of the image processing apparatus in this eleventh embodiment are the same as the hardware construction of the image processing apparatus in the tenth embodiment shown in FIG. 31 and the process steps for the label print shown in FIG. 32, so that the description thereof will be omitted.

Next, processing will be described in which the image processing apparatus in this eleventh embodiment draws a spiral bit in forming the label image in step S3202 shown in FIG. 32.

Figure 37:
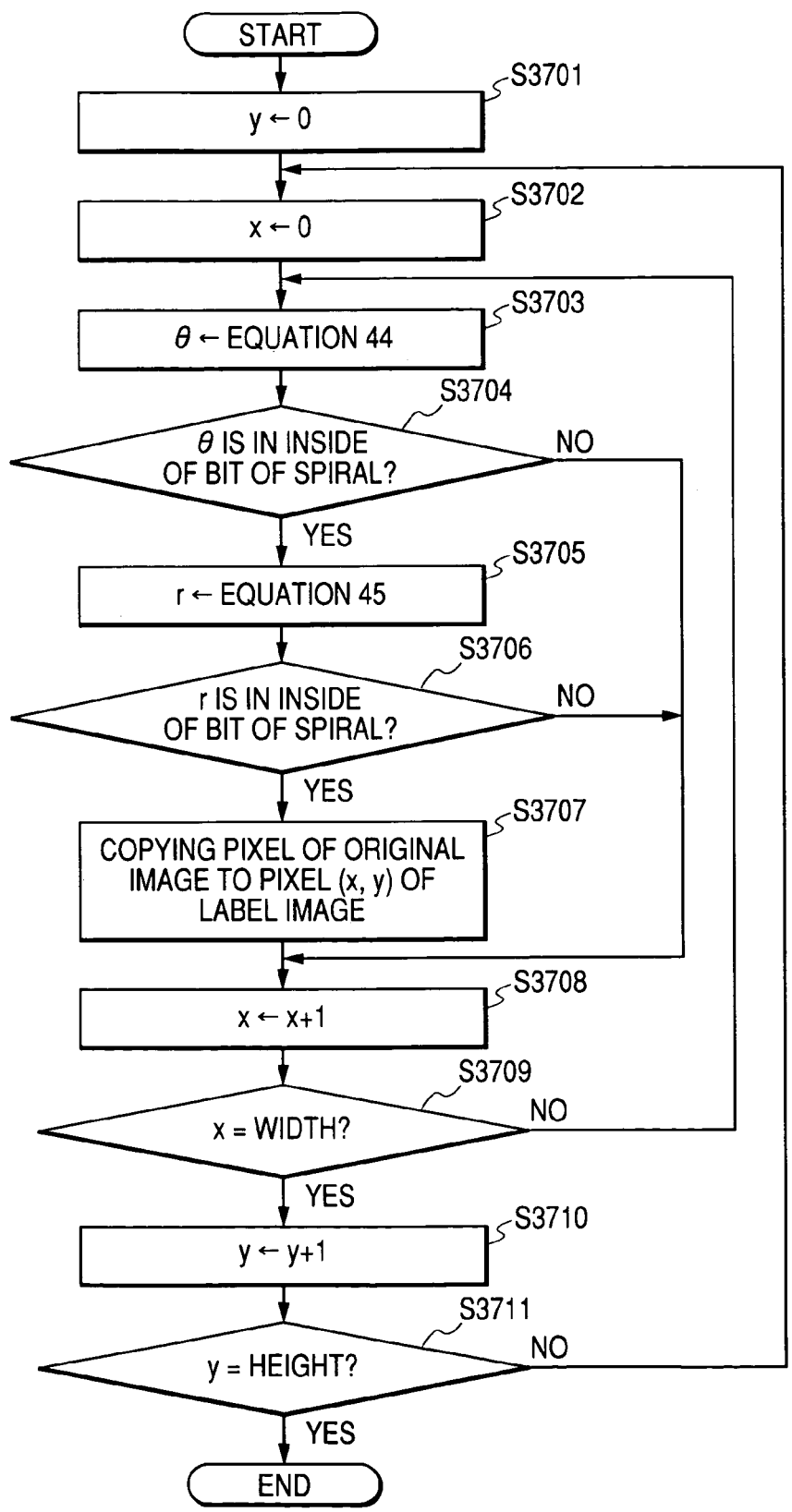
FIG. 37 is a flowchart showing processing where an image processing apparatus in an eleventh embodiment draws a spiral bit.

FIG. 37 is a flowchart showing the processing where the image processing apparatus in this eleventh embodiment draws a spiral bit. Here, it is assumed that a material image of the spiral bit has a size of Width pixels wide by Height pixels high. Also, it is assumed that a coordinate "(x, y)" of the spiral bit is determined with reference to its upper left corner that is set as an origin. Further, it is assumed that mutual conversion between the coordinate "(x, y)" and the polar coordinate system described in the tenth embodiment is possible in accordance with the following relational equations:

$$x = r * \cos\theta + \text{Width}/2$$

$$y = r * \sin\theta + \text{Height}/2$$

Also, it is assumed that a coordinate in the material image is expressed as "(X, Y)."

As shown in FIG. 37, first, in step S3701, the image processing apparatus initializes the variable "y" to a value "0." Next, in step S3702, the image processing apparatus initializes the variable "x" to a value "0." Then, in step S3703, the image processing apparatus calculates an angle "θ" formed by the coordinate (x, y) with an x axis in accordance with the following equation:

$$\theta \leftarrow \text{Tan}^{-1}((y - \text{Height}/2)/(x - \text{Width}/2)) \qquad \text{Equation 44}$$

It should be noted here that when "x=Width/2," the angle "θ" is set at "Π/2" if "y>Height/2," and is set at "3Π/2" if "y<Height/2."

Next, in step S3704, the image processing apparatus makes a judgment as to whether the deflection angle "θ" is in the inside of the spiral bit. That is, the image processing apparatus judges whether a condition of "θ0≦θ<θ1" is satisfied. If a result of this judgment is positive, the processing proceeds to step S3705. On the other hand, if the judgment result is negative, the processing proceeds to step S3708.

In step S3705, the image processing apparatus calculates a distance of the coordinate (x, y) of the label image from the origin in accordance with the following equation:

$$r \leftarrow \sqrt{((x - \text{Width}/2)^2 + (y - \text{Height}/2)^2)} \qquad \text{Equation 45}$$

Next, in step S3706, the image processing apparatus judges whether a polar coordinate point "(r, θ)" exists in the inside of the spiral bit. That is, the image processing apparatus judges whether a condition of "r0+(r1−r0)*(θ−θ0)*(θ1−θ0)≦r(r0+ (r1−r0)*(θ−θ0)*(θ1−θ0)+2Πa" is satisfied. If a result of this judgment is positive, the processing proceeds to step S3707. On the other hand, if the judgment result is negative, the processing proceeds to step S3708.

In step S3707, the image processing apparatus copies the value of a pixel corresponding to the coordinate "(X, Y)" in the material image to the point "(x, y)" of the label image in accordance with the following equations:

$$x \leftarrow w*(r - r0)/(r1 - r0)$$

$$y \leftarrow h*(\theta - \theta0)/(\theta1 - \theta0)$$

In this manner, the value of the pixel "(X, Y)" of the material image is copied to the point "(x, y)" of the label image. Next, in step S3708, the image processing apparatus increments the variable "x" only by "1." Next, in step S3709, the image processing apparatus compares the variable "x" with "Width" and, if they are equal to each other, the processing proceeds to step S3710. On the other hand, if they are different from each other, the processing returns to step S3703. Then, in step S3710, the image processing apparatus increments the variable "y" only by "1" and the processing proceeds to step S3711 in which the image processing apparatus compares the variable "y" with "Height." Then, if they are equal to each other, the processing is ended. On the other hand, if they are different from each other, the processing returns to step S3702.

Twelfth Embodiment

In the tenth embodiment described above, a case has been described in which images are arranged spirally, although there is also a case where images are arranged concentrically. Therefore, in this twelfth embodiment, an image processing apparatus will be described which changes shapes of images and arranges them concentrically with efficiency. Note that the hardware construction and process steps for label print of the image processing apparatus in this twelfth embodiment are the same as the hardware construction of the image processing apparatus in the tenth embodiment shown in FIG. 31 and the process steps for the label print shown in FIG. 32, so that the description thereof will be omitted. Note that in forming the label image in step S3202 in FIG. 32, the image processing apparatus performs processing for arranging images concentrically with efficiency.

Figure 38A:
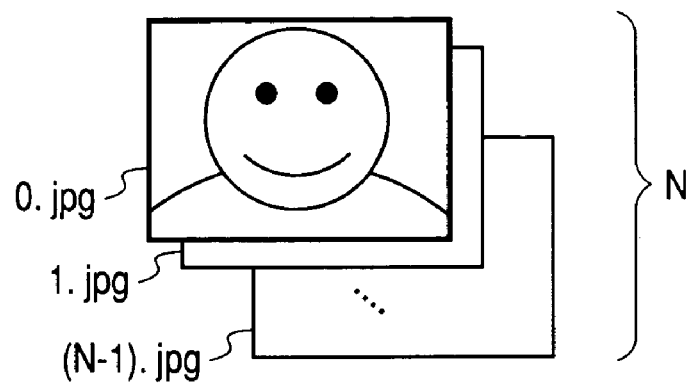
FIG. 38A shows an example of material images selected in step S3201.
Figure 38B:
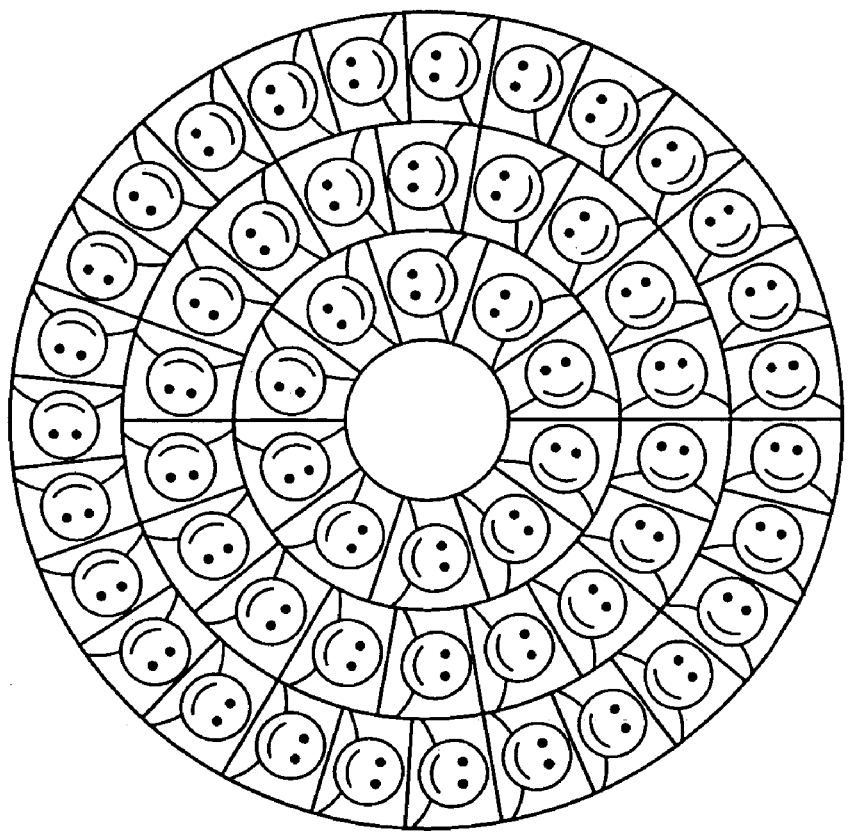
FIG. 38B shows an image example of a label image where the selected material images have been deformed and arranged concentrically.

Next, the details of the processing in step S3202 in FIG. 32 in the image processing apparatus of this twelfth embodiment will be described. FIG. 38A shows an example of the material images selected in step S3201. FIG. 38B shows an image example of a label image in which shapes of the selected material images have been changed and arranged concentrically. In FIG. 38B, demarcation lines of respective blocks (post-shape change material images) arranged are each composed of two curved lines, which are each determined by a concentric circle "r=$r_i$," and two straight lines passing through the center of the concentric circles. The image processing apparatus forms each block by continuously changing shapes of the respective material images in accordance with the form of the blocks defined by these demarcation lines. In the following description, each block will be referred to as the "bit of a concentric circle" or the "concentric circle bit."

Figure 42:
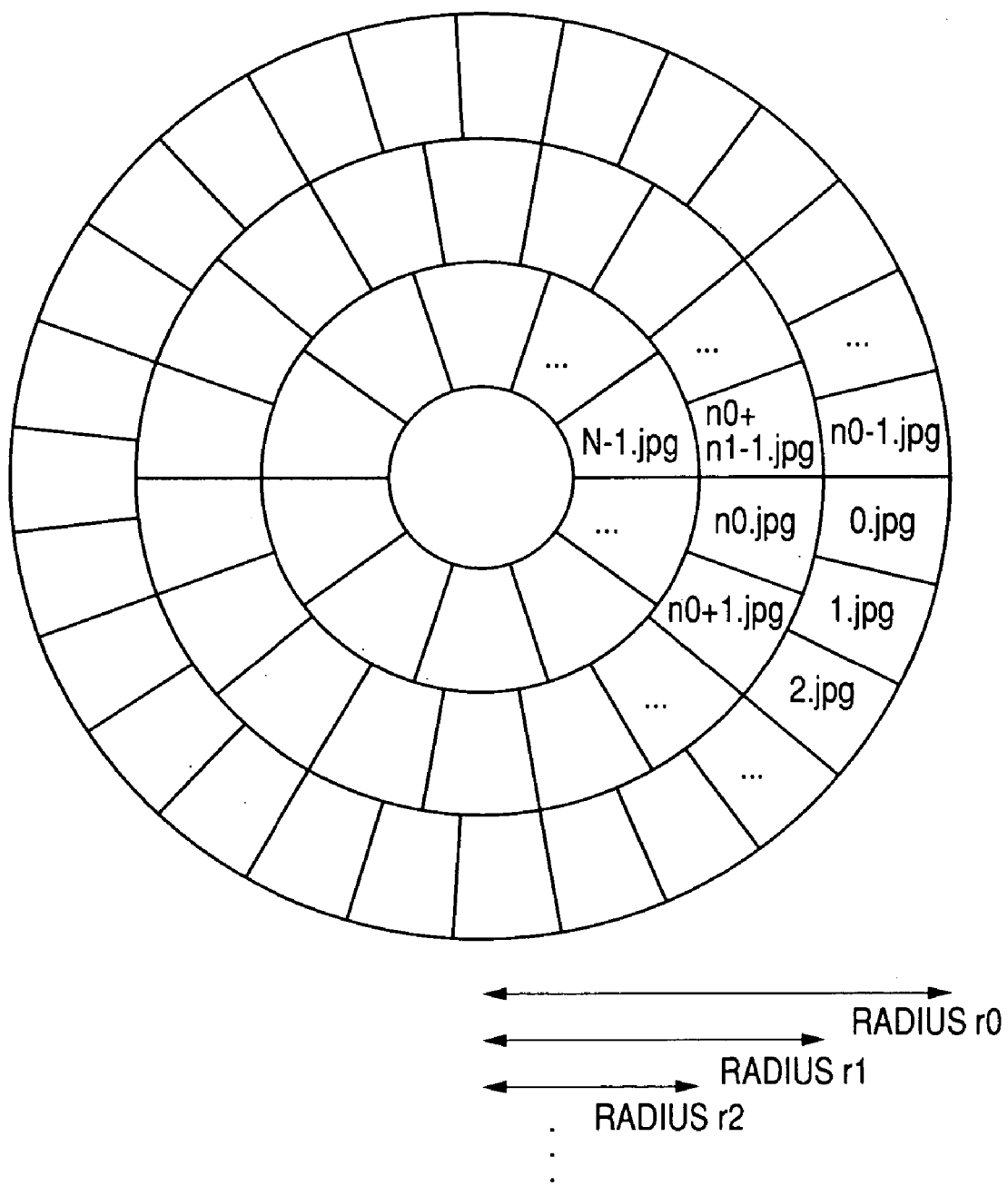
FIG. 42 shows an example of a concentric image arrangement in the twelfth embodiment.

Here, a radius "$r_i$" is a positive constant sequence. Also, a distance "r" from an origin and a central angle "θ" define a coordinate on a label image based on the polar coordinate expression shown in FIG. 34 described above. Also, as shown in FIG. 42, the i-th circle from the outer radius side is divided into $n_i$ areas. Further, concentric circle bits are arranged concentrically from the outer radius side in the order of "0.jpg," "1.jpg," . . . , and "(N−1).jpg." In more detail, as shown in FIG. 42, on the outermost concentric circle having a radius of "$r_0$," "0.jgp," "1.jgp," . . . , and "$n_0$−1.jpg" are arranged. Also, on the second outermost concentric circle having a radius of "$r_1$," "$n_0$.jgp," "$n_0$+1.jpg," . . . , and "$n_0$+$n_1$ −1, jpg" are arranged. Further, "(N−1).jpg" is arranged in an area of the innermost circle corresponding to the last arrangement order. In addition, at this time, "$r_i$," and "$n_i$," are determined in advance at values with which it is possible to obtain an appropriate design.

It should be noted here that in the label image shown in FIG. 38B, only one same image is repetitively arranged. However, the selected N material images may be different from each other. In this case, in each concentric circle bit of the label image, mutually different material images are arranged concentrically in the order of "0.jpg," "1.jpg," . . . , and "(N−1).jpg" from the outer radius side. At this time, if the number of the material images "N" is small, the material images "0.jpg" to "(N−1).jpg" may be repetitively arranged until each concentric circle is formed through the arrangement of the images.

Figure 39A:
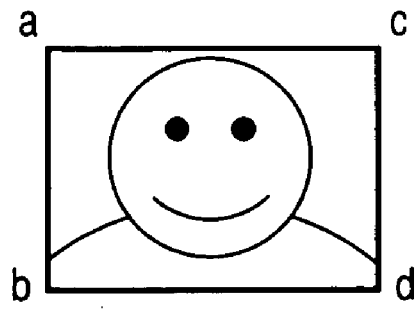
FIG. 39A shows an example of a pre-shape change material image.
Figure 39B:
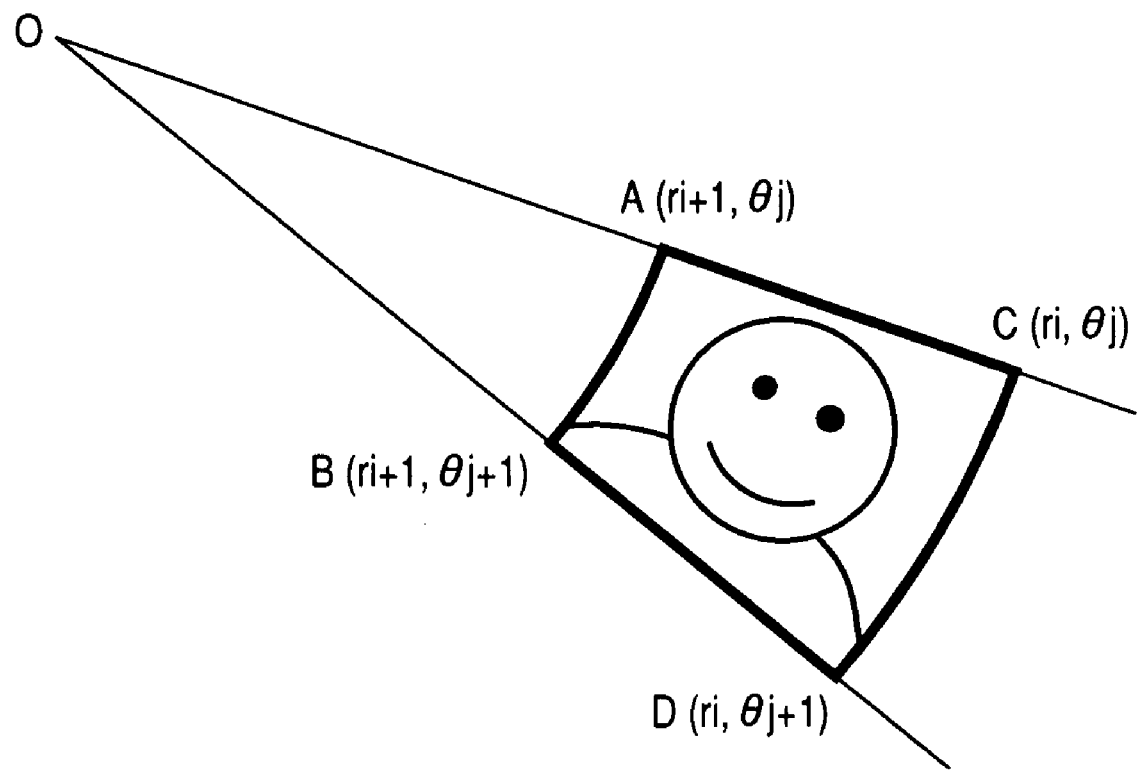
FIG. 39B shows an example of a post-shape change material image (concentric circle bit)

Next, as an example of the material image shape-change, a coordinate calculated in order to draw one concentric circle bit described above will be described. FIG. 39A shows an example of a pre-shape change material image, while FIG. 39B shows an example of a post-shape change material image (concentric circle bit). As a result of image shape-change processing of the image processing apparatus, points "a," "b," "c," and "d" at the four corners of the pre-shape change material image shown in FIG. 39A are mapped to coordinate points "A($r_{i+1}$, θj) ," "B ($r_{i+1}$, $θ_{j+1}$)," "C($r_i$, $θ_j$)," and "D($r_i$, $θ_{j+1}$)" of the concentric circle bit on a post-shape change label shown in FIG. 39B. Note that the i-th ring (or circle) is divided into ni areas as described above, so that the following relation exists for the concentric circle bits belonging to the i-th ring:

$$θ_{j+1}=θ_j+2Π/n_i$$

Next, processing will be described in which the image processing apparatus in this twelfth embodiment draws a concentric circle bit in forming the label image in step S3202 in FIG. 32.

Figure 40:
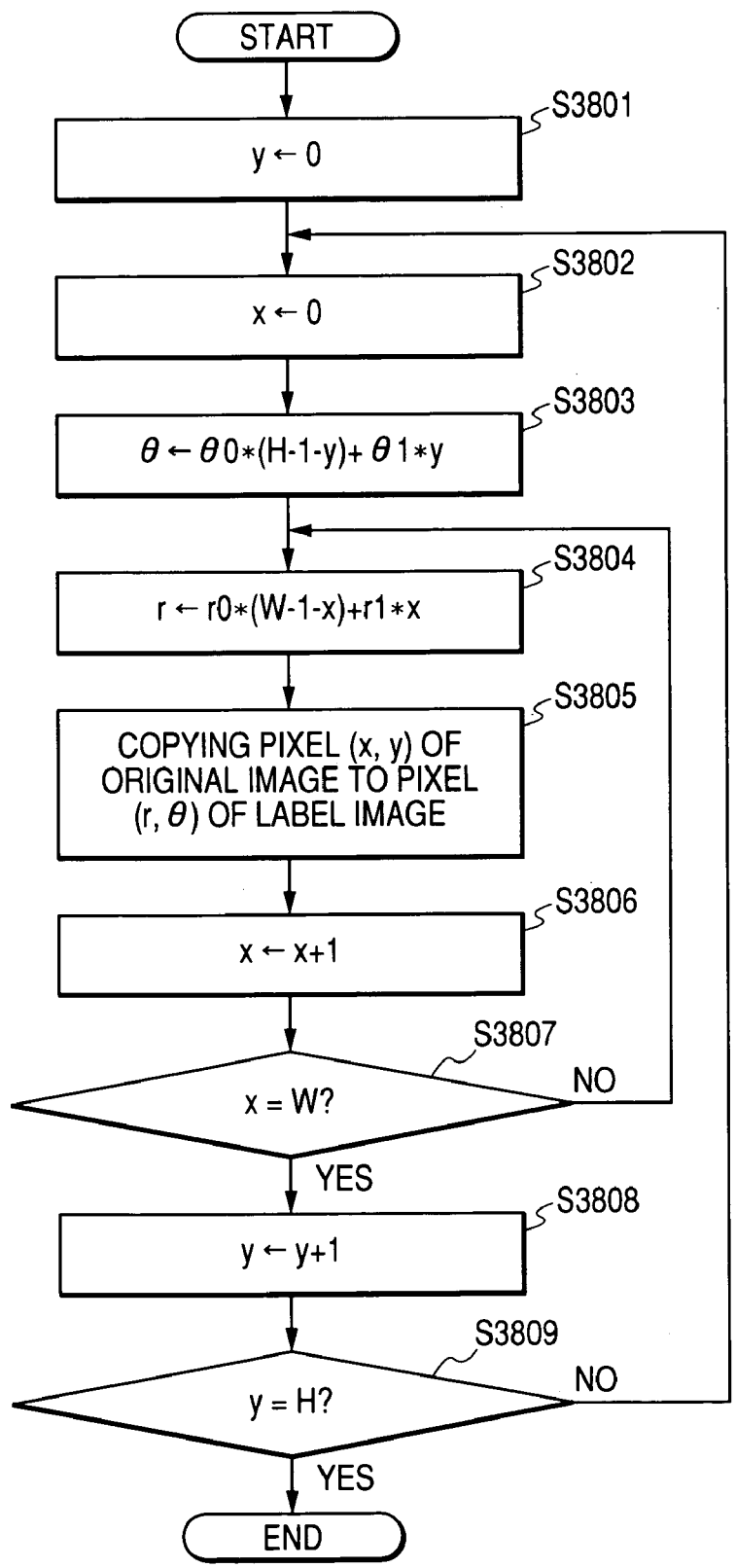
FIG. 40 is a flowchart showing processing where an image processing apparatus in a twelfth embodiment draws a concentric circle bit.

FIG. 40 is a flowchart showing processing where the image processing apparatus in this twelfth embodiment draws a concentric circle bit. Here, it is assumed that a material image of the concentric circle bit has a size of W pixels wide by H pixels high and is expressed by a coordinate (x, y) where its upper left corner is set as an origin. Also, it is possible to express a coordinate in a label image using the polar coordinate shown in FIG. 34 and the relation between the material image and the concentric circle bit is the mapping relation shown in FIG. 39.

First, in step S3801, the image processing apparatus initializes the variable "y" using a value "0." Next, in step S3802, the image processing apparatus initializes the variable "x" using a value "0." Next, in step S3803, the image processing apparatus calculates a variable "θ" in accordance with the following equation:

$$θ←θ_j*(H-1-Y)+θ_{j+1}*y$$

Next, in step S3804, the image processing apparatus calculates a variable "r" in accordance with the following equation:

$$r←r_{i+1}*(W-1-x)+r_i*x$$

Then, in step S3805, the image processing apparatus copies a pixel of the material image at the position "(x, y)" to a pixel of the label image at a polar coordinate position "(r, θ)." Next, in step S3806, the image processing apparatus increments the variable "x" only by "1." Next, in step S3807, the image processing apparatus compares the variable "x" with "W." Then, if they are equal to each other, the processing proceeds to step S3808. On the other hand, if they are different from each other, the processing returns to step S3804. Next, in step S3808, the image processing apparatus increments the variable "y" only by "1." Following this, in step S3809, the image processing apparatus compares the variable "y" with "H." Then, if they are equal to each other, the processing is ended. On the other hand, if they are different from each other, the processing returns to step S3802.

As a result of the processing described above, the image processing apparatus in this embodiment is capable of changing shapes of respective rectangular material images and arranging them concentrically with efficiency. By repeating the processing described above n times, the image processing apparatus draws concentric circles using n shape-changed images and draws the whole label image as shown in FIG. 38B.

Thirteenth Embodiment

In the twelfth embodiment described above, the coordinate system of a label image has been described using a polar coordinate expression. In more general, however, in addition to the material images, the label image is also subjected to processing based on Cartesian coordinates. Therefore, an image processing apparatus in this thirteenth embodiment creates a label image using Cartesian coordinates. Note that the hardware construction and process steps for label print of the image processing apparatus in this thirteenth embodiment are the same as the hardware construction of the image processing apparatus in the tenth embodiment shown in FIG. 31 and the process steps for the label print shown in FIG. 32, so that the description thereof will be omitted.

Next, processing will be described in which the image processing apparatus in this thirteenth embodiment draws a concentric circle bit in forming the label image in step S3202 in FIG. 32.

Figure 41:
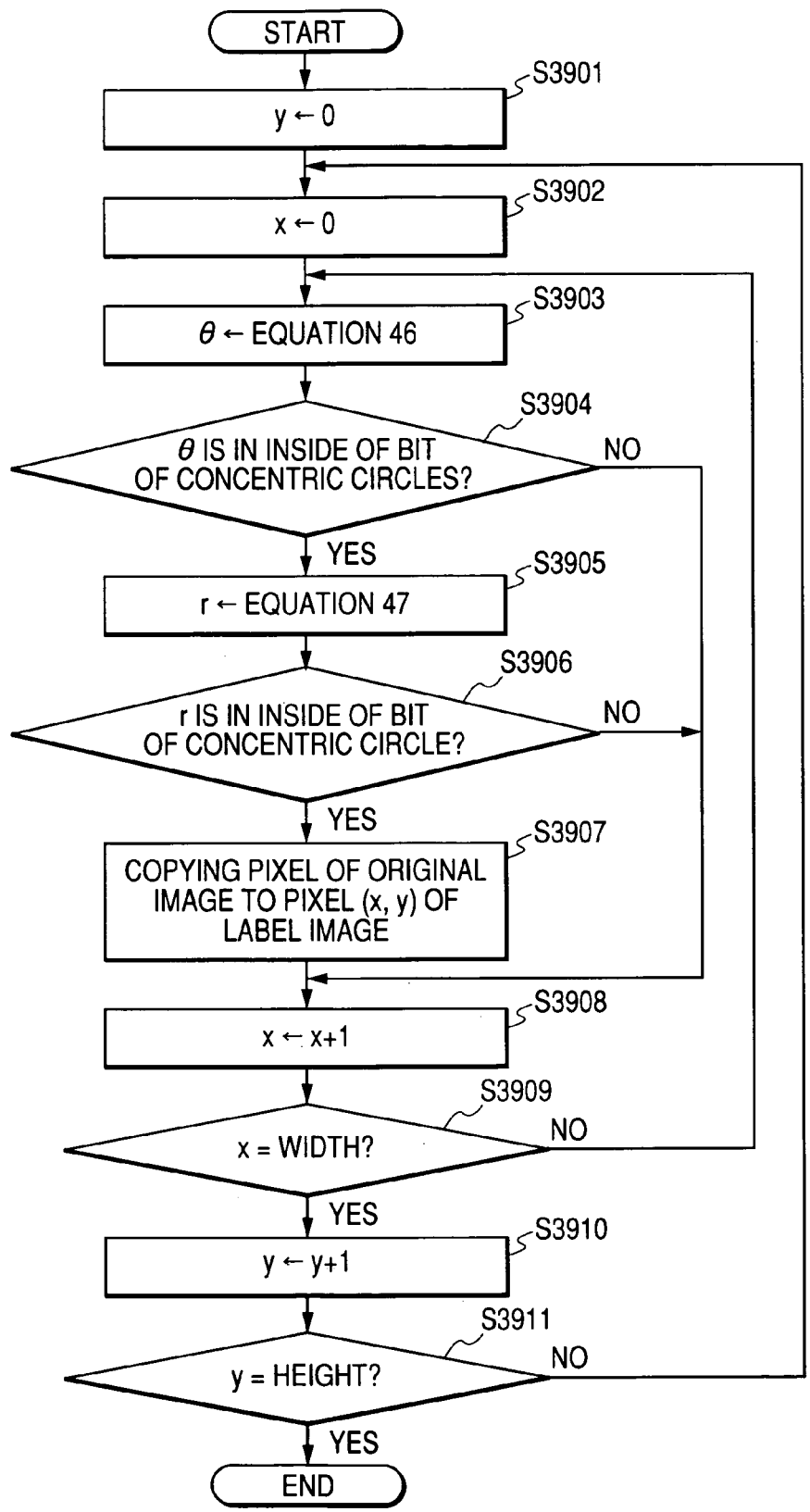
FIG. 41 is a flowchart showing processing where an image processing apparatus in a thirteenth embodiment draws a concentric circle bit.

FIG. 41 is a flowchart showing processing where the image processing apparatus in this thirteenth embodiment draws a concentric circle bit. Here, it is assumed that a material image of the concentric circle bit has a size of Width pixels wide by Height pixels high. Also, it is assumed that a coordinate "(x, y)" of the concentric circle bit is determined with reference to its upper left corner that is set as an origin. Further, it is assumed that mutual conversion between the coordinate "(x, y)" and the polar coordinate system described in the tenth embodiment is possible in accordance with the following relational equations:

$$x=r*\cos θ+Width/2$$

$$y=r*\sin θ+Height/2$$

Also, it is assumed that a coordinate in the material image is expressed as "(X, Y)." As shown in FIG. 41, first, in step S3901, the image processing apparatus initializes a variable "y" to a value "0." Next, in step S3902, the image processing apparatus initializes a variable "x" to a value "0." Then, in step S3903, the image processing apparatus calculates an angle "θ" formed by the coordinate "(x, y)" with an x axis in accordance with the following equation:

$$θ←\tan^{-1}((y-Height/2)/(x-Width/2)) \qquad \text{Equation 46}$$

It should be noted here that when "x=Width/2," the angle "θ" is set at "Π/2" if "y>Height/2," and is set at "3Π/2" if "y<Height/2."

Next, in step S3904, the image processing apparatus makes a judgment as to whether the angle "θ" is in the inside of the concentric circle bit. That is, the image processing apparatus judges whether a condition of "$θ_j≦θ<θ_{j+1}$" is satisfied. If a result of this judgment is positive, the processing proceeds to step S3905. On the other hand, if the judgment result is negative, the processing proceeds to step S3908.

Next, in step S3905, the image processing apparatus calculates a distance of the coordinate "(x, y)" of the label image from the origin in accordance with the following equation:

$$r←\sqrt{((x-Width/2)^2+(y-Height/2)^2)} \qquad \text{Equation 47}$$

Next, in step S3906, the image processing apparatus makes a judgment as to whether the polar coordinate point "(r, θ))" is in the inside of the concentric circle bit. That is, the image processing apparatus judges whether a condition of "$r_{i+1}≦r<r_i$" is satisfied. If a result of this judgment is positive, the processing proceeds to step S3907. On the other hand, if the judgment result is negative, the processing proceeds to step S3908.

Next, in step S3907, the image processing apparatus copies the value of a pixel corresponding to the coordinate "(X, Y)" in the material image to the point "(x, y)" of the label image in accordance with the following equation:

$$x←W*(r-r_{i+1})/(r_i-r_{i+1})$$

$$y←H*(θ-θ_j)/(θ_{j+1}-θ_j)$$

In this manner, the value of the pixel "(X, Y)" of the material image is copied to the point "(x, y)" of the label image.

Next, in step S3908, the image processing apparatus increments the variable "x" only by "1." Next, in step S3909, the image processing apparatus compares the variable "x" with "Width" and, if they are equal to each other, the processing proceeds to step S3910. On the other hand, if they are different from each other, the processing returns to step S3903. Next, in step S3910, the image processing apparatus increments the variable "y" only by "1." Then, in step S3911, the image processing apparatus compares the variable "y" with "Height" and, if they are equal to each other, the processing is ended. On the other hand, if they are different from each other, the processing returns to step S3902. In the manner described above, the image processing apparatus in this embodiment draws the concentric circle bit in forming the label image.

Figure 43:
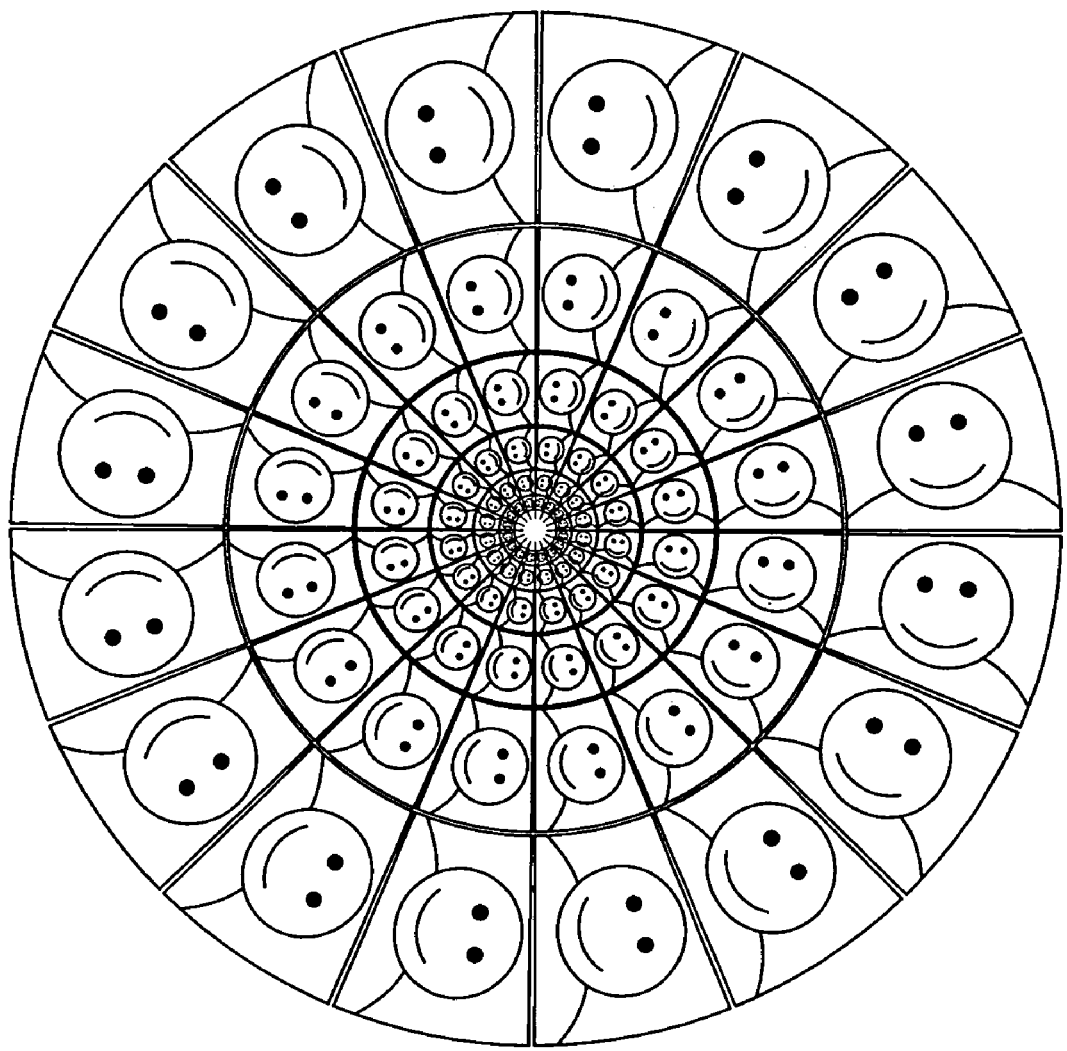
FIG. 43 shows an example of a concentric image arrangement that is different from the concentric image arrangement shown in FIG. 42.

It should be noted here that in this thirteenth embodiment, an example has been described in which at the time of a concentric arrangement, each ring from the outermost ring to the innermost ring has the same width and the number of division "$n_i$" is reduced as a distance to the center is reduced, although the present invention is not limited to this. For instance, as shown in FIG. 43, each ring may be divided into the same number of areas (16 areas, for instance) and the width of the ring may be reduced as a distance to the center is reduced. By combining "$r_j$" and "$n_i$" with each other in the manner described above, it is possible to create the label image in various patterns.

Fourteenth Embodiment

In the eleventh and thirteenth embodiments described above, image conversion is performed using a known nearest-neighbour pixel interpolation method (Nearest-Neighbour method) as an image enlargement technique in copying a value of one pixel of a material image to a pixel of a label image, although the present invention is not limited to this. For instance, by calculating a pixel value from values of multiple pixels based on a linear interpolation method (Bi-Linear method) described below, it becomes possible to obtain a more beautiful post-shape change image.

For instance, the calculation in step S3707 in FIG. 37 or the calculation in step S3907 in FIG. 41 is replaced with the following calculations:

$X0 \leftarrow Floor(X)$ (where Floor(X) is the maximum integer not exceeding X)

$Y0 \leftarrow Floor(Y)$

Then, the pixel value at a point "(x, y)" of a label image is replaced as follows:

$v \leftarrow P(X0, Y0)*(1-(X-X0))*(1-(Y-Y0))$ $+P(X0+1, Y0)*(X-X0)*(1-(Y-Y0))$ $+P(X0, Y0+1)*(1-(X-X0)*(Y-Y0)$ $+P(X0+1, Y0+1)*(X-X0)*(Y-Y0)$ An image is ordinarily expressed by a three-dimensional color space such as RGB or YUV, so that the processing described above is performed for each color plane.

Fifteenth Embodiment

In the tenth embodiment described above where images are arranged spirally, it is impossible to cope with a case where a printable range changes depending on the size and the like of a label. In view of this problem, an image processing apparatus in this fifteenth embodiment determines the coordinates of a spiral arrangement in accordance with the size of the printable range. Note that the hardware construction and process steps for label print of the image processing apparatus in this fifteenth embodiment are the same as the hardware construction of the image processing apparatus in the tenth embodiment shown in FIG. 31 and the process steps for the label print shown in FIG. 32, so that the description thereof will be omitted.

Figure 44A:
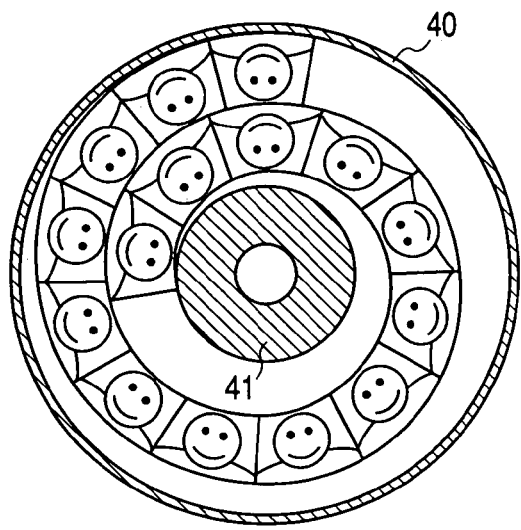
FIGS. 44A, 44B, and 44C each show an example of a relation between a label image subjected to spiral arrangement and a printable range.
Figure 44B:
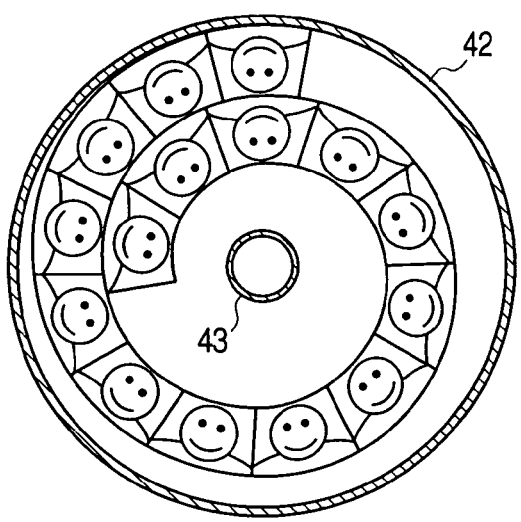

First, a change of the printable range and problems that will arise when no counter measure against this printable range change is taken will be described. FIGS. 44A and 44B each show an example of a relation between a label image subjected to spiral arrangement and the printable range. In FIG. 44A, a diagonally shaded region in an inner-radius-side area 41 and a diagonally shaded region in an outer-radius-side area 40 are each a region which is outside the printable range and in which it is impossible to perform print using the printer 3108. In a like manner, in FIG. 44B, a diagonally shaded region in an inner-radius-side area 43 and a diagonally shaded region in an outer-radius-side area 42 are each a region which is outside the printable range and in which it is impossible to perform print using the printer 3108. As can be understood through comparison of these drawings, the inner diameter of the printable range in FIG. 44B is smaller than that in FIG. 44A. That is, the printable range on the inter radius side in FIG. 44B is wider than that in FIG. 44A. This is an example where different kinds of printable media or labels that are commercially available have different printable ranges.

Figure 44C:
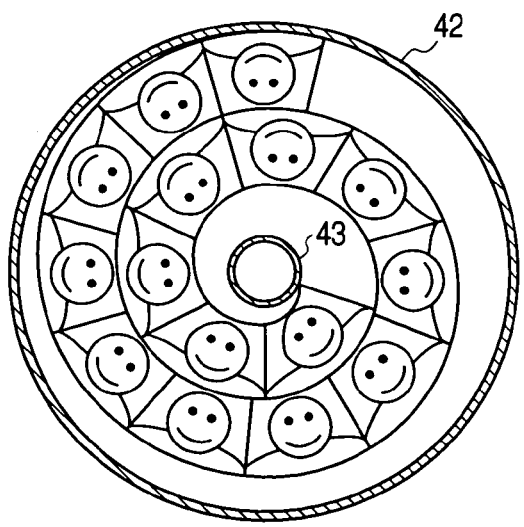

As shown in FIG. 44B, it is possible to perform print even using the same label image as in FIG. 44A, although there occurs a problem in that an inner-radius-side margin portion is increased, which leads to a problem in that a favorable design cannot be obtained. In this case, when the whole label image is reduced, for instance, it becomes possible to print the image also in the inner-radius-side margin portion in FIG. 44B. In this case, however, a margin is generated on the outer radius side and therefore it is apparently impossible to fundamentally solve the problem described above. Therefore, in this embodiment, as shown in FIG. 44C, the coordinates of an image arrangement are dynamically determined in accordance with the printable range (inner diameter and outer diameter thereof), thereby achieving print where the printable range of a medium or a label is used with more efficiency as compared with the case shown in FIG. 44B. Note that, in the tenth embodiment, as shown in FIG. 33B, images are arranged spirally so that the upper and lower sides of the images come adjacent to each other. In this embodiment, however, as shown in FIGS. 44A to 44C, images are arranged spirally so that the right and left sides of the images come adjacent to each other.

Figure 45:
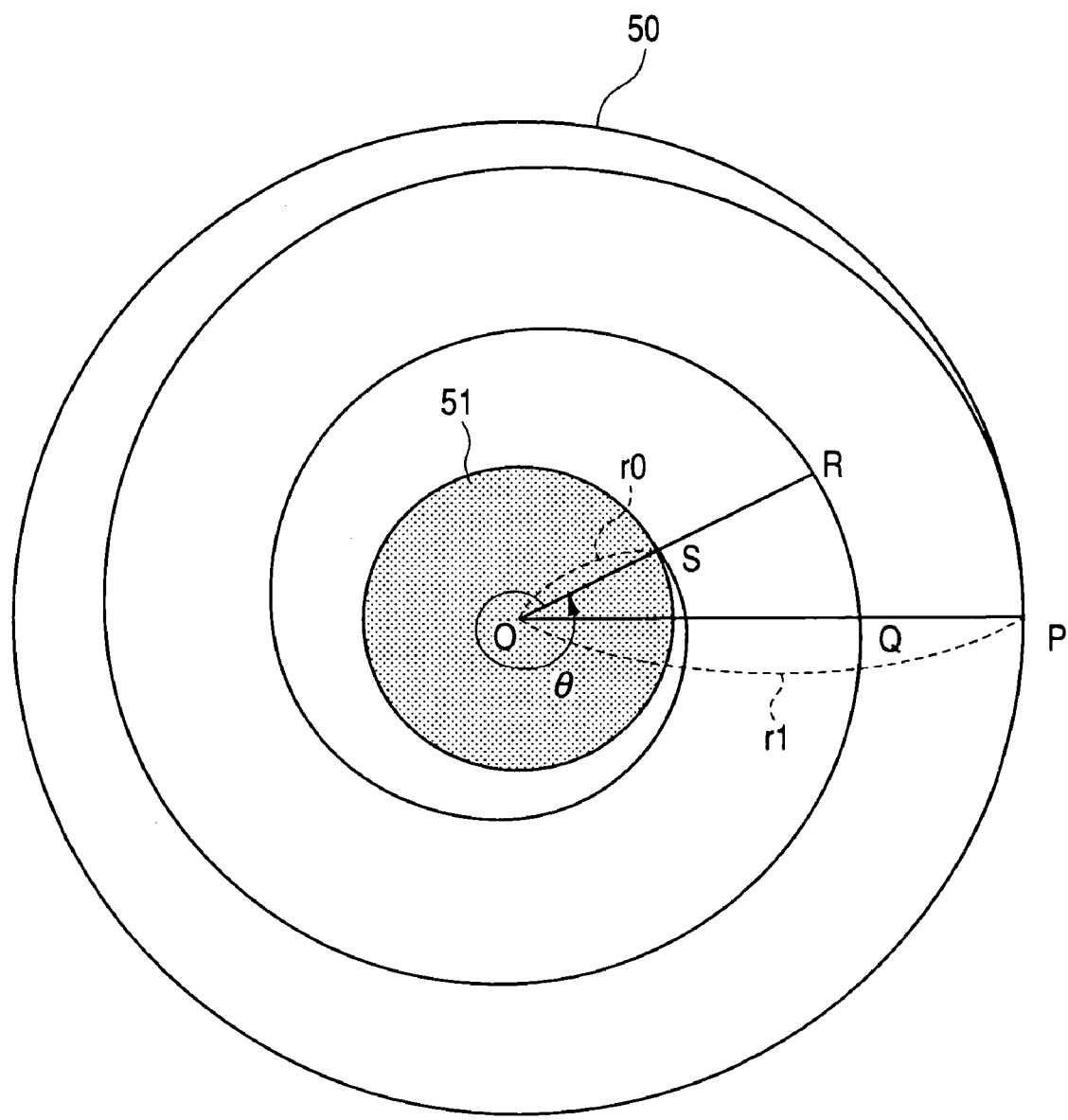
FIG. 45 shows an example of a relation between the inner diameter/outer diameter of a printable range and a spiral arrangement of images.

FIG. 45 shows an example of a relation between the inner diameter/outer diameter of a printable range and a spiral arrangement of images. The printable range inner diameter/outer diameter and the image spiral arrangement will be described using a polar coordinate "(r, θ)" where the center of a circle is set as an origin "O." As shown in FIG. 45, the radius of an inner circle 51 is assigned "r0" and the radius of an outer circle 50 is assigned "r1." A doughnut-like region sandwiched between these circles is set as the printable region. These circles 50 and 51 can be expressed by the following equations using a polar coordinate:

$r=r0$ $r=r1$

Also, the linear spiral shown in FIG. 45 that starts from a point "P" on the outer circle 50, passes through points "Q" and "R," and reaches a point "S" on the inner circle 51 can be expressed by Equation 48 given below using an appropriate positive constant "a:"

$$r = r1 - a*\theta \quad \text{Equation 48}$$

Here, when the central angle from a side "PO" to a side "RO" along the spiral is assigned "θ," Equation 49 given below is derived because the point "S" exists on the spiral:

$$r0 = r1 - a\theta \quad \text{Equation 49}$$

Here, as shown in FIG. 45, the central angle "θ" becomes an angle exceeding "2Π." In more detail, the central angle "θ" is an angle where "2Π" is added to an angle "QOR." That is, the central angle "θ" is also a value expressing the number of turns of the spiral. Accordingly, the constant "a" can be obtained from Equation 50 given below:

$$a = (r1 - r0)/\theta \quad \text{Equation 50}$$

Next, a case will be described in which the N images shown in FIG. 33A are horizontally connected to each other and are arranged in the spiral region shown in FIG. 45. The spiral region shown in FIG. 45 is a region surrounded by a straight line "PQ," a straight line "RS," a spiral "PR," and a spiral "QS." The images are continuously changed in shapes thereof and arranged in this spiral region. At this time, Equation 51 given below is obtained from the properties of the linear spiral:

$$PQ = RS = 2\Pi*a \quad \text{Equation 51}$$

When it is assumed that the images shown in FIG. 33A each have a width "w" and a height "h," the width of the upper side and the width of the lower side of an image obtained by connecting these images both become "N*w." However, it is apparent from FIG. 45 that the length of the upper side "QS" and the length of the lower side "PR" of the spiral region are different from each other. That is, for instance, as shown in FIGS. 44A to 44C, there occurs shape change where the upper sides of the images are shrunken and the lower sides thereof are extended (in this embodiment, the side of each image that is closer to the center of the circle is set as the upper side). In this embodiment, it is assumed that the magnification ratio of each image is determined so that the average of the upper side and the lower side of a post-magnification image becomes equal to the width of the pre-magnification image. That is, Equation 52 given below is derived:

$$N*w/h = ((QS + PR)/2)/PQ \quad \text{Equation 52}$$

Also, from Spiral Equation 49 described above and a known spiral length formula, "PR" and "QS" are obtained with Equations 53 and 54 given below:

$$PR = r1\theta - a/2*\theta^2 \quad \text{Equation 53}$$

$$QS = (r1 - 2\Pi*a)\theta - a/2*\theta^2 \quad \text{Equation 54}$$

From Equations 50 to 54 described above, it is possible to obtain "θ" with Equation 55 given below:

$$\theta = \{\pi + \sqrt{(\pi^2 + 4\pi*N*w(r1+r0)/((r1-r0)*h))} \}*(r1-r0)/(r1+r0) \quad \text{Equation 55}$$

That is, based on various information such as the outer diameter/inner diameter of the printable region, the number of the images, and the width and height of the images, it is possible to uniquely determine the number of turns of the spiral "θ." Also, from Equations 55 and 50, it is possible to determine the parameter "a" of the spiral equation with Equation 56 given below:

$$a = (r1+r0)/\{\pi + \sqrt{\pi^2 + 4\pi*N*w(r1+r0)/((r1-r0)*h)}\} \quad \text{Equation 56}$$

Next, a method will be described with which coordinates for drawing each image, that is, the coordinates of points "A," "B," "C," and "D" at the four corners of the spiral bit shown in FIG. 35B are calculated using the parameters determined above.

Figure 46:
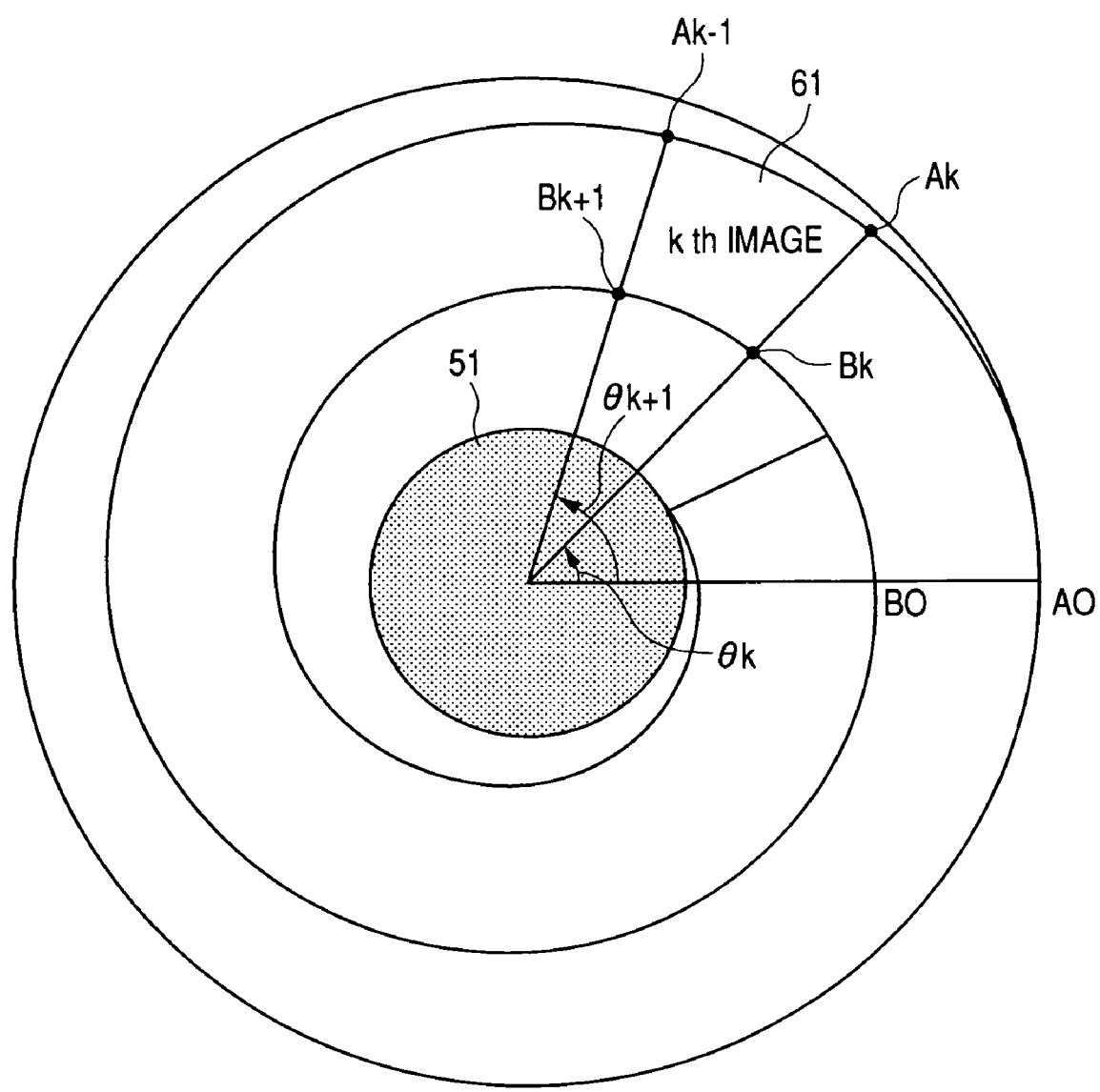
FIG. 46 is an explanatory diagram of a method of calculating coordinates of points "A," "B," "C," and "D" at the four corners of a spiral bit.

The N images are arranged from the outer radius side and are respectively assigned "0," "1," "2," ... "k," ..., and "N−1" in order. As shown in FIG. 46, the start angle of the k-th image is assigned "θk." The images are arranged adjacent to each other so that no gap is generated between them, so that the end angle thereof coincides with "θk+1." Points "Bk" and "Ak" in FIG. 46 are each a point on the spiral and correspond to the start position of the k-th spiral bit. That is, the k-th image is converted into a spiral bit 61 surrounded by the points "Bk," "Bk+1," "Ak," and "Ak+1." Also, points "A0" and "B0" correspond to the points "P" and "Q" in FIG. 45, respectively.

From the properties of a linear spiral, Equation 57 given below for obtaining the side "AkBk" with respect to every k is derived:

$$AkBk = 2\Pi*a \quad \text{Equation 57}$$

Here, "a" is already given by Equation 50 described above.

Also, from Spiral Equation 48 and a known spiral length formula, the lengths of a side "A0Ak" and a side "B0Bk" are obtained with Equations 58 and 59 given below:

$$A0Ak = r1*\theta k - a/2*\theta k^2 \quad \text{Equation 58}$$

$$B0Bk = (r1 - 2\Pi*a)*\theta k - a/2*\theta k^2 \quad \text{Equation 59}$$

Also, as is apparent from FIG. 46, k images, that is, a width of "k*w" is required before the start angle of the k-th image. As described above, each image is magnified so that the average of the upper side and the lower side of a post-magnification image becomes equal to the width of the pre-magnification image, so that Equation 60 given below is derived:

$$(A0Ak + B0Bk)/2/AkBk = k*w/h \quad \text{Equation 60}$$

From Equations 57 to 60 described above, Equation 61 given below for obtaining "θk" is derived:

$$\theta k = r1/\alpha - \pi - \sqrt{((r1/\alpha - \pi) - 4\pi*k*w/h)} \quad \text{Equation 61}$$

Therefore, it is possible to express the coordinates of the four points "Bk," "Bk+1," "Ak," and "Ak+1" surrounding the spiral bit 61 as follows in order in a polar coordinate form:

$$Bk = (r1 - (2\pi + r1/\alpha - \pi - \sqrt{((r1/\alpha - \pi) - 4\pi*k*w/h)})*\alpha,$$

$$r1/\alpha - \pi - \sqrt{((r1/\alpha - \pi) - 4\pi*k*w/h)})$$

$$Bk+1 = (r1 - (2\pi + r1/\alpha - \pi - \sqrt{((r1/\alpha - \pi) - 4\pi*(k+1)*w/h)})*\alpha,$$

$$r1/\alpha - \pi - \sqrt{((r1/\alpha - \pi) - 4\pi*(k+1)*w/h)})$$

$$Ak = (r1 - (r1/\alpha - \pi - \sqrt{((r1/\alpha - \pi) - 4\pi*k*w/h)})*\alpha,$$

$$r1/\alpha - \pi - \sqrt{((r1/\alpha - \pi) - 4\pi*k*w/h)})$$

$$Ak+1 = (r1 - (r1/\alpha - \pi - \sqrt{((r1/\alpha - \pi) - 4\pi*(k+1)*w/h)})*\alpha,$$

$$r1/\alpha - \pi - \sqrt{((r1/\alpha - \pi) - 4\pi*(k+1)*w/h)})$$

That is, the image processing apparatus in this embodiment is capable of uniquely determining the coordinates of every spiral bit based on the outer diameter/inner diameter of a printable range, the number of images, and the width and height of the images. By changing in shape and drawing each image based on the coordinates using the method already described in the tenth embodiment or the eleventh embodiment, the image processing apparatus in this embodiment draws a label image optimum to the size of the printable range where no inconvenience in terms of design occurs.

It should be noted here that in this fifteenth embodiment, the coordinates of a spiral arrangement are determined based on the inner diameter and the outer diameter of a printable range, although the present invention is not limited to this and it is possible to apply the same construction to the concentric arrangement described in the twelfth embodiment or the like. In the case of the concentric arrangement, by determining the size of each image, the number of concentric circles to be formed, and the number of images to be arranged for each concentric circle based on the printable range, it becomes possible to make a more flexible layout design. Also, when images are arranged spirally so that the upper sides and lower sides of the images are set adjacent to each other like in the tenth embodiment, it is possible to cope with this arrangement by interchanging the image width "w" and height "h" in the equations described above with each other.

Sixteenth Embodiment

In this sixteenth embodiment, an image processing apparatus will be described which when arranging images spirally or concentrically, alleviates a load of processing using images that each have a resolution (=image size) appropriate to an image layout and a print resolution. Note that the hardware construction and process steps for label print of the image processing apparatus in this sixteenth embodiment are the same as the hardware construction of the image processing apparatus in the tenth embodiment shown in FIG. 31 and the process steps for the label print shown in FIG. 32, so that the description thereof will be omitted.

In the tenth to fifteenth embodiments described above, the original images "0.jpg," . . . , and "(N−1).jpg" shown in FIG. 33A are simply images in a JPEG format. In this embodiment, however, images in a DCF (Design rule for Camera File system) format that is a standard format for digital cameras and has come into widespread use in recent years are used. That is, in the flash memory 3106 of the image processing apparatus of this embodiment, images of the DCF format have been recorded.

Here, the images of the DCF format means image data containing thumbnail images in addition to main images that are JPEG images. Typically, the JPEG images (main images) each have a resolution (image size) of 1,600×1,200 pixels or higher and the thumbnail images each have a resolution (image size) of 160×120 pixels. The image processing apparatus of this embodiment calculates a resolution (image size) that is necessary for rendering during label image creation processing and, when the thumbnail images have enough resolutions (image sizes), decoding of the main images is not performed and the thumbnail images are used in place of the main images, thereby achieving an increase in processing speed and a reduction in required memory amount.

It should be noted here that the image processing apparatus of this embodiment mainly creates a label image composed of post-shape change images (such as the images shown in FIG. 43) whose sizes are not constant. That is, when the size of each image to be arranged inside a circumference is small as shown in FIG. 43, it is effective that the thumbnail images are used in place of the main images. Also, as shown in FIG. 43, an arrangement is adopted in which the upper side and lower side of each image contact its adjacent images.

Next, the label image creation processing in step S3202 shown in FIG. 32 of the image processing apparatus in this sixteenth embodiment will be described.

Figure 47:
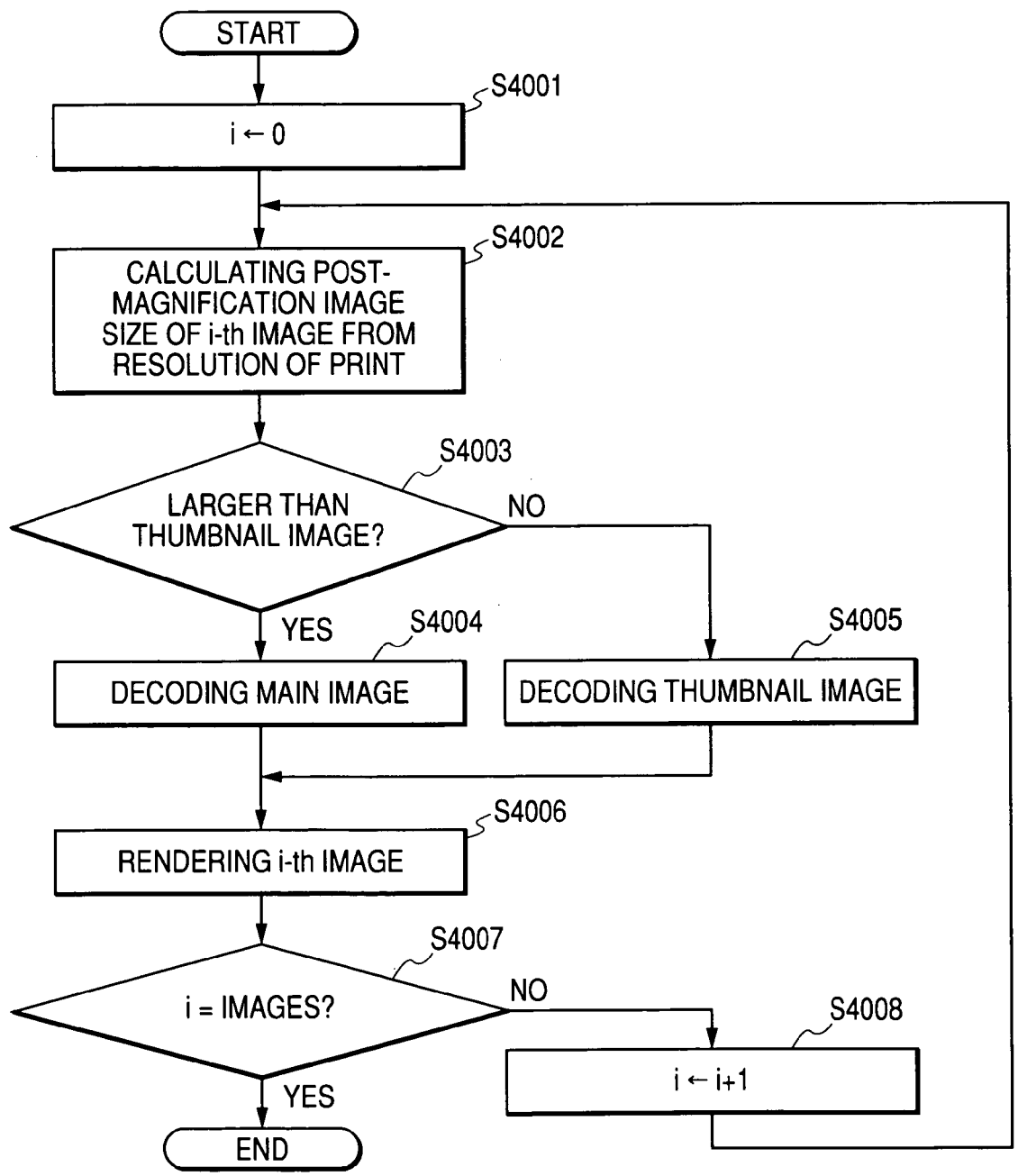
FIG. 47 is a flowchart showing label image creation processing in step S3202 shown in FIG. 32 of an image processing apparatus in a sixteenth embodiment.

FIG. 47 is a flowchart showing the label image creation processing in step S3202 shown in FIG. 32 of the image processing apparatus in this sixteenth embodiment. First, in step S4001, a variable "i" is initialized using a value "0." Next, in step S4002, the image processing apparatus calculates a post-shape change size (post-shape change image size) of the i-th image based on a print resolution. As shown in FIG. 39B, the post-shape change upper side "AC" of the i-th image has $(r_i - r_{i-1})$ pixels. This value varies depending on which layout is adopted, although a concrete method of calculating "$r_i$" has been described in the aforementioned thirteenth embodiment, so that the description thereof will be omitted in this embodiment.

Next, in step S4003, the image processing apparatus determines whether a main image or a thumbnail image should be used for rendering in accordance with the post-shape change image size. In more detail, the image processing apparatus judges whether a condition of "post-shape change image side AC>160 pixels" is satisfied. If the condition of "post-shape change image side AC>160 pixels" is satisfied (Yes in step S4003), the processing proceeds to step S4004. On the other hand, if the condition of "post-shape change image side AC>160 pixels" is not satisfied (No in step S4003), the processing proceeds to step S4005.

Next, as a concrete example, a case will be described in which a label of a typical CD recording medium having a diameter of 12 cm is created and the printer 3108 performs print at a resolution of 600 dpi. First, the number of pixels "R" contained within the radius of the CD label is obtained as follows:

$$R = 12/2/2.54 * 600 \approx 1,417 \text{ pixels}$$

The width of a thumbnail image is 160 pixels, so that the thumbnail image is used at the time of rendering when an image should be drawn in a size smaller than around ⅑ of the CD radius. In this manner, it becomes possible to increase the efficiency of the rendering processing (label image creation processing).

Next, if the processing proceeds to step S4004, the image processing apparatus performs decoding of the main image of the i-th image. On the other hand, if the processing proceeds to step S4005, the image processing apparatus performs decoding of the thumbnail image of the i-th image. Then, in step S4006, the image processing apparatus performs image rendering processing using the decoded main image or thumbnail image. The concrete algorithm of this rendering processing has been described in the aforementioned tenth to thirteenth embodiments.

Next, in step S4007, the image processing apparatus judges whether a variable "i" is equal to the number "Images" of images to be drawn. Then, if a result of this judgment is positive (Yes in step S4007), the label image creation processing is ended. On the other hand, if the judgment result is negative (No in step S4007), the processing proceeds to step S4008 in which the image processing apparatus increments the variable "i" only by "1." Then, the processing returns to step S4002.

It should be noted here that in this sixteenth embodiment, a case has been described in which the sizes of respective images to be drawn are different from each other as shown in FIG. 43. However, the present invention is not limited to this and it is possible to provide the same effect even in the case shown in FIG. 33B where every image is drawn in the same size. In a layout where images are drawn in the same size, however, it is not required to make the judgment as to whether a main image or a thumbnail image is to be used for each image and it is sufficient that this judgment is made only once at the start of the processing.

Also, in this sixteenth embodiment, a case where image data has two different resolutions (image sizes) has been described by taking, as an example, a case of image data of the DCF format, although the present invention is not limited to this. For instance, it is possible to suitably deal with image data in another known image format, such as a Flashpix format or a JPEG 2000 format, in which it is possible to hierarchically decode the image data at multiple resolutions. Also, when image data of a format, in which it is possible to decode the image data at multiple resolutions (three or more), is used, it becomes possible to more finely determine the resolution of each image to be applied to drawing. With this construction, it becomes possible to decode images having minimum required resolutions, which makes it possible to further increase the processing speed.

Also, in this sixteenth embodiment, decoding is performed through switching between a thumbnail image and a main image as necessary, although the present invention is not limited to this and every thumbnail image may be decoded and cached by one operation in advance and each required main image may be decoded as occasion demands. There are many cases where the thumbnail image is used for another purpose. For instance, there is a case where the thumbnail image is used to present an image selection screen through which a user selects each image to be subjected to print from among multiple images. Therefore, there is a case where by caching the thumbnail image, the processing efficiency is improved as a whole. Also, the processing speed of the thumbnail image is improved through the caching, while a memory usage amount is increased. Therefore, there exists a trade-off in terms of the label image creation processing. It is sufficient that a thumbnail image processing method appropriate to a form adopted is selected with consideration given to these facts.

Also, in this sixteenth embodiment, the switching between a thumbnail image and a main image is performed based only on the size of an image to be drawn, although the present invention is not limited to this and there is a case where the thumbnail image is low not only in resolution but also in image quality. That is, in terms of the image quality, there is a case where the thumbnail image is not suited for print. In more detail, there is a case where the thumbnail image is compressed at a compression ratio higher than that of a main image or a simple Nearest-Neighbour method is used to create the thumbnail image through resolution conversion of a main image. Accordingly, when preview screen displaying or draft print is performed, the label image creation may be performed through the switching between a thumbnail image and a main image in the manner described above and, at the time of actual print, the label image creation may be performed using only the main image.

Other Embodiments

It should be noted here that the above description has been made by assuming that each image data used for an arrangement is a separated JPEG image file, although the present invention is not limited to this and the image data may be stored in a Relational DataBase Management System (RDBMS) or the like.

Also, frames obtained by clipped moving image data, such as MPEG data, at appropriate time intervals may be used. In particular, in the case of a spiral arrangement, by arranging the frames in the order of a time axis, it becomes possible to take advantage of the spiral arrangement where all images are connected to each other so that a single spiral is formed.

Also, when the conversion of a rectangular material image into a spiral bit or a concentric circle bit is performed with a known mesh-warp technique using OpenGL, Direct3D, or the like that is generally used as a 3-D CG technology, it becomes possible to draw a beautiful image at higher speed.

Also, in the embodiments described above, it is assumed that a created label image is printed onto a printable CD-R medium using a consumer-oriented printer, although the present invention is not limited to this and may be applied to print onto a press-manufactured CD-ROM or the like. In addition, the present invention is not limited to the print onto a CD and is equally applicable to print onto a DVD-R or another generally circular disk medium.

It should be noted here that the image processing apparatus (computer) shown in FIG. 31 may be provided with dedicated hardware having a function of achieving a part of the processing flows shown in FIGS. 32, 36, 37, 40, 41, and 47. Also, the memory possessed by the image processing apparatus is not limited to the flash memory 3106, the ROM 3104, and the RAM 3105 shown in FIG. 31 and may be composed of a nonvolatile memory like a hard disk device or a magneto-optical disk device, a read-only recording medium like a CD-ROM, or a computer readable/writable recording medium achieved through a combination thereof, for instance.

As described above, the image processing apparatus, the image processing method, the program for implementing the image processing method, and the recording medium recording the program according to the present invention includes: a storage means for storing a plurality of first image data; a shape-change means for outputting shape-changed image data where each of the plurality of first image data read from the storage means has been changed in shape into a form suited for a concentric or spiral arrangement; and an image arrangement means for outputting second image data where shape-changed image data output by the shape-change means has been arranged one of concentrically and spirally. With this construction, images are each changed in shape into a form suited for a concentric or spiral arrangement, so that it becomes possible to arrange the images concentrically or spirally with efficiency on a label surface having a circular or doughnut shape.

Here, in this specification, a term "computer-readable recording medium" means a transportable medium (such as a flexible disk, a magneto-optical disk, a ROM, or a CD-ROM) or a storage device (such as a hard disk) built into a computer system. Also, it is assumed that the term "computer-readable recording medium" includes a recording medium holding a program code for a fixed time such as a volatile memory (RAM) provided in a computer system serving as a server or a client in the case where the program code is transmitted through a network like the Internet or a communication line like a telephone line.

Also, the program code may be transmitted from a computer system, in which this program code is stored in a storage device or the like, to another computer system through a transmission medium or a transmission wave. Here, the term "transmission medium" means a medium having a function of transmitting information like a network (communication network), such as the Internet, or a communication line (communication wire) such as a telephone line.

Also, the program code may be a program code for realizing a part of the function described above. Further, the program code may be a so-called differential file (differential program) that is a program code for realizing the function described above through combination with a program code already recorded in a computer system.

Also, a program product, such as a computer-readable recording medium recording the program code described above, is applicable as an embodiment of the present invention. The program code, the recording medium, the transmission medium, and the program product described above are included in the scope of the present invention.

The present invention is not limited to the embodiments described above and it is possible to make various modifications without departing from the scope defined in the appended claims.

What is claimed is:

1. An image processing apparatus for arranging rectangular images in a circular area usable for layout of the images, comprising:
   a number-of-images selection unit that selects a number of images to be subjected to layout arrangement
   a parameter setting unit adapter to set a parameter for a layout condition to arrange a plurality of images in a spiral pattern on a recording medium when the recording medium is provided as a circular recording medium to be subjected to layout of the plurality of images; and
   a shape changing unit adapted to change the shape of the rectangular images in accordance with the parameter set by said parameter setting unit,
   wherein said parameter setting unit determines the number of turns of the spiral pattern in accordance with the number of images to be subjected to layout and sets the parameter to change the shape of the rectangular images so as to be fitted to an area surrounded by the spiral pattern and two adjacent straight lines respectively passing through the center of the circular recording medium, and
   wherein the image processing apparatus is arranged to switch between an original image and a thumbnail image in accordance with the size of the image subjected to the shape changing by said shape changing unit, to selectively use the original image and the thumbnail image as the image the shape of which is changed by said shape changing unit so as to be fitted to the area.

2. An apparatus according to claim 1, wherein said parameter setting unit further sets the parameter in accordance with outside and inside diameters of the circular recording medium and width and length of the rectangular image.

3. An apparatus according to claim 1, wherein said shape changing unit converts coordinates of corners of the rectangular image in accordance with the parameter set by said parameter setting unit.

4. An image processing method of arranging rectangular images in a circular area usable for layout, comprising the steps of:
   selecting a number of images to be subjected to layout arrangement;
   setting a parameter for a layout condition to arrange a plurality of images in a spiral pattern on a recording medium when the recording medium is provided as a circular recording medium to be subjected to layout of the plurality of images;
   changing the shape of the rectangular image in accordance with the parameter set in said parameter setting step,
   wherein the number of spires of the spiral pattern is determined in accordance with the number of images to be subjected to layout, and
   wherein said parameter setting step determines the number of turns of the spiral pattern in accordance with the number of images to be subjected to layout and sets the parameter to change the shape of the rectangular images so as to be fitted to an area surrounded by the spiral pattern and two adjacent straight lines respectively passing through the center of the circular medium and
   wherein said image processing method is arranged to include a step of switching between an original image and a thumbnail image in accordance with the size of the image subjected to the shape changing by said shape changing step. to selectively use the original image and the thumbnail image as the image the shape of which is changed by said shape changing step so as to be fitted to the area.

5. A method according to claim 4, wherein said parameter setting step includes setting the parameter in accordance with outside and inside diameters of the circular medium and width and length of the rectangular image.

6. A method according to claim 4, wherein said shape changing step includes convening coordinates of corners of the rectangular image in accordance with the parameter set by said parameter setting step.

7. A computer-readable storage medium storing a computer program comprising a program code for causing a computer to execute the image processing method according to claim 4.

* * * * *